US009559804B2

(12) United States Patent
Ibrahim et al.

(10) Patent No.: US 9,559,804 B2
(45) Date of Patent: Jan. 31, 2017

(54) CONNECTED VEHICLES ADAPTIVE SECURITY SIGNING AND VERIFICATION METHODOLOGY AND NODE FILTERING

(71) Applicants: Faroog Ibrahim, Dearborn Heights, MI (US); Chenikkayala Nagadevendra, Bangalore (IN); Varun Palathour Srirama, Bangalore (IN)

(72) Inventors: Faroog Ibrahim, Dearborn Heights, MI (US); Chenikkayala Nagadevendra, Bangalore (IN); Varun Palathour Srirama, Bangalore (IN)

(73) Assignee: SAVARI, INC., Santa Clara, CA (US)

( * ) Notice: Subject to any disclaimer, the term of this patent is extended or adjusted under 35 U.S.C. 154(b) by 0 days.

(21) Appl. No.: 14/883,639

(22) Filed: Oct. 15, 2015

(65) Prior Publication Data

US 2016/0036558 A1    Feb. 4, 2016

Related U.S. Application Data

(63) Continuation-in-part of application No. 14/163,478, filed on Jan. 24, 2014, now Pat. No. 9,435,654, which
(Continued)

(51) Int. Cl.
| | | |
|---|---|---|
| *H04K 3/00* | (2006.01) | |
| *G01S 19/24* | (2010.01) | |
| *G08G 1/015* | (2006.01) | |
| *G08G 1/127* | (2006.01) | |
| *G08G 1/133* | (2006.01) | |
| *H04L 29/08* | (2006.01) | |
| *G08G 1/01* | (2006.01) | |
| *G08G 1/0967* | (2006.01) | |
| *G01C 21/32* | (2006.01) | |

(52) U.S. Cl.
CPC .............. *H04K 3/92* (2013.01); *G01S 19/24* (2013.01); *G08G 1/015* (2013.01); *G08G 1/0112* (2013.01); *G08G 1/0129* (2013.01); *G08G 1/0141* (2013.01); *G08G 1/127* (2013.01); *G08G 1/133* (2013.01); *H04K 3/22* (2013.01); *H04L 67/18* (2013.01); *G01C 21/32* (2013.01); *G08G 1/096716* (2013.01)

(58) Field of Classification Search
None
See application file for complete search history.

(56) References Cited

U.S. PATENT DOCUMENTS 9,084,064 B2 *  7/2015  Solum ............... H04R 25/554
2006/0224811 A1 * 10/2006 Sichner .............. G05B 19/0428
                                                  710/306
(Continued)

*Primary Examiner* — Fadey Jabr
*Assistant Examiner* — Kevin P Mahne
(74) *Attorney, Agent, or Firm* — Maxvalueip LLC

(57) ABSTRACT

We introduce a connected vehicles adaptive security signing and verification methodology. We also introduce an adaptive node filtering at receiver, using noise levels and received signal strength. This invention addresses two important pillars in connected vehicle technology and autonomous cars: The first one is related to the security 1609.2 format and its main two functions: signing and verification. The second one explains how the noise level and signal strength can be used to filter undesired connected nodes. In this presentation, we provide various examples and variations on these topics.

20 Claims, 46 Drawing Sheets

Related U.S. Application Data is a continuation-in-part of application No. 14/047,157, filed on Oct. 7, 2013, now Pat. No. 9,037,404.

(56) References Cited

U.S. PATENT DOCUMENTS

| | | | | |
|---|---|---|---|---|
| 2007/0088490 A1* | 4/2007 | Sutardja | G01S 19/14 | 701/117 |
| 2008/0114530 A1* | 5/2008 | Petrisor | G08G 1/096716 | 701/117 |
| 2009/0072998 A1* | 3/2009 | Yanase | G08G 1/096741 | 340/905 |
| 2009/0150310 A1* | 6/2009 | Okada | B60C 23/0408 | 706/12 |
| 2009/0245327 A1* | 10/2009 | Michaels | H04B 1/707 | 375/130 |
| 2010/0238815 A1* | 9/2010 | Kohout | H04L 43/0817 | 370/252 |
| 2011/0080302 A1* | 4/2011 | Muthaiah | H04L 47/10 | 340/903 |
| 2011/0109475 A1* | 5/2011 | Basnayake | G08G 1/096716 | 340/902 |
| 2011/0188671 A1* | 8/2011 | Anderson | H04B 15/00 | 381/94.3 |
| 2012/0003942 A1* | 1/2012 | Grunert | H04W 16/14 | 455/73 |
| 2012/0140657 A1* | 6/2012 | Wigren | H04L 25/0212 | 370/252 |
| 2012/0172673 A1* | 7/2012 | Friedman | H04L 1/0007 | 600/300 |
| 2013/0030606 A1* | 1/2013 | Mudalige | G08G 1/22 | 701/2 |
| 2013/0109319 A1* | 5/2013 | Splitz | H04W 16/32 | 455/63.1 |
| 2013/0162449 A1* | 6/2013 | Ginsberg | G08G 1/095 | 340/910 |
| 2014/0188376 A1* | 7/2014 | Gordon | G08G 1/096775 | 701/118 |
| 2015/0023329 A1* | 1/2015 | Jiang | H04W 74/008 | 370/336 |
| 2015/0189404 A1* | 7/2015 | Pekarske | H04Q 9/00 | 340/870.07 |
| 2015/0294571 A1* | 10/2015 | Shida | G08G 1/161 | 701/409 |
| 2015/0375764 A1* | 12/2015 | Rajendran | B61L 15/0027 | 701/2 |
| 2016/0086391 A1* | 3/2016 | Ricci | G07C 5/008 | 701/29.3 |
| 2016/0087655 A1* | 3/2016 | Kim | H04W 4/046 | 455/404.1 |
| 2016/0104501 A1* | 4/2016 | Weingold | G10L 21/0208 | 381/71.1 |

\* cited by examiner

CONNECTED VEHICLES ADAPTIVE SECURITY SIGNING AND VERIFICATION METHODOLOGY AND NODE FILTERING

RELATED APPLICATIONS

This application is a CIP of another co-pending US utility application, namely, Ser. No. 14/163,478, filed 24 Jan. 2014, titled "System and method for creating, storing, and updating local dynamic MAP database with safety attribute", which is a CIP of another co-pending US utility application, namely, Ser. No. 14/047,157, titled "System and method for map matching", filed 7 Oct. 2013, now a U.S. Pat. No. 9,037,404, issued on May 19, 2015, which in turn is a CIP of two other co-pending US utility applications, namely, Ser. No. 13/907,864, titled "System and method for lane boundary estimation and host vehicle position and orientation", filed 1 Jun. 2013, and Ser. No. 13/907,862, titled "System and method for node adaptive filtering and congestion control for safety and mobility applications toward automated vehicles system", filed 1 Jun. 2013. It is also related to another US patent application filed 24 Jan. 2014, Ser. No. 14/163,258, with the same assignee, titled "System and method for road side equipment of interest selection for active safety applications". The teachings of all the above applications are incorporated herein, by reference. The current application claims the priority date of the above applications.

BACKGROUND OF THE INVENTION

The autonomous cars or vehicles are subject of intense research today. The safety is one of the most important issues in this technology. Thus, the system security is very important for the integrity of the control and functions of the car. In addition, the large number of the units or cars under consideration in a given situation makes the analysis extremely difficult, unless we can somehow limit the scope of analysis, or limit the input, with respect to the number of cars or amount of data received, per unit time.

This invention addresses two important pillars in connected vehicle technology: The first one is related to the security 1609.2 format and its main two functions: signing and verification. The second one is continuation to Savari's prior invention (shown above, as parent case) and explain how the noise level and signal strength can be used effectively to filter undesired connected nodes.

There is no prior art or product in the industry that teaches the following features in our disclosure here.

SUMMARY OF THE INVENTION

This disclosure, e.g., adds the following improvements on our platform technologies, as some of the embodiments:

We introduce a connected vehicles adaptive security signing and verification methodology. We also introduce an adaptive node filtering at receiver, using noise levels and received signal strength. This invention addresses two important pillars in connected vehicle technology: The first one is related to the security 1609.2 and its main two functions: signing and verification. The second one is continuation to our prior patent disclosure, and explains how the noise level and signal strength can be used to filter undesired connected nodes.

DETAILED DESCRIPTION OF THE PREFERRED EMBODIMENTS

Figure 1:
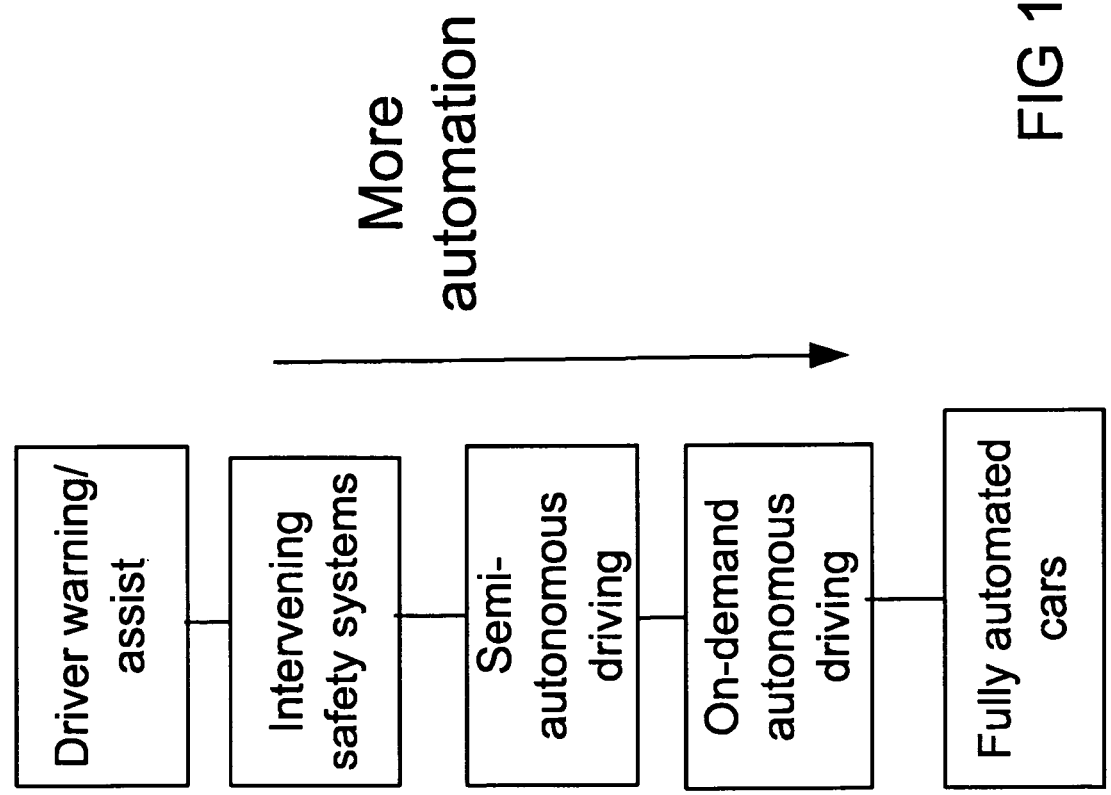
FIG. 1 is for one embodiment, as an example, for representation of development of fully automated vehicles, in stages.

Here, we describe some of the embodiments of our system and method:

Let's look at the details of one method:

MAP Generation: MAP Generation based on vehicle data, included in Basic Safety Message (BSM) or equivalent message(s).

a. Listen to all the BSMs transmitted in the given region, and based on what is the intended region of map, filter out the BSM data which falls outside this region. The intended region of map can also be defined adaptively, using the speed profiles data in each road segment of interest. For example, a high average speed road segment will require more map coverage than a low average speed road segment.

b. Store location (concise), Heading, Speed, and time-stamp of each of the BSM.

If the vehicle provides PH (Path History or trajectory or breadcrumb trail points) (concise points), check the accuracy/confidence of the PH points. In case the accuracy is good (say better than e.g. 0.4 m (or meter)), store them instead of actual locations reported by the vehicle.

For example, from the current location and velocity, we can calculate the next point in time, or we can extrapolate the next point, based on the last N points. For example, one can assume a line or higher order curves, or polynomials of degree M, to fit the points in the formula and get the coefficients. Once the coefficients are known, the next point can be extrapolated.

For example, the accuracy can be measured from the distance of a given point to the line or curve of trajectory.

For an embodiment, the accuracy threshold is a fixed number or distance.

For an embodiment, the accuracy threshold is a variable number or distance. That can be dependent on the velocity of the vehicle. For example, the higher the velocity, the higher the threshold, e.g., with a linear relationship.

Otherwise, use the location details provided by the vehicle and generate the PH (Concise) points for the vehicle, and store these values.

c. Start generating a Temporary Map, once the stored data has sufficient number of vehicles, Q (say, e.g., 1000 vehicles), or for example, length of time for monitoring, T, as a threshold, e.g., one-week worth of data, to make sure we have enough data points for our analysis and determination. In one embodiment, we can use any logical combination of thresholds or conditions on Q and T, e.g., using AND or OR.

Here are the steps of one embodiment of our method: (see FIG. 27)

Step 1: Generating Lanes: (see FIGS. 18-19)

Assign equal weights for all the paths at the start, as the initialization step.

Combine the Paths (or parts of paths) which have a separation distance of lesser than a fraction of a lane width, say, e.g., ¼th of the Lane width, or e.g., 0.5 meter, as the threshold for this step, to indicate that those are in fact the same. The weight of the resultant path is calculated using the combined statistic method similar to the one used in Kalman filtering.

e.g., Resultant Weight: $w\_r = 1/\text{sqrt} \, [((1/w1)^2 * (1/w2)^2)/((1/w1)^2 + (1/w2)^2)]$ Where sqrt is the square root function, w1 is the weight of the first path, and w2 is the weight of the second path.

Another method is to use the first order statistical combination. Then, we have:

$$w\_r = 1/(((1/w1)*(1/w2))/((1/w1)+(1/w2)))$$

In general, we have as a function (F) of w1 and w2:

$$w\_r = F(w1, w2)$$

First, combine the paths which start and end with the same heading angles.

Second, combine the parts of paths of the vehicles which have the same headings in that part.

For the combined paths which are headed in the same direction, update the weights (using the above formula) of the paths (or parts of the paths).

Detect Lane changes in the captured/stored data, and discard that data (either part or full info from that vehicle). Different methods of detecting lane changes have been proposed in previous inventions (see the parent applications). Any of those methods can be used here for the detection of lane changes.

In addition, the statistical Median operation can be also used to filter outliers in positions and paths. It also can help for the lane change detection.

In one embodiment, generally, the outliers may be bad data points, and cannot be relied on. So, we filter them out. In one embodiment, assuming the normal distribution, if any data point is beyond 2 standard deviations, from the peak, it is considered as the outlier point, and gets discarded.

In one embodiment, a vehicle is monitored from its center, as a point, for tracking purposes.

In one embodiment, a vehicle is monitored from the middle front point and the middle back point, as 2 points, for tracking purposes. So, for example, if one point (e.g. the front point) is in one lane and the other point is in another lane, that may indicate transition between lanes or changing lanes, if the difference is above a threshold, which is measured with respect to the distance perpendicular to the lane direction, or with respect to the angle relative to the lane direction.

Step 2: Determining Intersection Region and Splitting the lanes: (see FIGS. 20-23)

Intersection Diamond region can be identified from the above data in the following ways: (see FIG. 28)

1. Using Speed profiles of the vehicles.
2. Using Heading angles of the vehicles.
3. Using Intersection of Lanes (generated from Vehicle Travel paths).

Now, let's look at different methods in details:

Method 1: Using Speed Profiles of the Vehicles: (See FIGS. 20-22)

For each of the lanes, consider the stop location of all the vehicles traversing on that lane.

Of these locations, discard the locations where the vehicle stays for lesser than a short time period $t_1$, say e.g. 5 sec. (As these could have been recorded due to vehicle slow motion, and would not have the time for GPS stabilization. So, they should be discarded.)

Of all these locations, using statistical methods, e.g. using standard-deviation method, neglect the outliers (e.g. 5% outliers), or e.g., discard the tail of the probability distribution on either side, as e.g., extreme cases or unreliable cases.

Consider vehicle travel direction on the road (based on locations and timestamps), and pick up the location which comes farthest and toward the exiting end of the lane, as $P_{far}$.

Pick up all the locations which lay within distance $L_2$ of $P_{far}$, say e.g. within 7 m of the selected location, or $A_3$. Calculate the percentage of vehicles in this circle or region. If the percentage of vehicles in this circle or region is below $S_1$, say e.g. 7% of the total vehicle locations on this lane, then discard the selected location and reconsider above step for selecting a location.

If Vehicle lengths are known, use them, as $L_3$, else use $L_{default}$, e.g. 5 m, as typical length, and then calculate the average of vehicle lengths. (We can eliminate this step and use 5 m, directly, if required, or if not enough data is available from the vehicles.)

Construct average of locations based on average of GPS location of all vehicles which fall within area $A_3$, or the 7 m radius of the selected location.

Calculate the GPS location of the point which falls ahead of the above average-of-locations, at a distance of a fraction of the typical vehicle length, or $S_2$, e.g. half (or 55 percent) of average vehicle length.

The GPS location of each of the lanes, constructed based on the above steps, provides the outer edge of the Intersection Diamond region.

This applies on other road segment of interest, that show queue of vehicles stopped, with profile history of coming to stop. Another way to look at it is to detect an area where there is no stopped vehicle position density. (This is the intersection diamond region.)

Method 2: Using Heading Angles:

Consider all the vehicles which are traversing on each of the lanes.

Of the vehicles traversing on each lane, select the vehicles which have executed a change in the Heading angle (by more than $\alpha_1$, e.g. 20°), where some of the other vehicles near to that location were traveling straight.

Of all the above selected vehicles, select the location where they executed this change.

Of all these locations, discard the outliers which fall outside of e.g. 5% of the statistical limit, or tail of the distribution curve, as anomalies or outliers.

Calculate the average of these remaining locations. This average location provides the lane boundary of the selected lane.

In one embodiment, the average is based on average of X and Y coordinates, on 2-D coordinates.

In one embodiment, the average is based on weighted average of X and Y coordinates, emphasizing some data over the others. For example, one can have more weights for more reliable data.

The GPS location of each of the lanes, constructed based on the above steps, provides the outer edge of the Intersection Diamond region.

Method 3: Using Intersection of Lanes (Generated from Vehicle Travel Paths): (See FIG. 23)

For each of the lanes which differ in heading angle by more than angle $\alpha_3$, say e.g. 30°, construct the Intersection point of the lines (lanes).

In one embodiment, angle $\alpha_3$ can be adjusted based on historical data, as a threshold value.

In one embodiment, angle $\alpha_3$ can be randomly selected from the range of 25° to 35°.

Construct a convex polygon using these points (or a subset of them) which can cover all the points.
  In one embodiment, for a subset of points, choose every other point.
  In one embodiment, for a subset of points, choose one point out of every 3 points.
  In one embodiment, for a subset of points, choose one point out of every N points. (N is an integer above 3.)
  In one embodiment, to define a convex polygon using these points, we look at the current side and 2 previous sides of the polygon, labeled $P_1$, $P_2$, and $P_3$, respectively, as vectors. The difference between the directions of vectors ($P_1$ and $P_2$) and ($P_2$ and $P_3$) are angles $\alpha_4$ and $\alpha_5$, respectively. If both angles $\alpha_4$ and $\alpha_5$ are in the same directions (e.g. both tilted clockwise, with respect to the previous vector), then the resulting polygon is a convex one.
Expand the Convex polygon by adding a certain amount of width, e.g. a fraction ($g_1$) of the lane width (say e.g. half of the lane width) on each of the sides.
Split the lanes, based on the intersection region polygon.
Step 3: Determining Lane type (Ingress/Egress): (see FIG. 24)
We use the following methods:
Method 1: Using difference in angle in Vehicle heading and Lane-Heading (Waypoint0):
  For each of the lanes, calculate the angle of Waypoint0 (w.r.t. Waypoint1).
  Calculate the difference in heading of Waypoint0 and Heading of vehicle ($\alpha_6$).
  If the Difference $\alpha_6$ falls between say, e.g., $\{[0°-90°] \cup [270°-360°]\}$, as the union of sets or ranges of angles (or the angle locating in the union of the first and fourth quadrants in the 2-D coordinate system), then given lane is an Egress lane, else (otherwise), it is an Ingress lane.
  Based on the vehicles heading angle at the 1st waypoint (closest to intersection region), we decide on whether the Lane is an Ingress or Egress.
Method 2: Based on vehicle movement inside the Lane:
  Using the location of vehicle and its corresponding timestamp, determine whether Vehicle is approaching Waypoint0, or leaving.
Step 4: Determining Approach Set for each of the lanes: (see FIG. 25)
  Combine the (incoming/outgoing) lanes which fall on one side of the polygon and have either same (or) exactly opposite heading angle (diff. approximately 180°).
Step 5: Determining connected Lanes: (see FIG. 26)
  For each of the Ingress lanes, observe the movement (mapping of incoming lanes to outgoing lanes) of each of the vehicles in that lane.
  Create a Mapping list for the selected Ingress lane, and count the vehicles traversing each of these connections.
  Discard the outliers (connections) where the vehicles traverse less than e.g. 5% of the total vehicles in that lane.
  Using relative heading angle between the Ingress lane and Connecting-Egress lane ($\alpha_7$), determine whether a Left/Right/Straight (L/R/S) maneuver is required to enter the connecting-Egress lane.
    In one embodiment, we compare the angle $\alpha_7$ with a threshold angle $\alpha_8$. If absolute value of $\alpha_7$ is smaller than or equal to $\alpha_8$, then we call it Straight. If absolute value of $\alpha_7$ is bigger than $\alpha_8$, then, e.g.:
      For positive $\alpha_7$ values, we call it Right.
      For negative $\alpha_7$ values, we call it Left.

Figure 40:
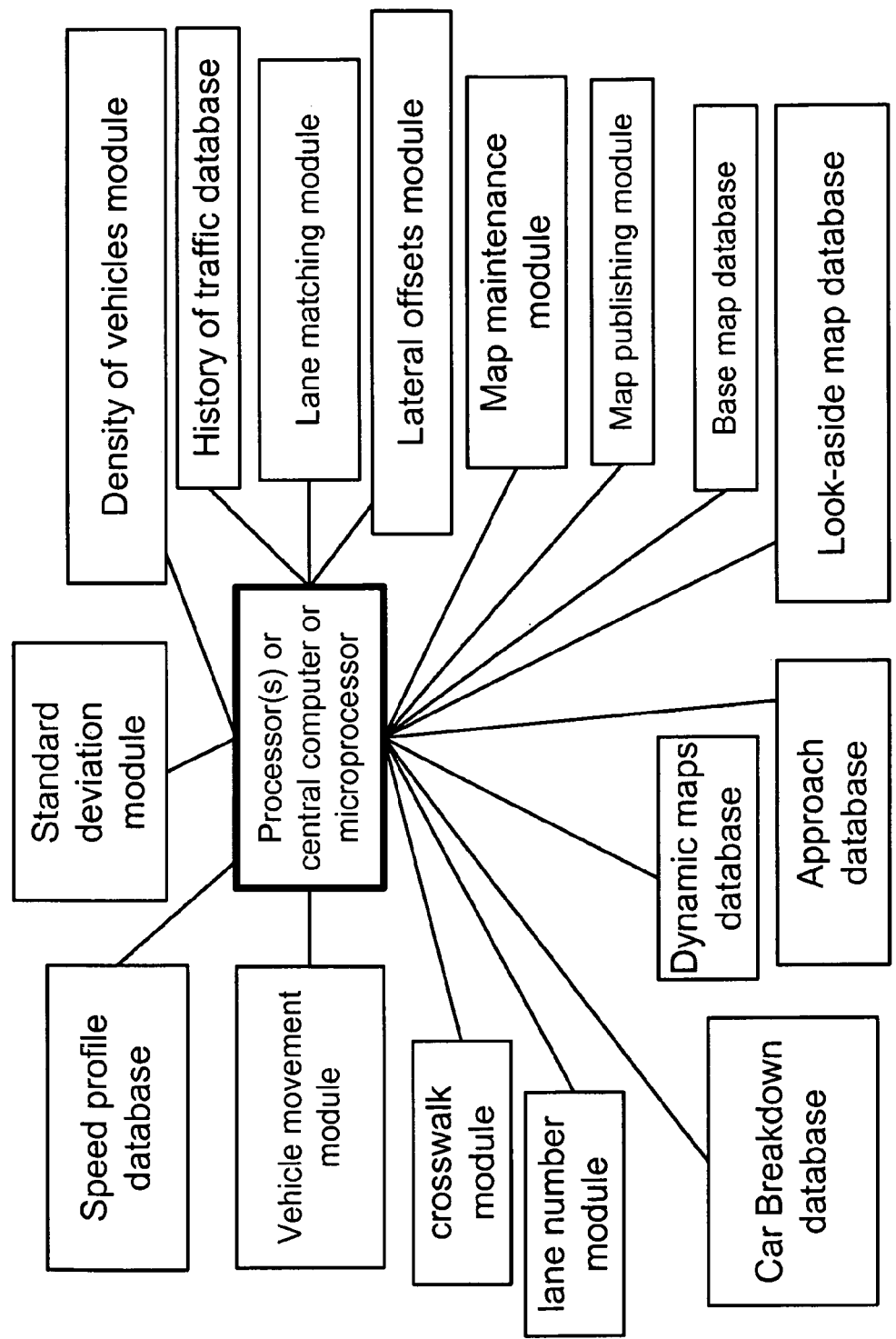
FIG. 40 is for one embodiment of the invention, for a system of creating, storing, and updating local dynamic MAP database with safety attribute.

Step 6: Determining Movement states for each Ingress lane:
  For each of the Ingress lanes, based on the Connected-Egress lane's Maneuver code, determine the Movement state. Say, for example, the possible connection maneuvers are Left-Turn (LT), Straight (S), and then the Movement states are: LT movement, S movement.
MAP Generation: Improvement to above described method in steps 1-6 with an additional Signal Data available from Traffic controller. (see FIG. 40)
  The Idea in this method is to match Traffic controller's signal-phase data with vehicles' motion in each of the lanes and determine the signal phase for each of the Lane/Approach. Here is how it works:
  Continuously poll Traffic-controller for the Signal status information.
  When Traffic-controller is stating a particular phase number for the first time, during next short period of time, $t_2$, e.g. 1-5 seconds, identify the lanes in which vehicles started moving from a halt.
  Of these lanes, identify the direction of travel of the vehicles in each ingress lane towards their egress lanes, and determine the Phase-number for that lane corresponding to that Movement state.
  For each of the Signal-phase mapped to the Ingress lane, count the number of vehicles using that phase to cross the Diamond region, $N_1$.
  Eliminate the Outlier, e.g. 5% of the phases (if any), or the tail of the distribution, from the above list of phases for each of the Ingress lanes, resulting in a smaller number ($N_2$).
MAP Maintenance: Based on BSM messages(s) or equivalent vehicle message. (see FIG. 40)
  Removal of (or repair work in) a Lane: When the density of the vehicles in a particular lane drops off drastically (e.g., more than a percentage or ratio of the original number, e.g., more than $N_3$ percentage), and adjoining lane increases in a similar manner (e.g., more than a percentage or ratio of the original number, e.g., more than $N_4$ percentage).
    A vehicle breakdown is detected in that lane. (Or)
    The lane is temporarily closed. (Or)
    The lane is permanently closed. (Or)
    A detour is assigned for that lane. (Or)
    There is an accident in that lane. (Or)
    Almost all the vehicles in that lane have been detected to do a lane change to adjacent lane(s) before a certain point (coordinates X, Y in 2D space). (Or)
    No vehicles were detected in that lane over a period of time, $t_3$, e.g. 2 hours, while on a similar time frame over a past couple of days, or $N_{past}$ past number of days, we had a greater number of vehicles using that lane, percentage-wise with respect to all vehicles on the road, or using an absolute number, e.g., $N_{abs}$, e.g. 50.
      The exception is for holidays and weekends, which have different traffic patterns. So, we do not include them for comparison with weekdays. So, for comparison, we have different classes, e.g.: working day class, weekend class, and holiday class, which correspond to different days and traffic patterns and human behaviors.
      For example, during weekends, at 6 am, the lanes may be empty or almost empty, but there is no accident or broken down car in any lane. So, it cannot be compared with a period of rush-hour at 6 am during weekdays/work days. So, each class should be compared within/with itself.

For example, during different seasons, e.g. winter, the ice and snow may slow down the cars. Thus, those days cannot be good base of comparison for a sunny day in Summer. So, they constitute a new class of days with different traffic patterns and behavior. So, they should be compared with similar days with similar situations/classes.

Removal of (or repair work in) an Approach: When, e.g., the density of the vehicles in a particular approach road decreases.

For example, a major pileup (breakdown in multiple/all lanes) has been detected.

For example, the road is closed and a detour is assigned.

No vehicles were detected in that lane over a period of time, while the same time previous days had a considerable number of vehicles passing through that approach.

One can specify the previous number of days, N.

One can specify the number of hours or window of hours, e.g., from 12:00 to 16:00, or from 12 noon to 4 pm, for monitoring the traffic.

One can specify the considerable number of vehicles (as a threshold), or number of cars in general, as the absolute number or ratio of numbers or percentage of total, e.g., 50 cars, or 50 cars/hour, or 5 times more cars than yesterday for the same time period, or 50 percent more cars than yesterday for the same window of time or rush hours, or 1.2 times more cars than 2 hours ago, or 50 more cars than 2 hours ago, or 50 cars/minute more cars than 2 hours ago (as the rate comparison), or 50 percent more cars/minute than 2 hours ago (as the rate comparison), or 1.2 times more cars/minute than 2 hours ago (as the rate comparison).

The season, holidays, weekends, weather-related events, and work days are considered, to define different classes of the days, hours, traffic patterns, or human bahaviors, for comparison purposes, as the base line, or find anomaly, or find road condition, or determine traffic status, or prepare maps, or modify maps.

Historical data can be accumulated for a region or specific road to get the patterns for traffic or behavior, e.g., to predict the future or scale the results or numbers for a specific condition. For example, for rainy days, the speeds are reduced by a factor of 30 percent.

For different roads, one can define different classes, for which the same pattern is observed, or there is a common parameter or property. For example, the 4-lane interstate highways, near a major city, may show a similar traffic pattern or traffic jams, or they may have same general traffic speed. So, we define a class for these highways, which historically or statistically behave similarly, in one or more aspects or parameters. Then, for a given class member, if we get a data for a specific time/day, e.g., for speed of vehicles, and e.g., it shows 20 percent lower speed with respect to 1 hour ago, then one can assume the same for other members of the same class for the same time period, which is useful to estimate the speed for other highways, or make the data analysis faster, even if we have no data or incomplete data from other members of class (other highways of the same class), which probably gives us a reasonable starting point or base line or data point, especially in the absence of data or reliable data from other highways of the same class.

Updating Waypoints of a Lane: When vehicle-Matching is either continuously failing or having a correction values above e.g. 20 cm, or a threshold distance, D. Note that D can be defined based on a fraction of lane width or average car length, or percentage or ratio of those parameters.

Do a Lane-matching for all the vehicles traversing in the Mapped region.

For each of the Lane, calculate the average lateral-offset values each of the vehicles is having in each segment of the Lane.

If the lateral offsets are greater than, $D_w$, e.g. 20 cm, for particular contiguous waypoints, add additional waypoints in between the existing waypoints, based on average location or X-Y 2D coordinates (discarding outliers, e.g. 5 percent outliers, anomalies, or tails of distribution curve) of recent-vehicles traversing in that lane-segment, e.g. recent 15 minutes or 1 hour.

In one embodiment, $D_w$ is defined e.g. based on lane width or average vehicle length or width.

MAP Maintenance: Improvement to above method with additional Signal Data available from Traffic Controller. (see FIG. 40)

Keep a continuous monitor on the Vehicle traversals using each of the Signal phases.

Verify if the existing Matching of the Signal-Phases and the Vehicle motions in each of the active lanes are still valid.

Neglect the outlier in the matching, e.g. the 5 percent extremes, but if the matching provides a consistent "inconsistencies" in the matchings, update the Signal-Phase and Lane-Movement states matching.

MAP Publishing, Storing, and Updating Mechanisms: Broadcasting MAP information. (see FIG. 40)

Each of the RSE/Remote-Server would have 2 MAPS for each location, namely, Base-Map and Look-aside (Current-status) MAP.

Case 1: No Base Map is Available (Initial Condition):

For a Look-aside MAP, once the MAP has sufficient number of vehicle (say e.g. 100) traversals on each of its lanes, consider it for further calculations.

Once the above limit is reached, execute a Map-matching of vehicles with Look-aside MAP, and determine the match percentage or ratio. Average the matching percentage for all the vehicles.

If the Match-percentage is high (say e.g. above 99%), upgrade the Look-aside database at that instant to Base-MAP.

Case 2: Base Map is Available (Updating Condition):

Compare the Base Map with Look-aside MAP for following differences:

Lateral distance shifts in the Waypoints of the lane:
Ignore them if the shift is less than $D_s$, e.g. 20 cm, or a threshold distance.

In one embodiment, $D_s$ is defined e.g. based on lane width or average vehicle length or width, or based on $D_w$. For example, $D_s$ is set equal to $D_w$.

In one embodiment, $D_s$ is adjusted based on historical data, or corrected by human expert periodically.

Connection lane changes: Changes in possible maneuver codes of the lane and the connected lane lists.

Change in Signal-Phase matching.

In case the changes in the Base-Map and Look-aside Map are considerable (above a threshold), and base Map is failing to provide high-Map-matching results, while Look-aside MAP is able to provide high MAP-Matching results, consider upgrading Look-aside MAP in the following criteria:

Manual override is detected for upgrading existing Look-aside MAP.

The difference is seen consistently for more than e.g. a Day, or a specific time period $T_C$, and there are sufficient numbers of vehicles, $N_V$ (say e.g. 1000), in each of the lanes, for proper statistics and analysis. Cherry pick these differences and update them in Base-Map.

Decreasing Computations and Increasing Confidence in MAP-Generations: (See FIG. 40)

Some minimal information, when available, could be manually fed to the system allowing the system to identify vehicle movements accurately and generate better results, in a shorter time period. For example:

Approach Count, and Approach names

Lane numbers in each Approach and Lane-widths

Cross-Walks

Traffic controller-information (to which system to poll and get results)

Approximate intersection-Diamond region dimensions, or average/typical of those dimensions from other locations Safety Consideration:

Detecting an idle vehicle (or Breakdown vehicle or accident vehicle or a closed lane) and share the location of this vehicle with other vehicles make this concept of map extend, to have a safety attribute.

Figure 18:
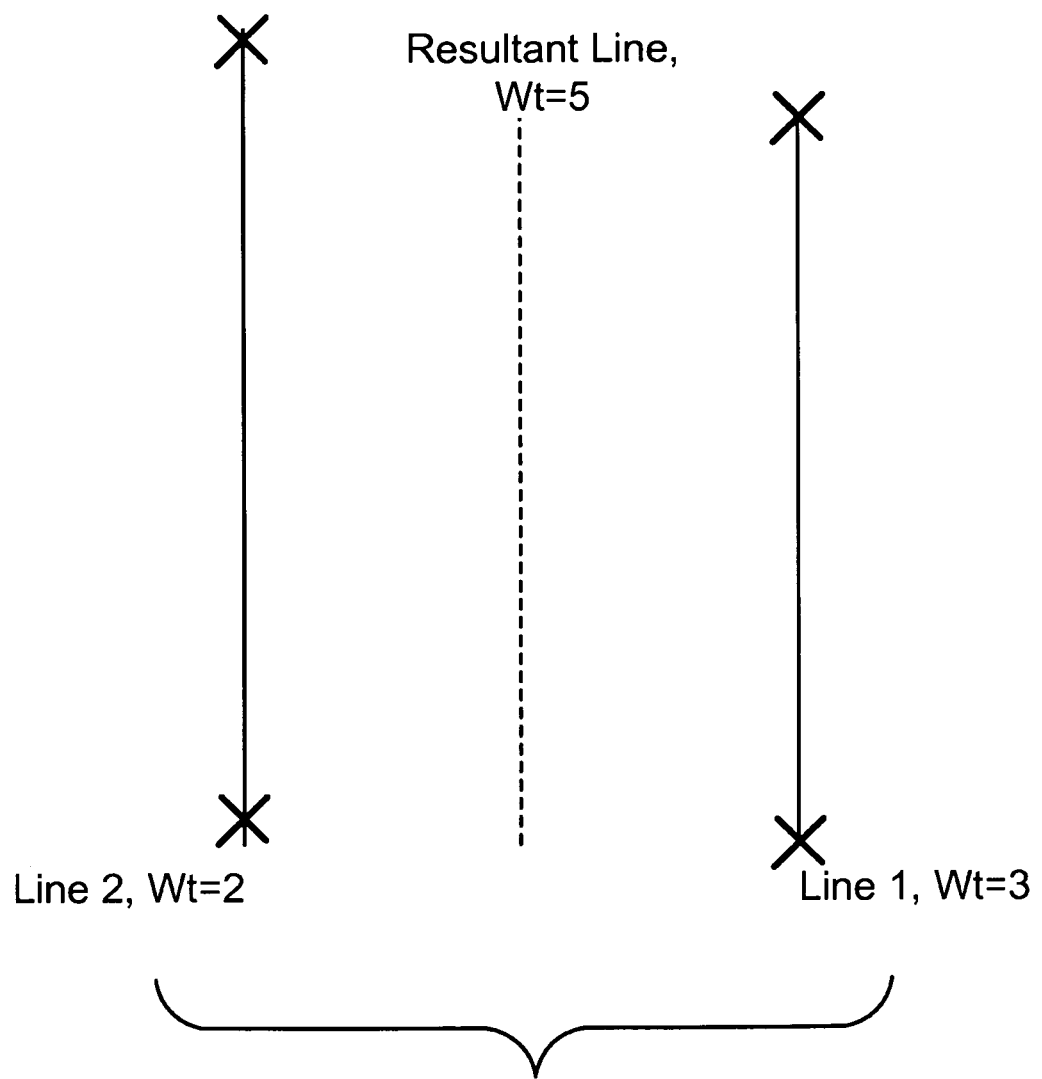
FIG. 18 is for one embodiment of the invention, for step 1, generating lanes.
Figure 19:
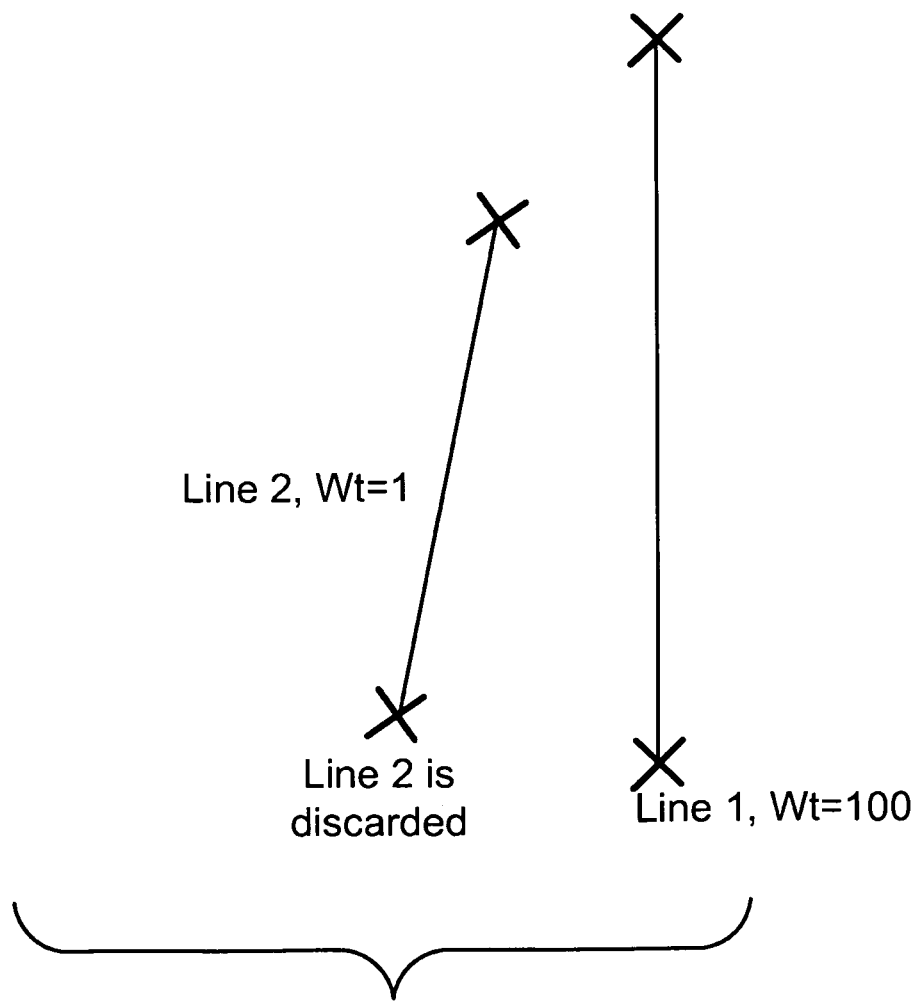
FIG. 19 is for one embodiment of the invention, for step 1, generating lanes.
Figure 20:
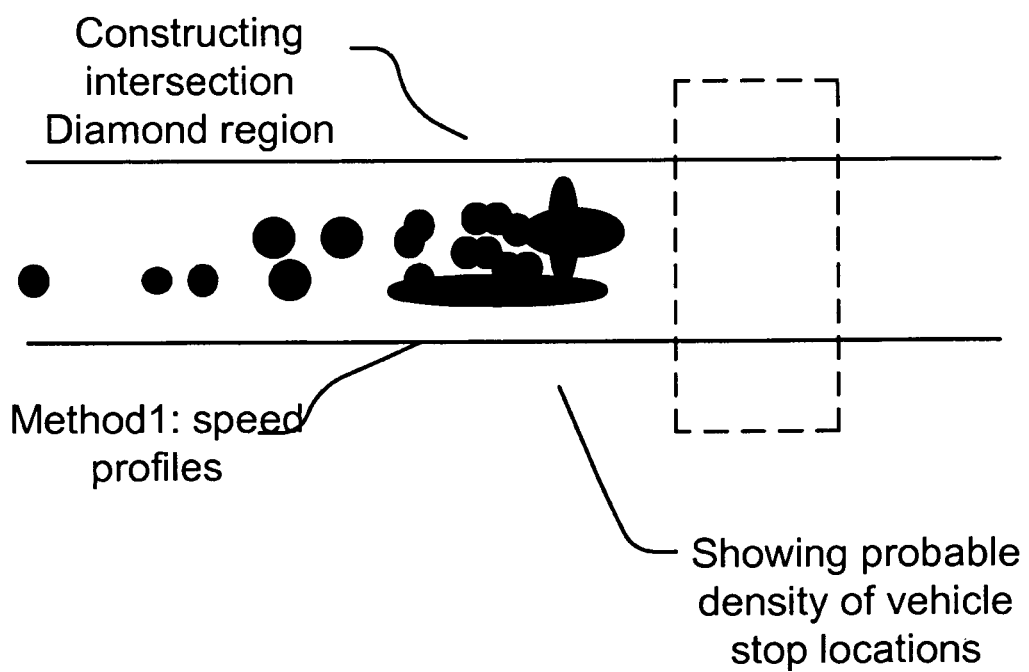
FIG. 20 is for one embodiment of the invention, for step 2, Method 1, constructing Intersection (INTX) Diamond Region.
Figure 21:
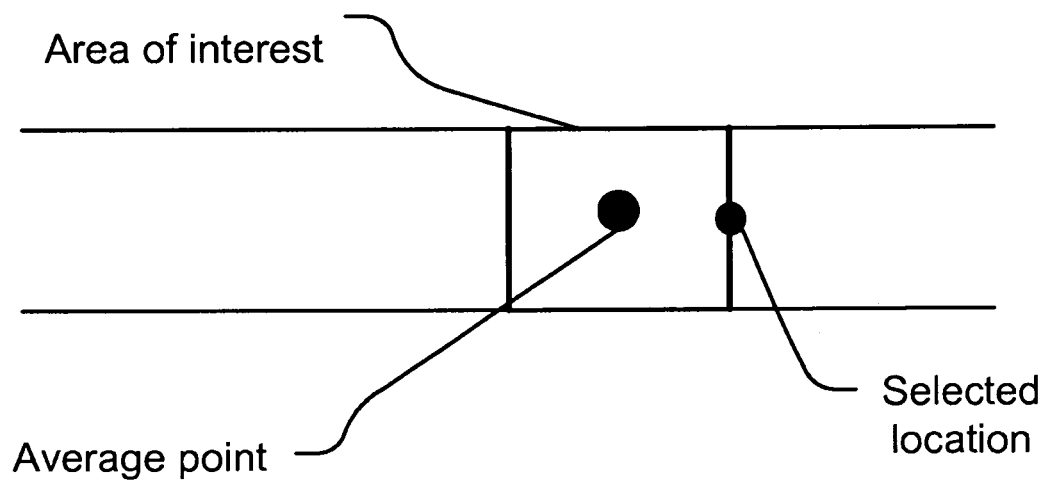
FIG. 21 is for one embodiment of the invention, for step 2, Method 1, constructing INTX Diamond Region.
Figure 22:
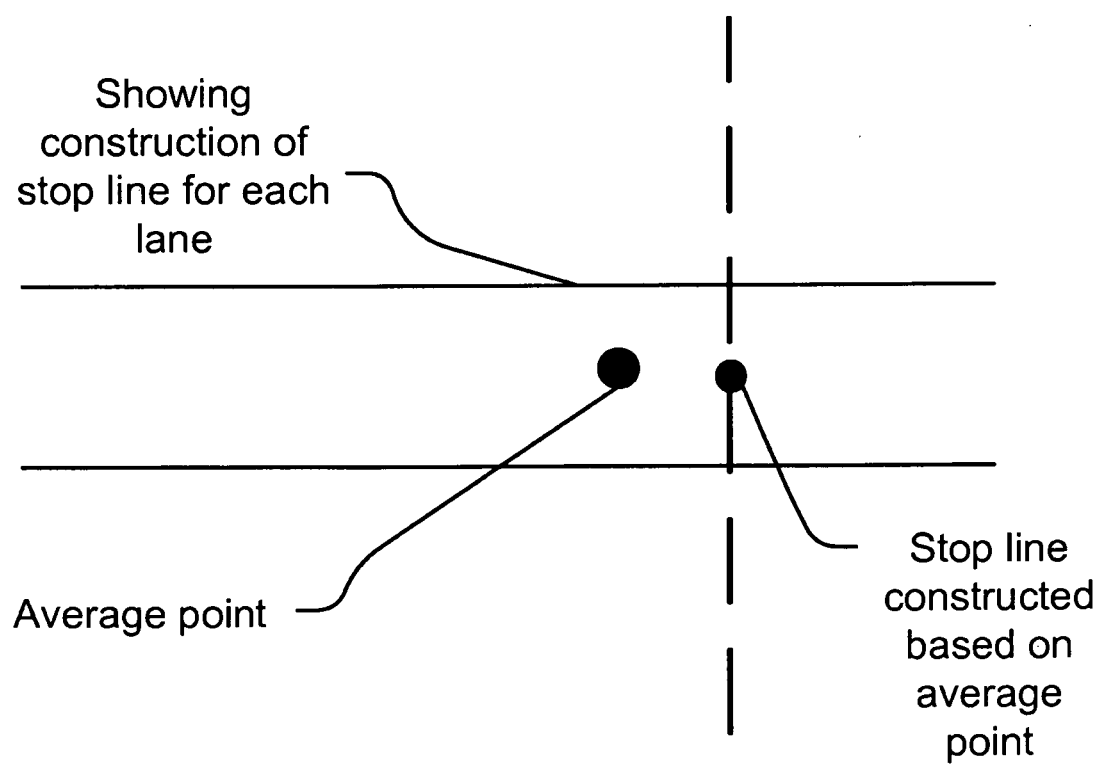
FIG. 22 is for one embodiment of the invention, for step 2, Method 1, constructing INTX Diamond Region.
Figure 23:
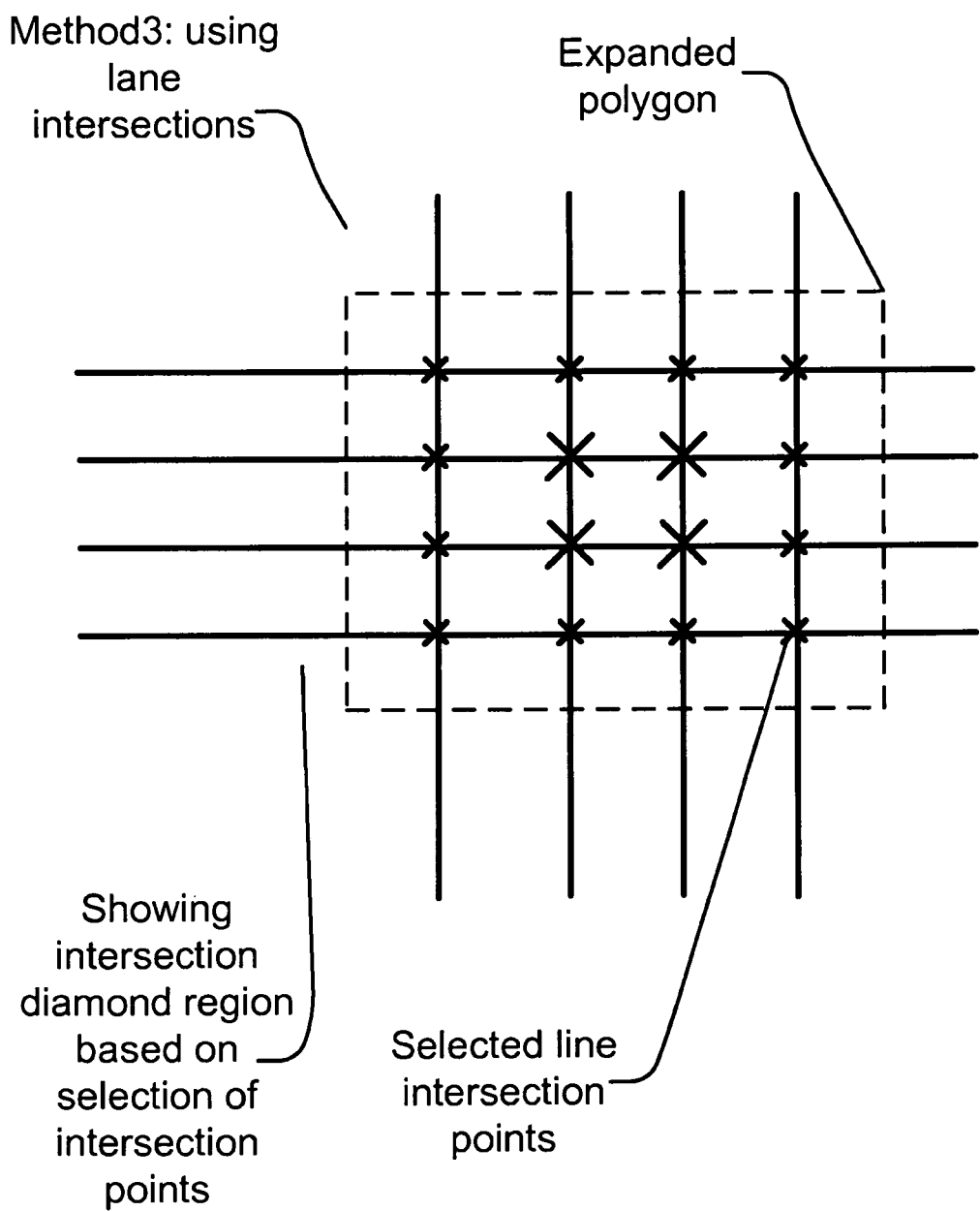
FIG. 23 is for one embodiment of the invention, for step 2, Method 3, using lane intersections.
Figure 24:
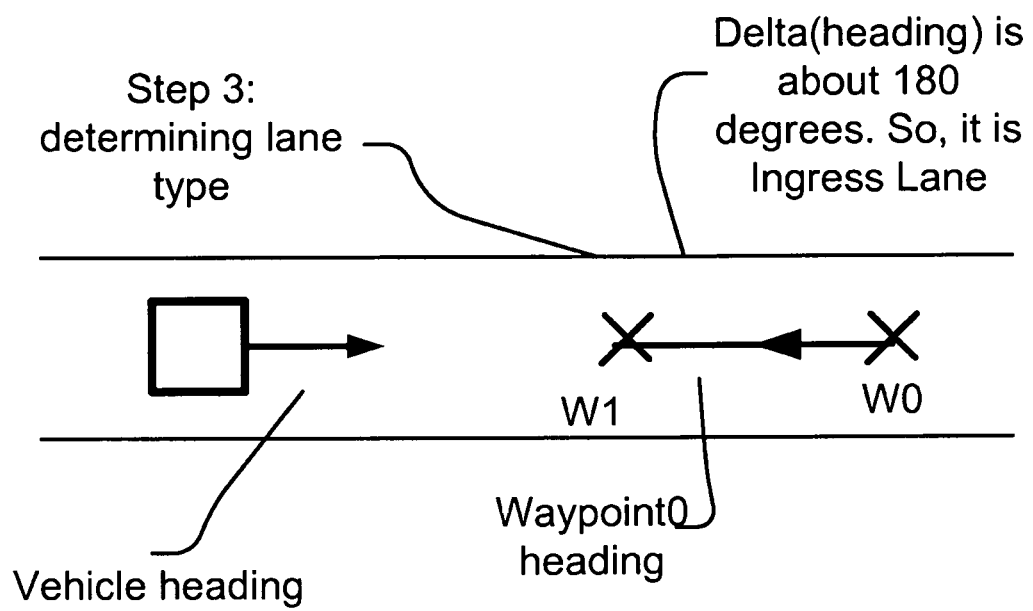
FIG. 24 is for one embodiment of the invention, for step 3, determining lane type.
Figure 25:
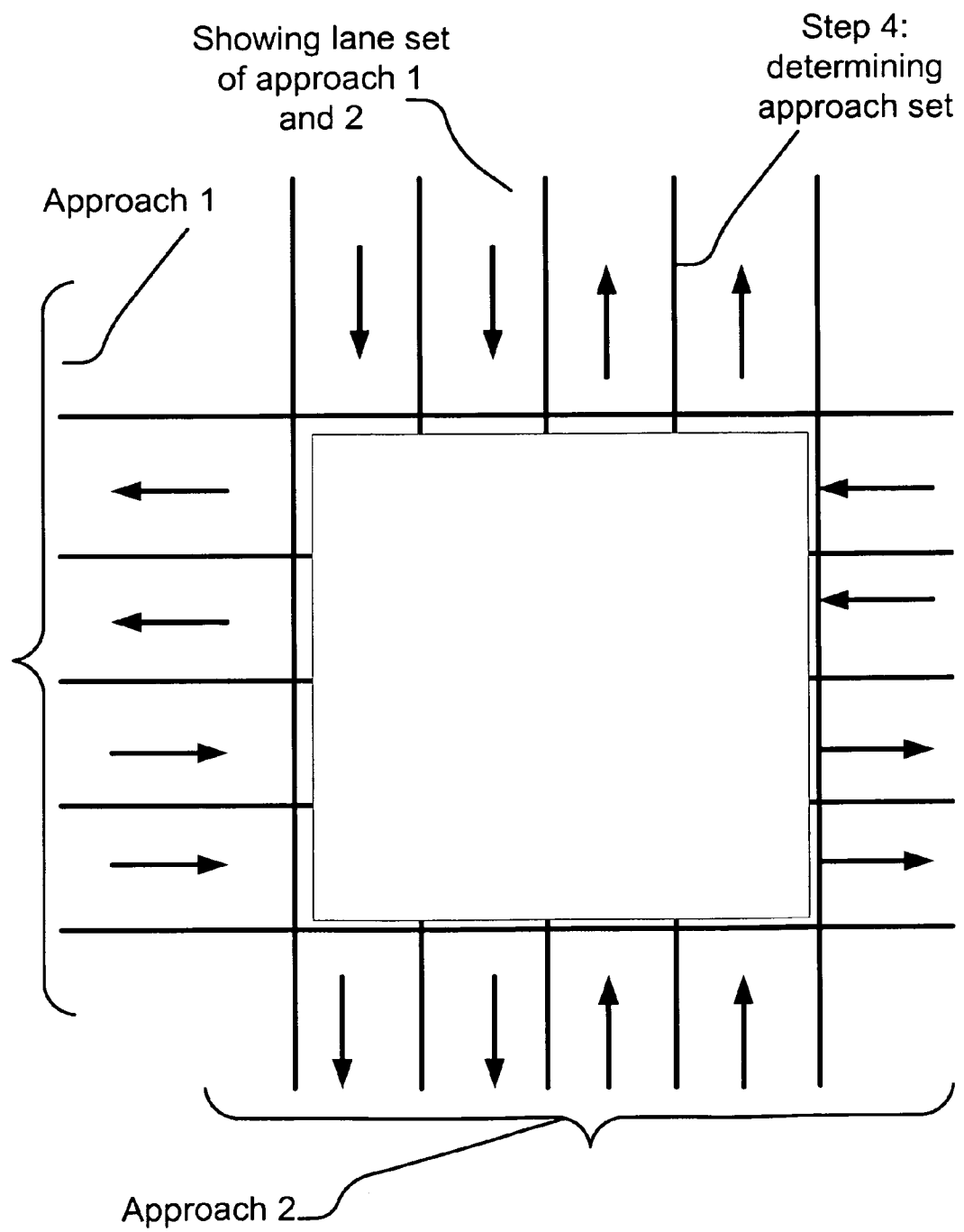
FIG. 25 is for one embodiment of the invention, for step 4, determining approach set.

FIG. 18 is for one embodiment of the invention, for step 1, generating lanes. FIG. 19 is for one embodiment of the invention, for step 1, generating lanes. FIG. 20 is for one embodiment of the invention, for step 2, constructing INTX Diamond Region. FIG. 21 is for one embodiment of the invention, for step 2, constructing INTX Diamond Region. FIG. 22 is for one embodiment of the invention, for step 2, constructing INTX Diamond Region. FIG. 23 is for one embodiment of the invention, for Method 3, using lane intersections. FIG. 24 is for one embodiment of the invention, for step 3, determining lane type. FIG. 25 is for one embodiment of the invention, for step 4, determining approach set.

Figure 26:
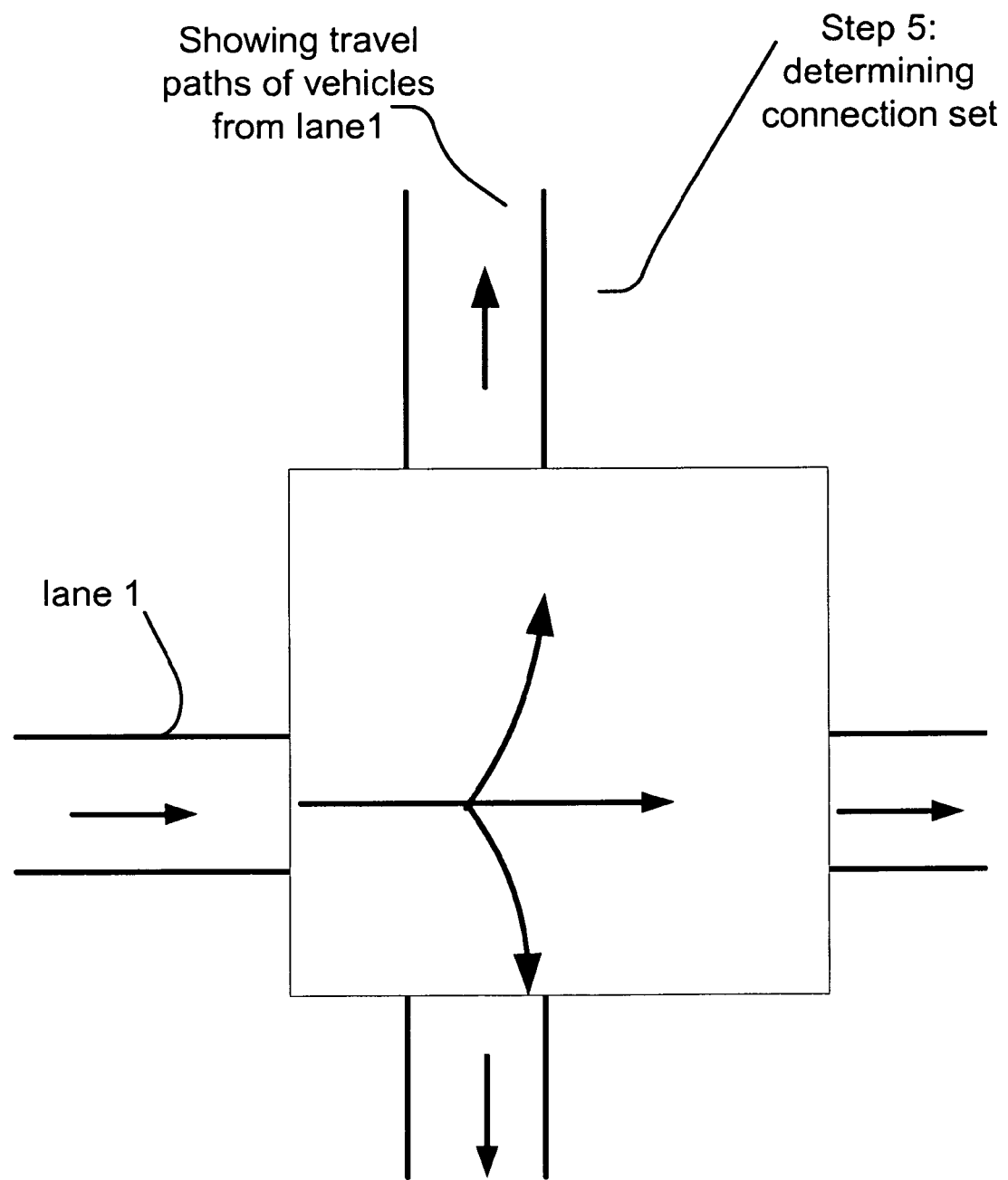
FIG. 26 is for one embodiment of the invention, for step 5, determining connection set.
Figure 27:
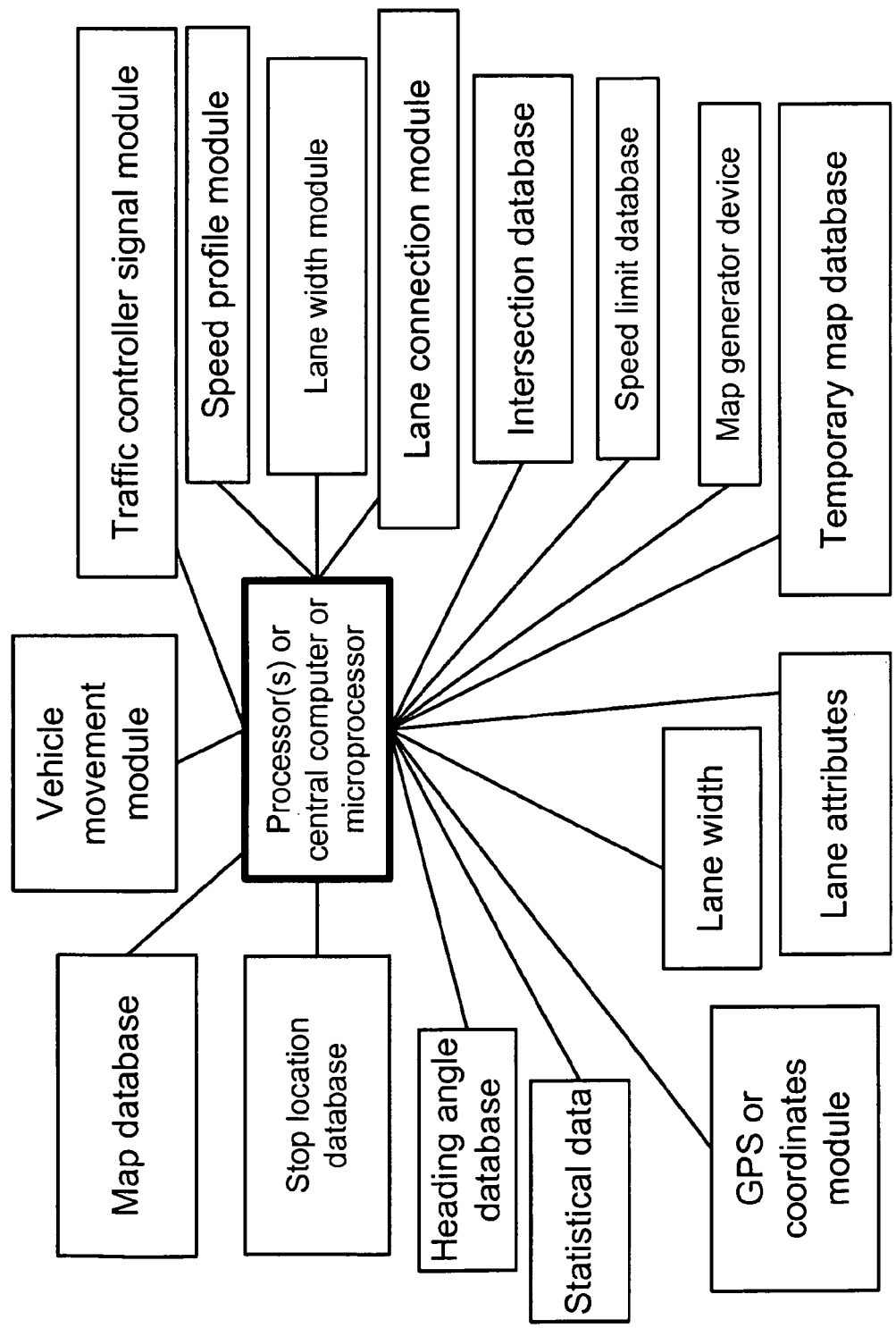
FIG. 27 is for one embodiment of the invention, for a system of creating, storing, and updating local dynamic MAP database with safety attribute.
Figure 28:
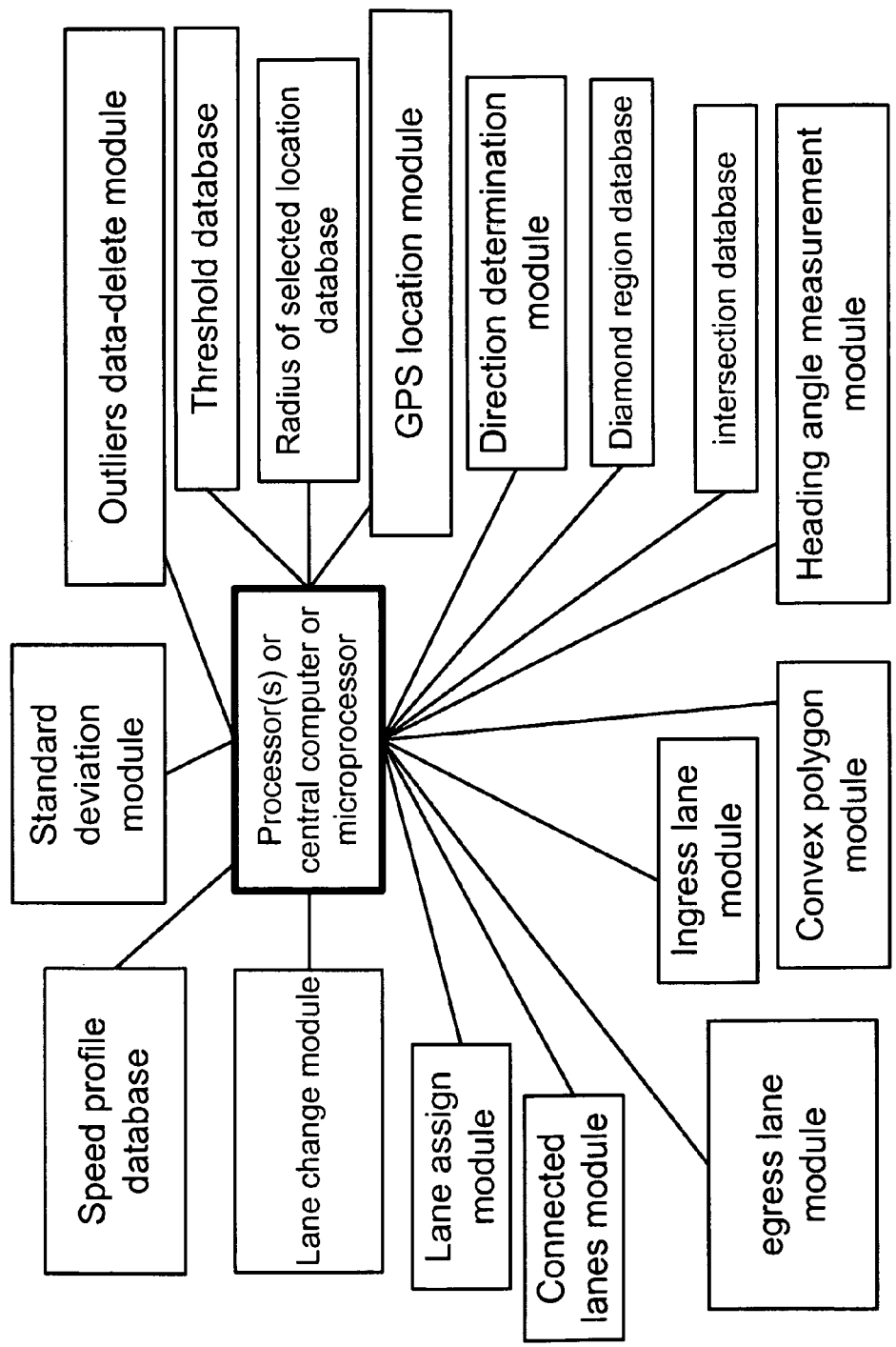
FIG. 28 is for one embodiment of the invention, for a system of creating, storing, and updating local dynamic MAP database with safety attribute.

FIG. 26 is for one embodiment of the invention, for step 5, determining connection set. FIG. 27 is for one embodiment of the invention, for a system of creating, storing, and updating local dynamic MAP database with safety attribute. FIG. 28 is for one embodiment of the invention, for a system of creating, storing, and updating local dynamic MAP database with safety attribute.

Figure 29:
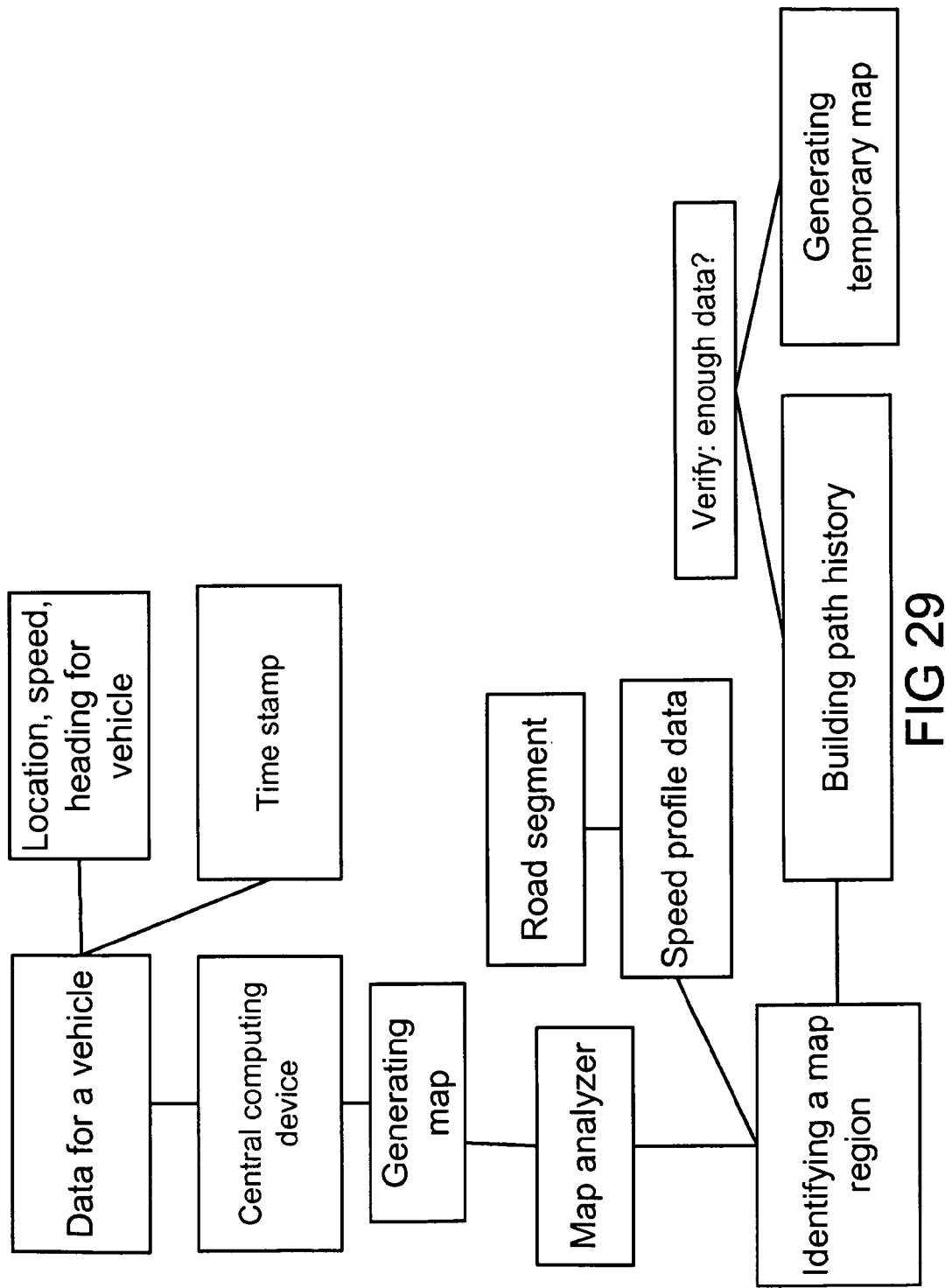
FIG. 29 is for one embodiment of the invention, for a system of map generation. It generates maps using vehicle data such as location, speed, and heading, along with time stamp.

FIG. 29 is for one embodiment of the invention, for a system of map generation. It generates maps using vehicle data such as location, speed, and heading, along with time stamp. It identifies map region using speed profile data collected on each road segment. It builds path history for each vehicle data. It generates temporary map when enough data is captured.

Figure 30:
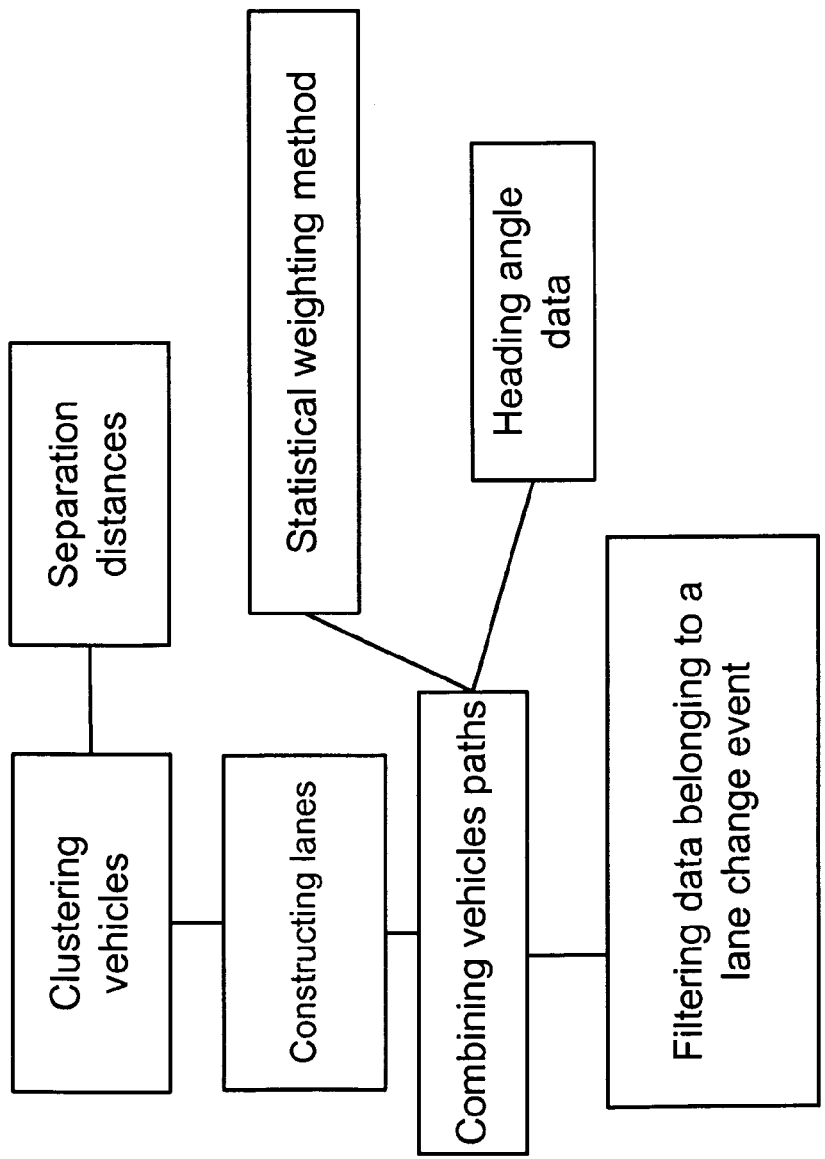
FIG. 30 is for one embodiment of the invention, for a system of lane generation. It constructs lanes by clustering vehicles path and combining vehicle paths inside the clusters.

FIG. 30 is for one embodiment of the invention, for a system of lane generation. It constructs lanes by clustering vehicles path and combining vehicle paths inside the clusters. It clusters vehicle paths using separation distance. It combines vehicle path using statistical weighting method. It combines vehicle path using heading angle data. It filters the data that belongs to lane change event.

Figure 31:
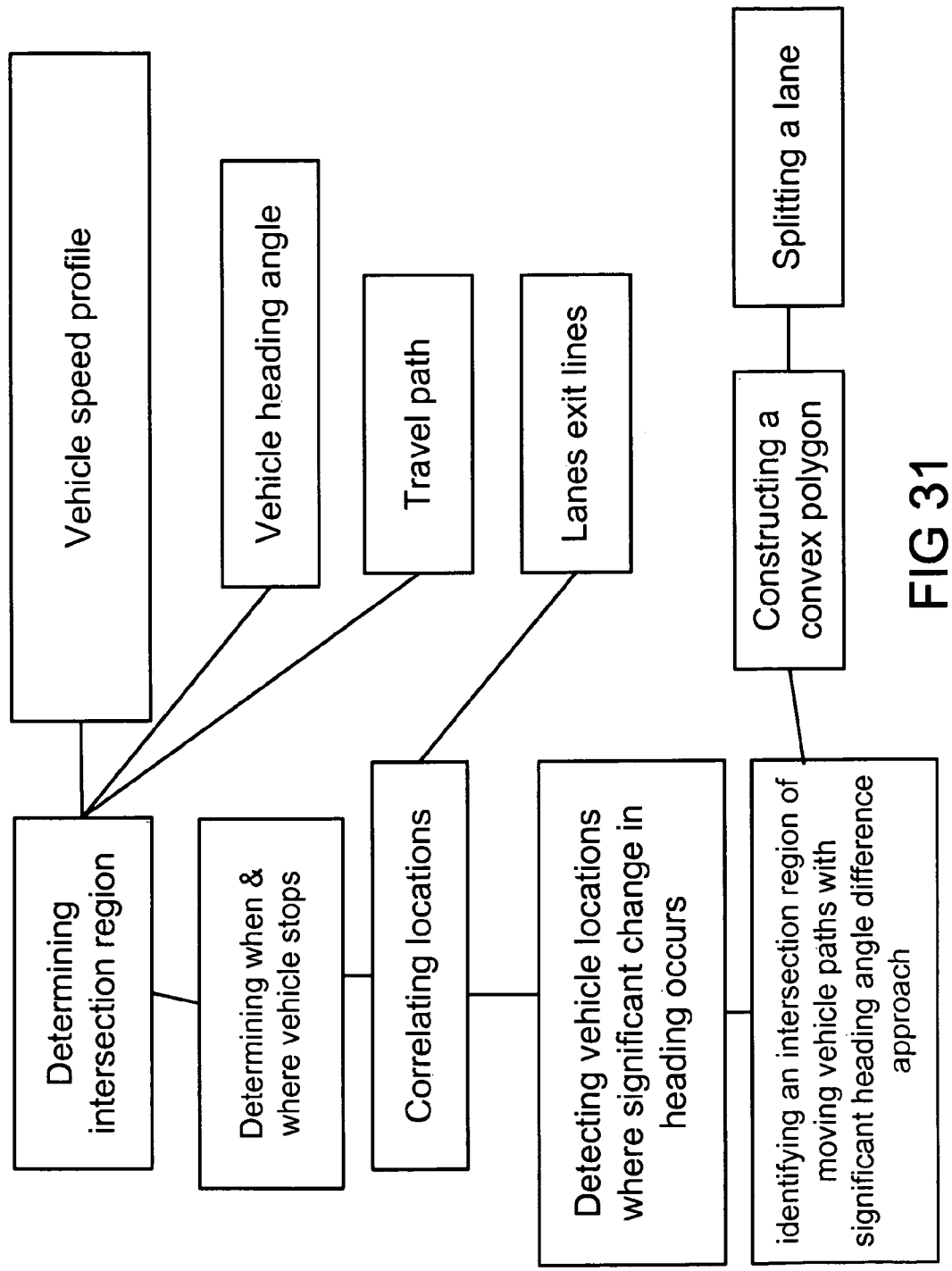
FIG. 31 is for one embodiment of the invention, for a system of determining intersection and lanes splitting. It determines intersection region using vehicles speed profiles, vehicles heading angles, and vehicles travel path intersects.

FIG. 31 is for one embodiment of the invention, for a system of determining intersection and lanes splitting. It determines intersection region using vehicles speed profiles, vehicles heading angles, and vehicles travel path intersects. It detects when and where vehicles have stopped. Stopped vehicles locations are correlated with the lanes exit lines. It detects vehicle locations where significant change in the heading has occurred. It identifies intersection region of moving vehicle paths with significant heading angle difference approach. It constructs convex polygon. It splits lane using the polygon region.

Figure 32:
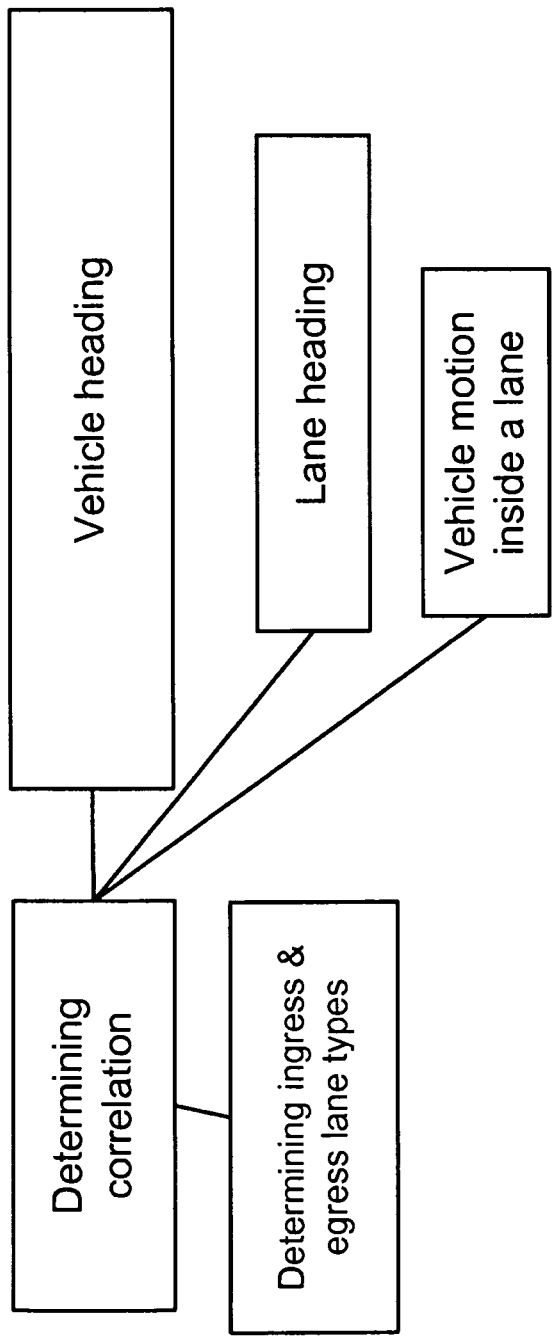
FIG. 32 is for one embodiment of the invention, for a system of determining Lane type (Ingress/Egress).

FIG. 32 is for one embodiment of the invention, for a system of determining Lane type (Ingress/Egress). It determines "Ingress/Egress" lane type using correlation between vehicle heading and lane heading, and vehicle motion inside the lane.

Figure 33:
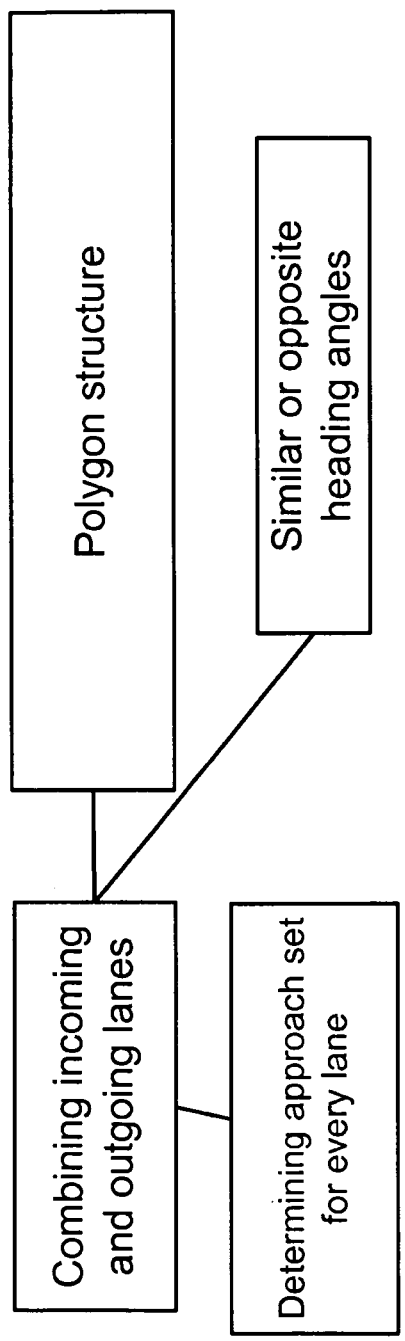
FIG. 33 is for one embodiment of the invention, for a system of determining the approach set for every lane.

FIG. 33 is for one embodiment of the invention, for a system of determining the approach set for every lane. It determines the approach set for every lane by combining the incoming and outgoing lanes that fall on one side of the polygon and have similar or opposite heading angle.

Figure 34:
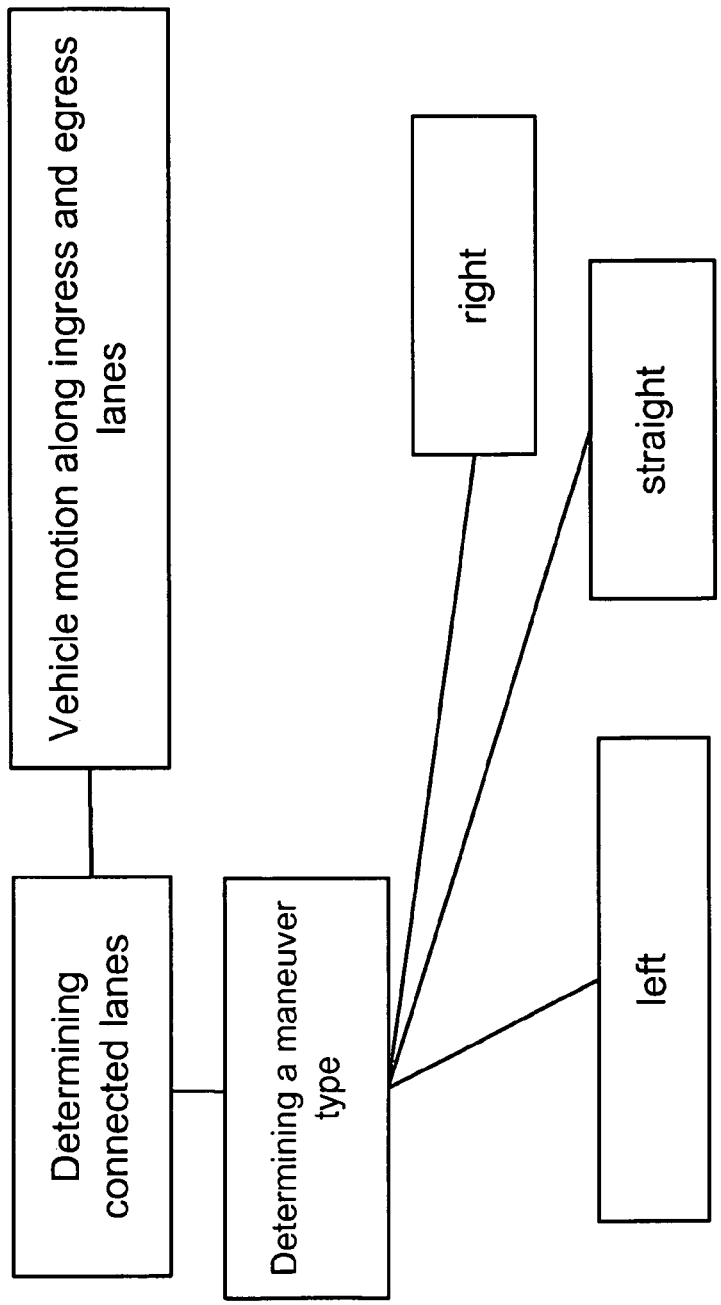
FIG. 34 is for one embodiment of the invention, for a system of determining connecting lanes and movement state for ingress lane.

FIG. 34 is for one embodiment of the invention, for a system of determining connecting lanes and movement state for ingress lane. It determines connected lanes by observing vehicles motion along ingress and egress lane. It determines the maneuver type to go between ingress and egress (left/right/straight).

Figure 35:
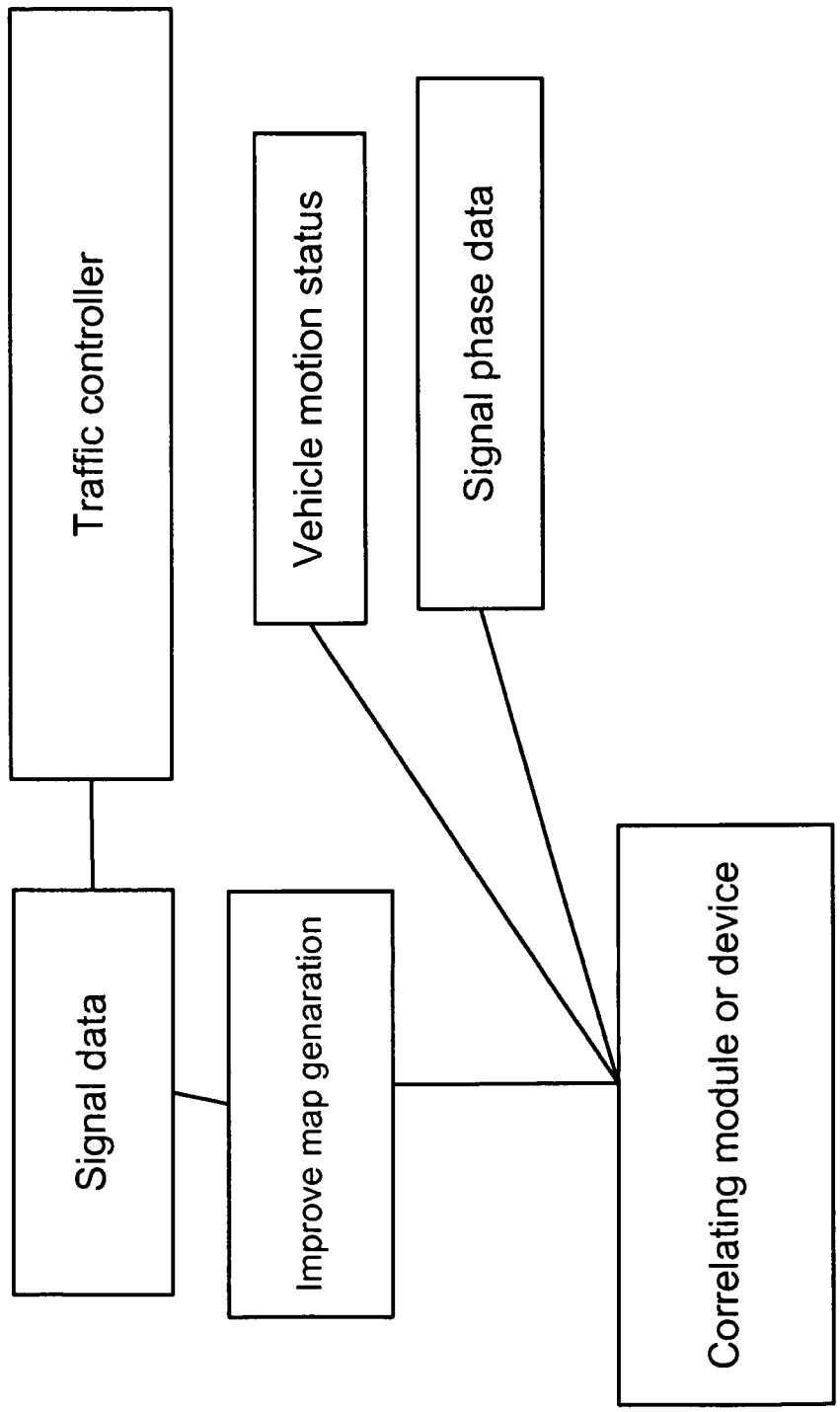
FIG. 35 is for one embodiment of the invention, for a system of MAP Generation. Improved map generation uses signal data available from traffic controller.

FIG. 35 is for one embodiment of the invention, for a system of MAP Generation. Improved map generation uses signal data available from traffic controller. It correlates the traffic controller signal phase data with the vehicle motion status (e.g., as: "is going to stop", "has stopped", "is moving from stop", "moving", and etc.).

Figure 36:
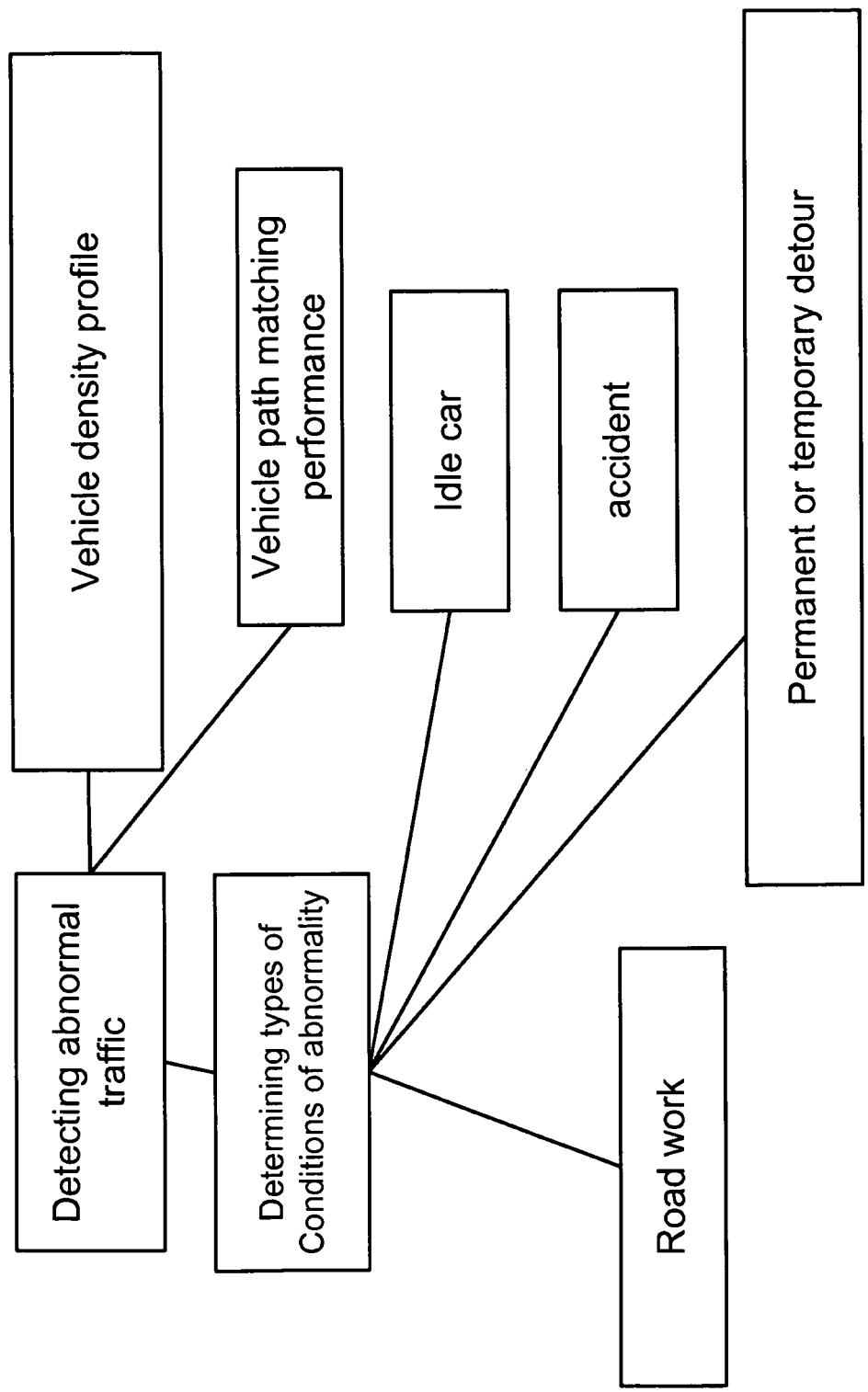
FIG. 36 is for one embodiment of the invention, for a system of Map maintenance. Abnormal traffic condition is detected by observing the vehicle density profile and the vehicle path matching performance.

FIG. 36 is for one embodiment of the invention, for a system of Map maintenance. Abnormal traffic condition is detected by observing the vehicle density profile and the vehicle path matching performance. Different types of conditions that cause the abnormality are detected, such as idle vehicle, accident, work zone, or even a permanent or temporary change in the road.

Figure 37:
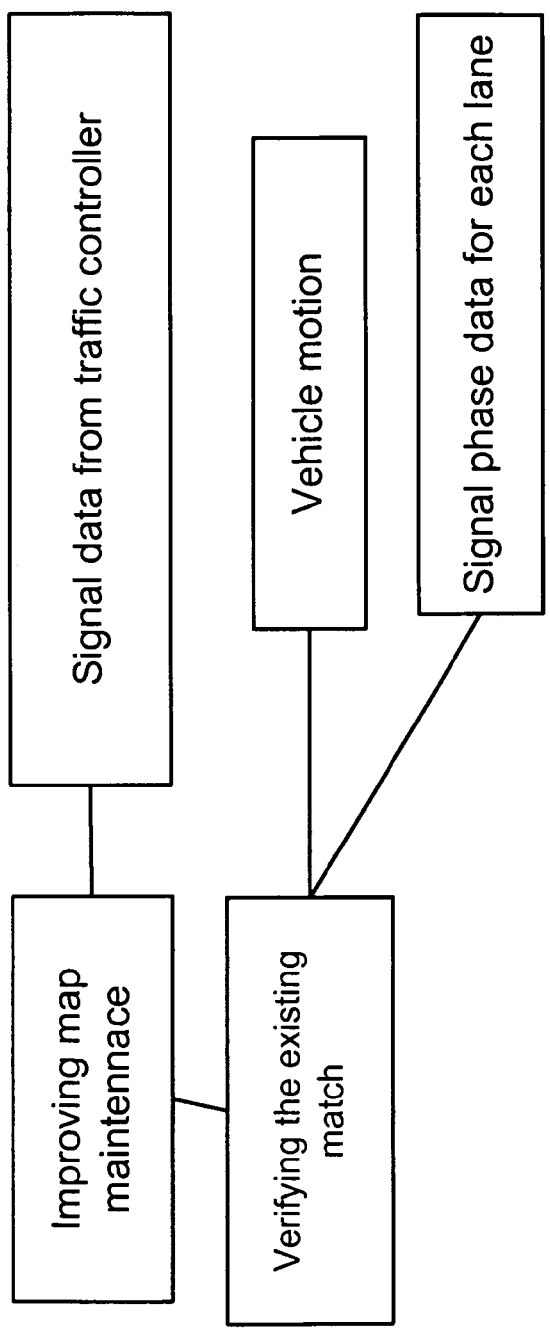
FIG. 37 is for one embodiment of the invention, for a system of Map maintenance. Improved map maintenance uses signal data from traffic controller.

FIG. 37 is for one embodiment of the invention, for a system of Map maintenance. Improved map maintenance uses signal data from traffic controller. It verifies that existing matching between vehicle motion and signal phase data for each lane is still the same.

Figure 38:
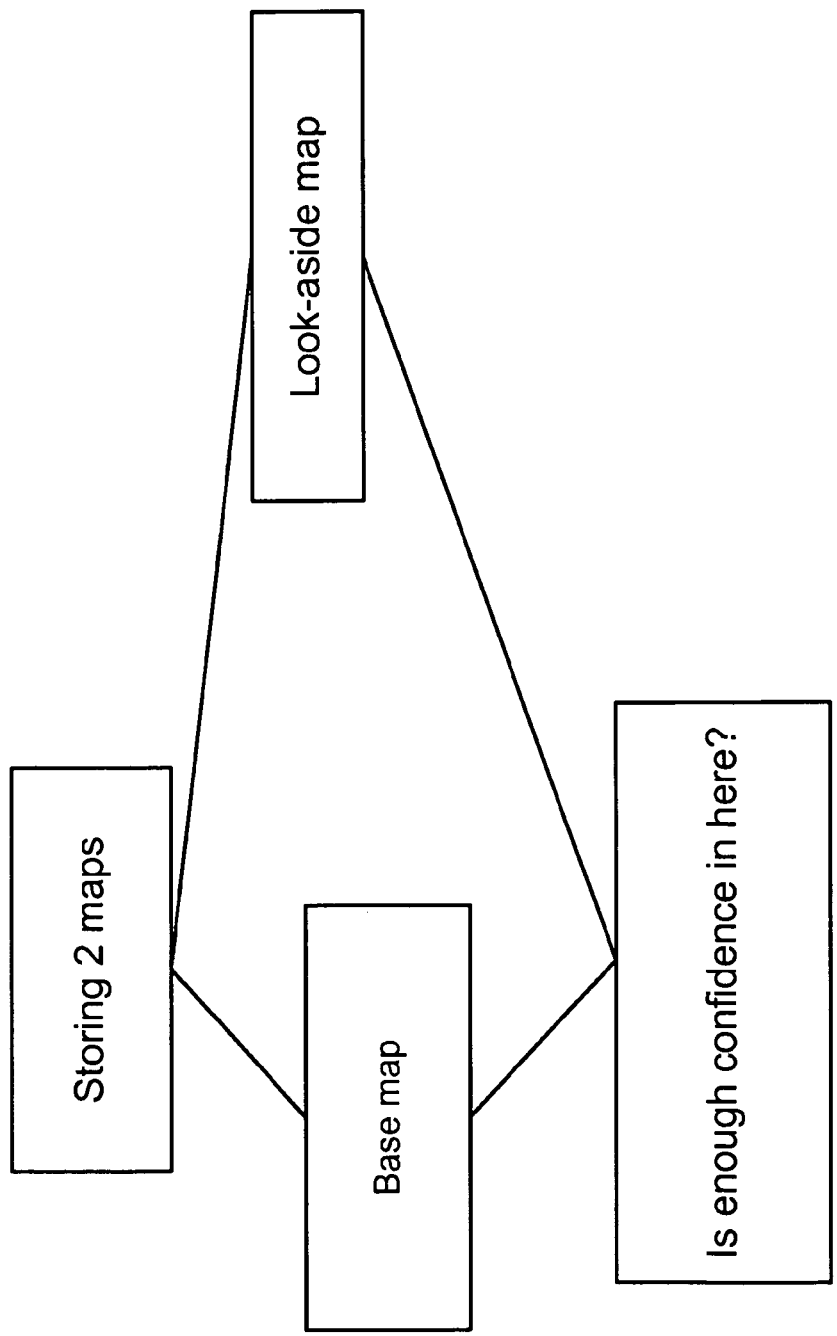
FIG. 38 is for one embodiment of the invention, for a system of Map publishing, storing, and updating mechanism.

FIG. 38 is for one embodiment of the invention, for a system of Map publishing, storing, and updating mechanism. Two maps are stored: base map and look aside map. At initialization, no base map is available. Look aside map can be moved to base map when enough confidence is built. The look aside replaces the corresponding part of the base map when its confidence level becomes better than the base map.

Figure 39:
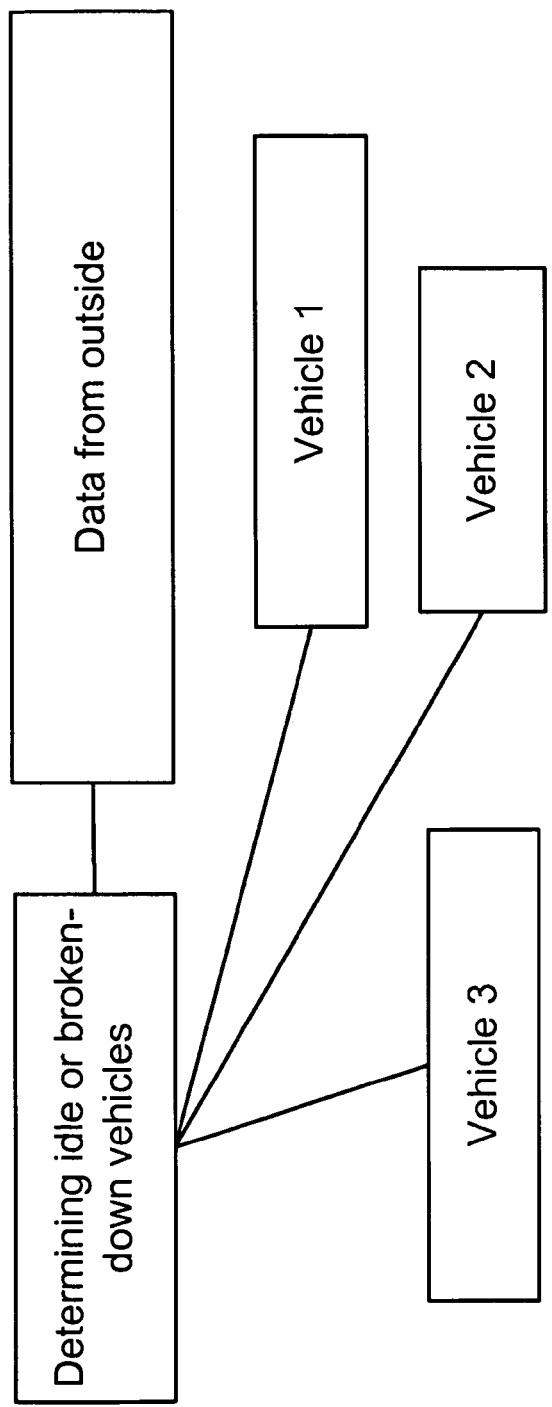
FIG. 39 is for one embodiment of the invention, for a system of Safety Consideration.

FIG. 39 is for one embodiment of the invention, for a system of Safety Consideration. It detects an idle vehicle (breakdown vehicle) and shares the location of this vehicle with other vehicles, for map, to have a safety attribute.

An embodiment of the invention is a method for creating, storing, and updating local dynamic map database with safety attribute, for a street or highway, said method comprising: a central computer receiving speed profiles from vehicles in said street or highway from an input device; an analyzer module or device determining vehicular density for said vehicles in said street or highway; an identifier module or device determining lane attributes for a lane in said street or highway; receiving traffic controller data for said street or highway; integrating said traffic controller data for said street or highway into map data; identifying temporary and permanent changes in said map data; updating said map data; and identifying an obstacle of mobility attribute in said map data.

An embodiment of the invention is one of the following:
identifying intersections for said street or highway.
identifying an idle vehicle in said street or highway.
identifying an accident in said street or highway.
using a short range communication device.
using an on-board device in a car.
using a road side equipment.
determining a status of said traffic controller data.
determining a correlation with a status of said traffic controller data.
storing said map data.
generating a basic safety message.
storing location, heading, and speed of a car.
storing a time-stamp for a basic safety message.
checking an accuracy of past history points.
generating lanes for said street or highway.
combining paths for said street or highway.
using statistical analysis for paths.
using weights for paths.
detecting a lane change event.
filtering outlier samples in statistical analysis.

In one embodiment, the map can be generated in a central processor. In one embodiment, the map can be generated in distributed processors, and later merged together as one map. The advantage of the distributed-processors method is that if for any reason the communication or the processing is interrupted, the other processors can partially supply the data for the vehicles, for navigation and operation. In one embodiment, the processor is mobile itself, e.g., installed in a car, satellite, drone, balloon, or airplane. In one embodiment, the processor is stationary, at a fixed location. In one embodiment, the processor network manages the map, e.g., in a server farm.

In one embodiment, each server covers one part of the city or area. In one embodiment, the geographical areas have overlaps for coverage. In one embodiment, there are redundancies between coverage of different units. In one embodiment, there is a correction based on the redundancies between coverage of different units, to find and filter out the erroneous data. In one embodiment, there is an averaging process based on the redundancies between coverage of different units, to average the data for more accurate results. In one embodiment, there is a weighted-averaging process based on the redundancies between coverage of different units, to weighted-average the data for more accurate results, with more weights for the more reliable units or sources, or higher weights for the results that are closer to the center of curve representing the distribution of values, i.e., eliminating or reducing the fringe results or erroneous data.

In one embodiment, we have data distributed and sold to a third party subscribing to our service and data flow, as updates and feed, so that they can manage the traffic or control cars or analyze the data for marketing purposes or finding the trends. For example, from the traffic patterns, one can conclude that how many cars are going to the new mall or store and how long they stay at that mall in average, in terms of hours, and at what hours or which days, which will help the mall to plan for marketing and sales, e.g., to order merchandise in advance for specific people or specific time or season. In addition, from the traffic pattern, one can conclude that which areas or streets are most likely the source of cars to a specific mall or region, statistically, so that from the social or income data from a target neighborhood, one can find the social or income level of people likely going to a specific mall, and at what time during the day, as a probability distribution, so that the average, or median, or aggregate, or expected value, or standard deviation can be extracted or estimated for each parameter under study, e.g., income level or average age or gender, e.g., a stay-home or vacationing parent driving to mall during day time on weekdays (e.g., not working at an office or regular job or vacationing, so that have enough time during the day to go to mall during weekdays and non-holidays). Such estimates and statistics for patterns or behaviors for people are very valuable for marketing and sales people who want to predict and plan ahead. Thus, they buy these data and analyze and extract patterns from them for their specific purposes.

Another purpose or usage for such data is for traffic planning or city expansion planning or metro rail planning for future, e.g., to remove congestion or reduce traffic around main roads or plan for gas stations or malls or office buildings or metro stations or train stations, or estimate the trend for population growth or movement or concentration throughout the years, by comparing such traffic data in time, e.g., to plan schools for future for a district. Aggregate and trend and direction results are very useful and valuable for people in charge or decision makers for all of the private and public sectors. For example, for heavily congested and concentrated intersections and roads, the real estate market and values may go up, due to demand for commercial space and office space. Or, the parking fee rate per hour or per day may go up, due to the demand or shortage for parking space, at least during the time that are the peak for traffic, from our data collected for various times and regions.

Here, we describe some of our embodiments/examples, as components of our system:

Map Generation: (See FIG. 29)
It generates maps using vehicle data such as location, speed, and heading, along with time stamp.
It identifies map region using speed profile data collected on each road segment.
It builds path history for each vehicle data.
It generates temporary map when enough data is captured.

Generating Lanes: (See FIG. 30)
It constructs lanes by clustering vehicles path and combining vehicle paths inside the clusters.
It clusters vehicle paths using separation distance.
It combines vehicle path using statistical weighting method.
It combines vehicle path using heading angle data.
It filters the data that belongs to lane change event.

Determining Intersection and Lanes Splitting: (See FIG. 31)
It determines intersection region using vehicles speed profiles, vehicles heading angles, and vehicles travel path intersects.
It detects when and where vehicles have stopped.
Stopped vehicles locations are correlated with the lanes exit lines.
It detects vehicle locations where significant change in the heading has occurred.
It identifies intersection region of moving vehicle paths with significant heading angle difference approach.
It constructs convex polygon.
It splits lane using the polygon region.

Determining Lane Type (Ingress/Egress): (See FIG. 32)
It determines "Ingress/Egress" lane type using correlation between vehicle heading and lane heading, and vehicle motion inside the lane.
Determining the Approach Set for Every Lane: (See FIG. 33)
It determines the approach set for every lane by combining the incoming and outgoing lanes that fall on one side of the polygon and have similar or opposite heading angle.
Determining Connecting Lanes and Movement State for Ingress Lane: (See FIG. 34)
It determines connected lanes by observing vehicles motion along ingress and egress lane.
It determines the maneuver type to go between ingress and egress (left/right/straight).
More in MAP Generation: (See FIG. 35)
Improved map generation uses signal data available from traffic controller.
It correlates the traffic controller signal phase data with the vehicle motion status (e.g., as: "is going to stop", "has stopped", "is moving from stop", "moving", and etc.).
Map Maintenance: (See FIG. 36)
Abnormal traffic condition is detected by observing the vehicle density profile and the vehicle path matching performance.
Different type of conditions that causes the abnormality are detected, such as idle vehicle, accident, work zone, or even a permanent or temporary change in the road.
More in Map Maintenance: (See FIG. 37)
Improved map maintenance uses signal data from traffic controller.
It verifies that existing matching between vehicle motion and signal phase data for each lane is still the same.
Map Publishing, Storing, and Updating Mechanism: (See FIG. 38)
Two maps are stored: base map and look aside map.
At initialization, no base map is available. Look aside map can be moved to base map when enough confidence is built.
The look aside replaces the corresponding part of the base map when its confidence level becomes better than the base map.
Safety Consideration: (See FIG. 39)
It detects an idle vehicle (breakdown vehicle) and shares the location of this vehicle with other vehicles, for map, to have a safety attribute.

Description of the Overall System

Figure 2:
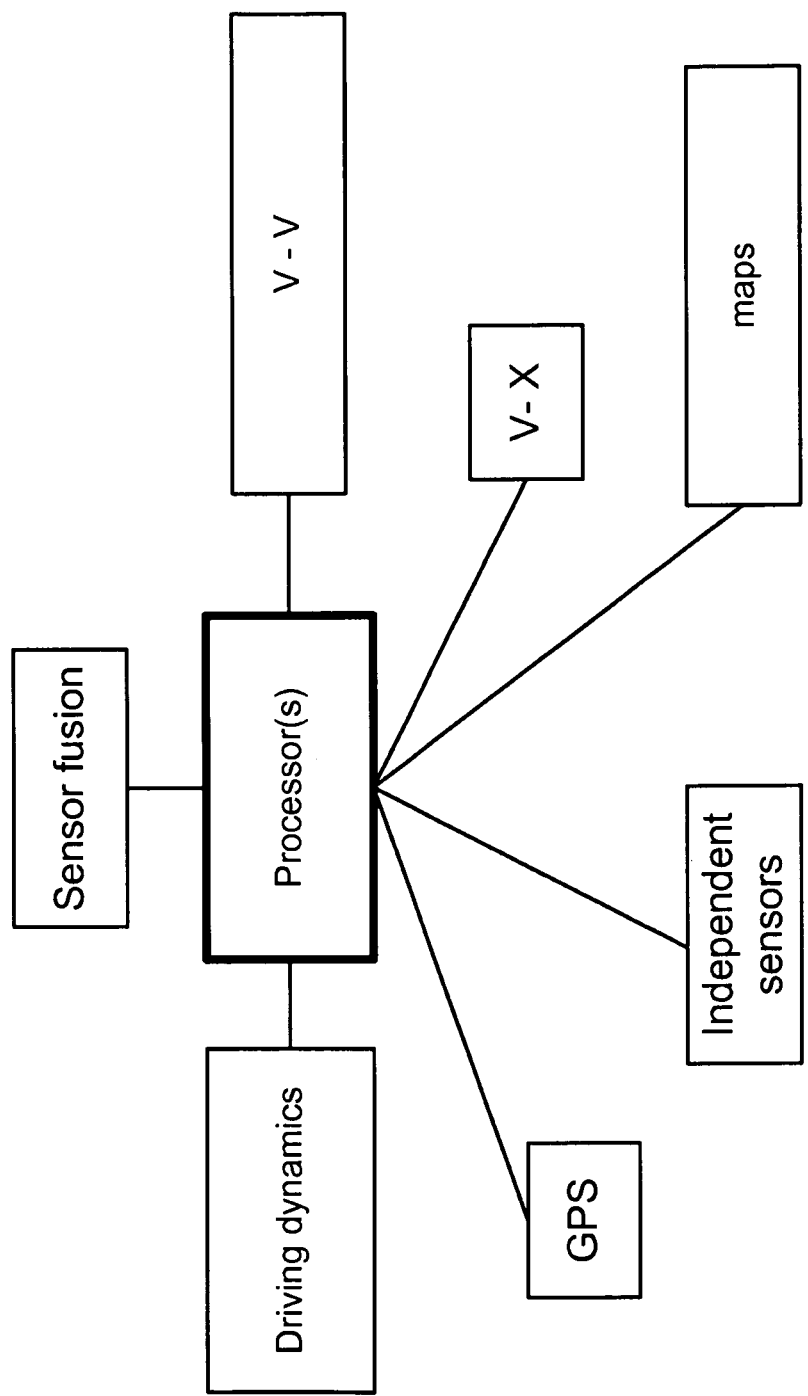
FIG. 2 is for one embodiment of the invention, for a system for automated vehicles.

Here, we describe the overall/general system for some of our embodiments above:

FIGS. 1-9 describe in details the presented automated vehicle system. FIGS. 10-17 explain some embodiments of the current invention. FIG. 1 is for one embodiment, as an example, for representation of development of fully automated vehicles, in stages, for progression toward fully automated vehicles. FIG. 2 is for one embodiment of the invention, for a system for automated vehicles, using GPS, independent sensors, maps, driving dynamics, and sensor fusions and integrations.

Figure 3:
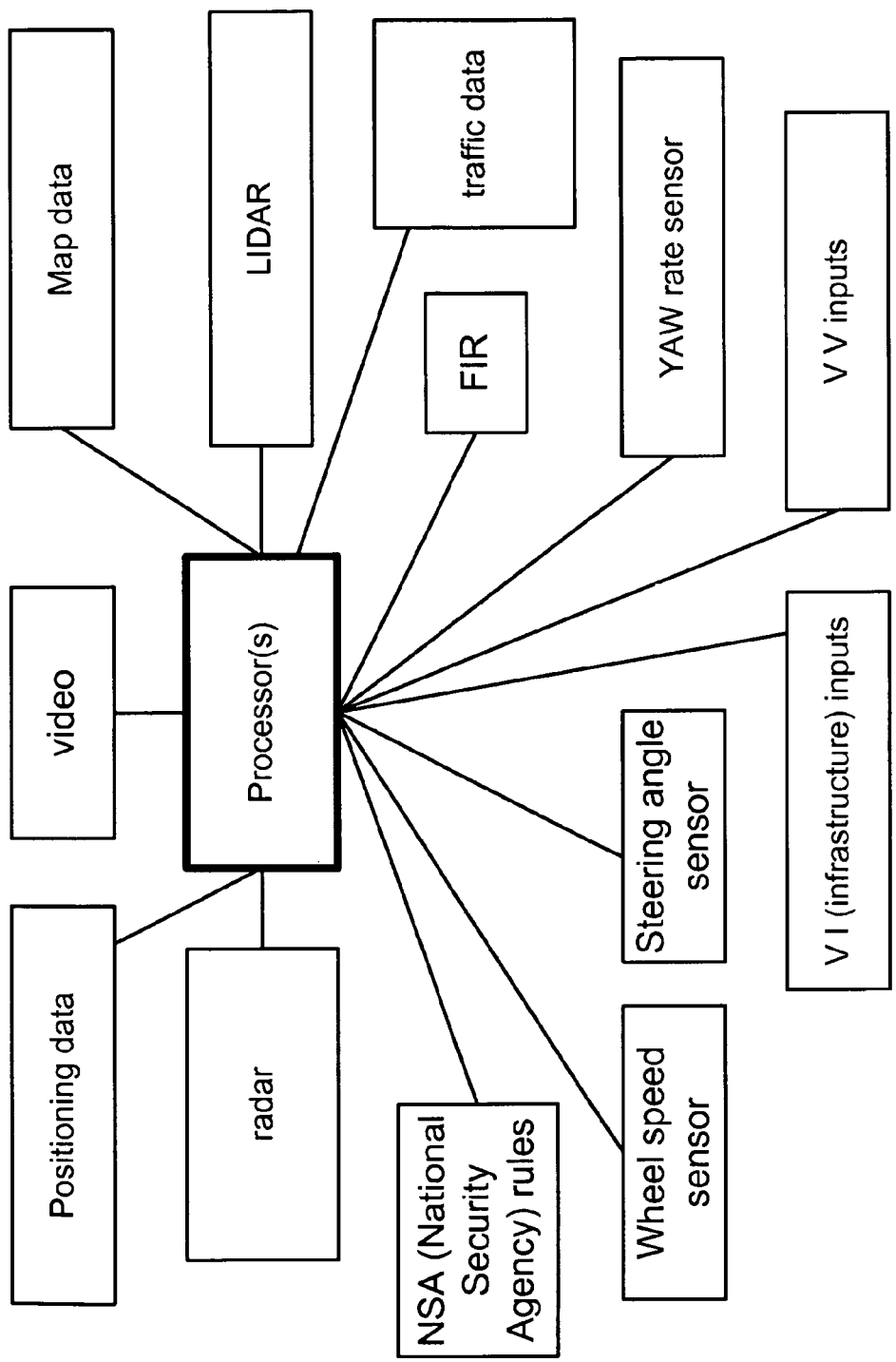
FIG. 3 is for one embodiment of the invention, for a system for automated vehicles.

FIG. 3 is for one embodiment of the invention, for a system for automated vehicles, with different measurement devices, e.g., LIDAR (using laser, scanner/optics, photodetectors/sensors, and GPS/position/navigation systems, for measuring the distances, based on travel time for light), radar, GPS, traffic data, sensors data, or video, to measure or find positions, coordinates, and distances. The government agencies may impose restrictions on security and encryption of the communications and data for modules and devices within the system, as the minimum requirements, as the hackers or terrorists may try to get into the system and control the vehicles for a destructive purpose. Thus, all of the components are based on those requirements imposed by the US or other foreign governments, to comply with the public safety.

Figure 4:
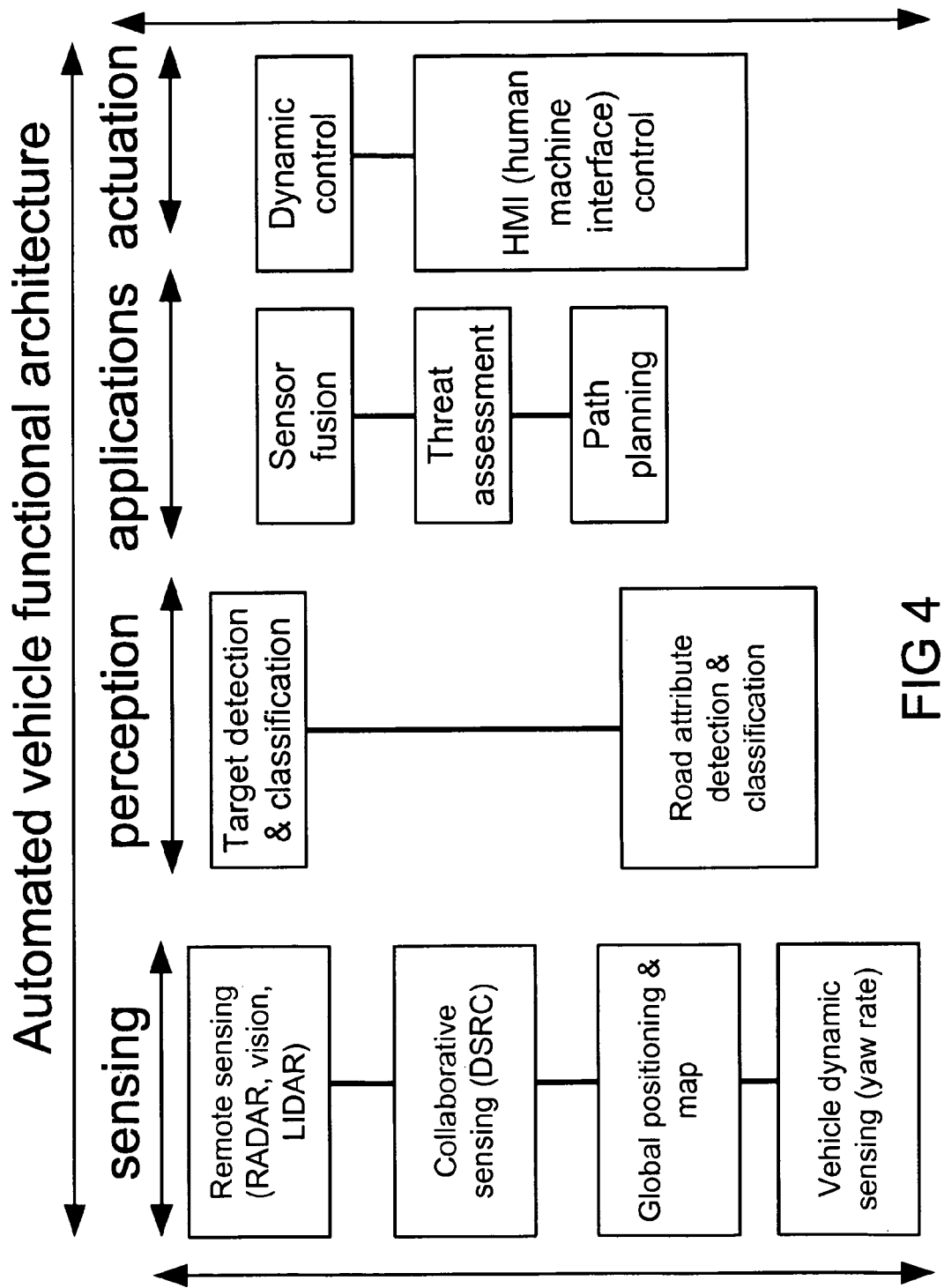
FIG. 4 is for one embodiment of the invention, for automated vehicle functional architecture.
Figure 5:
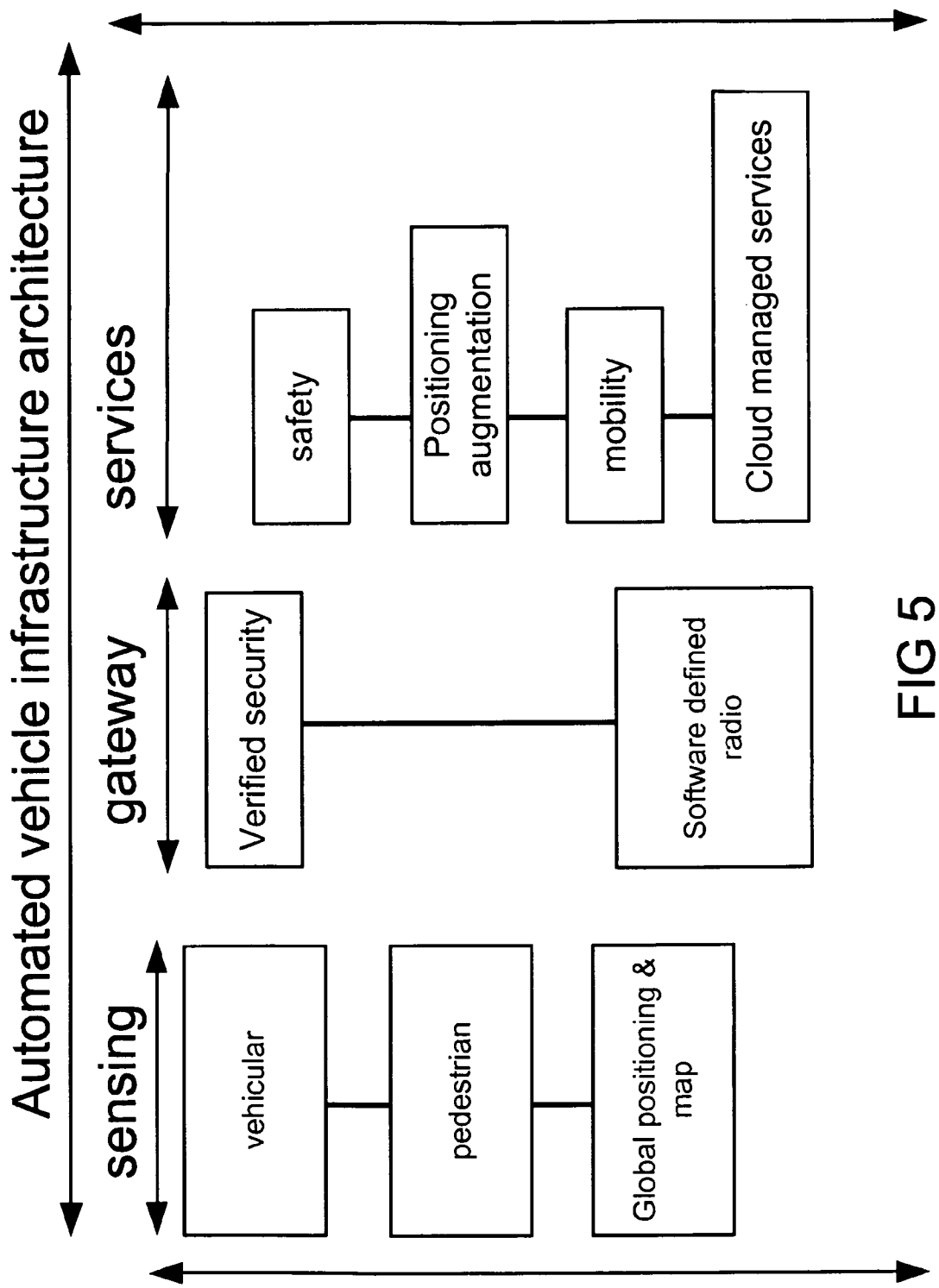
FIG. 5 is for one embodiment of the invention, for automated vehicle infrastructure architecture.

FIG. 4 is for one embodiment of the invention, for automated vehicle functional architecture, for sensing, perception, applications, and actuation. FIG. 5 is for one embodiment of the invention, for automated vehicle infrastructure architecture, for sensing, gateway, and services.

Figure 6:
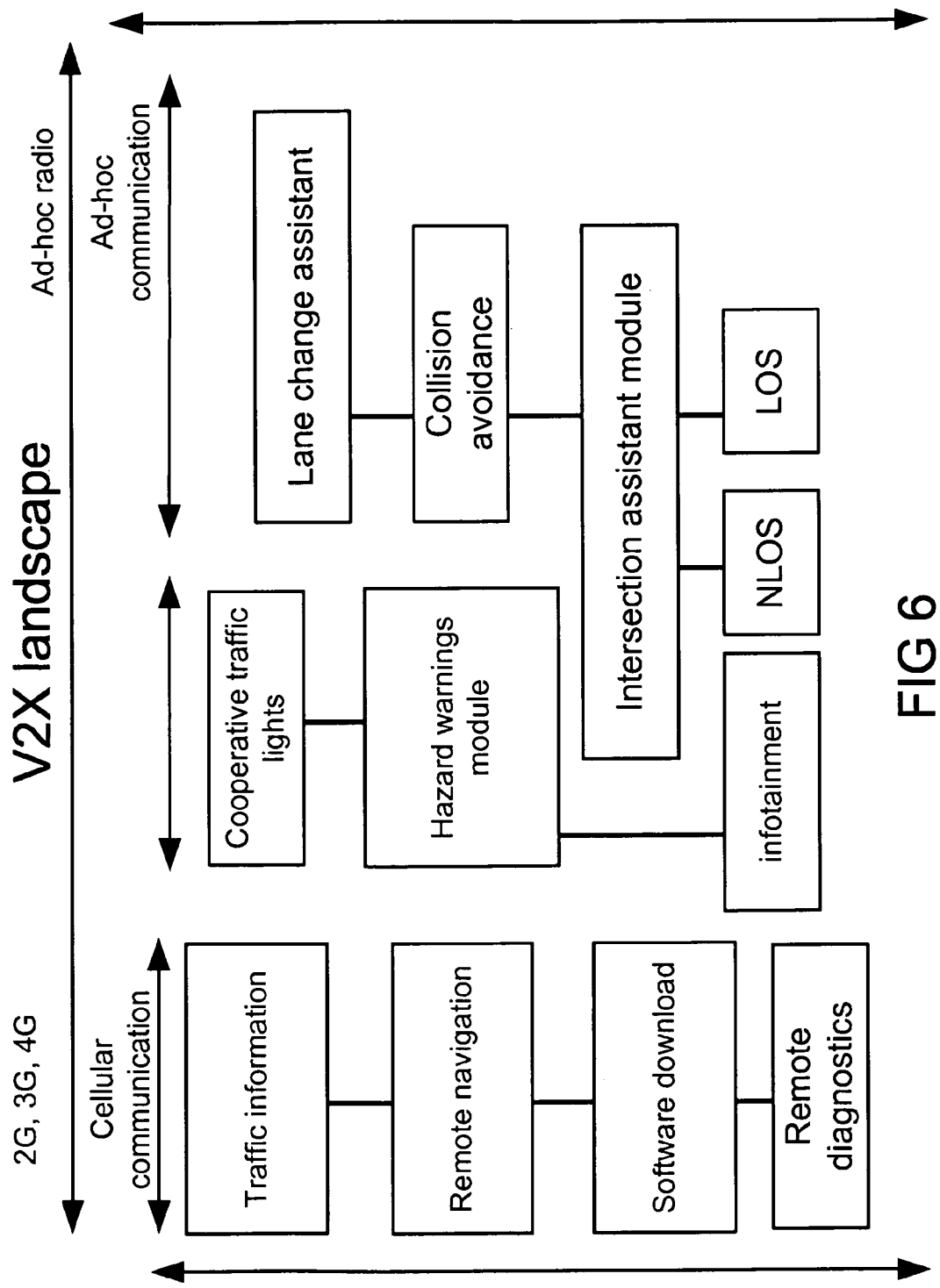
FIG. 6 is for one embodiment of the invention, for a system for V2X landscape, with components.
Figure 7:
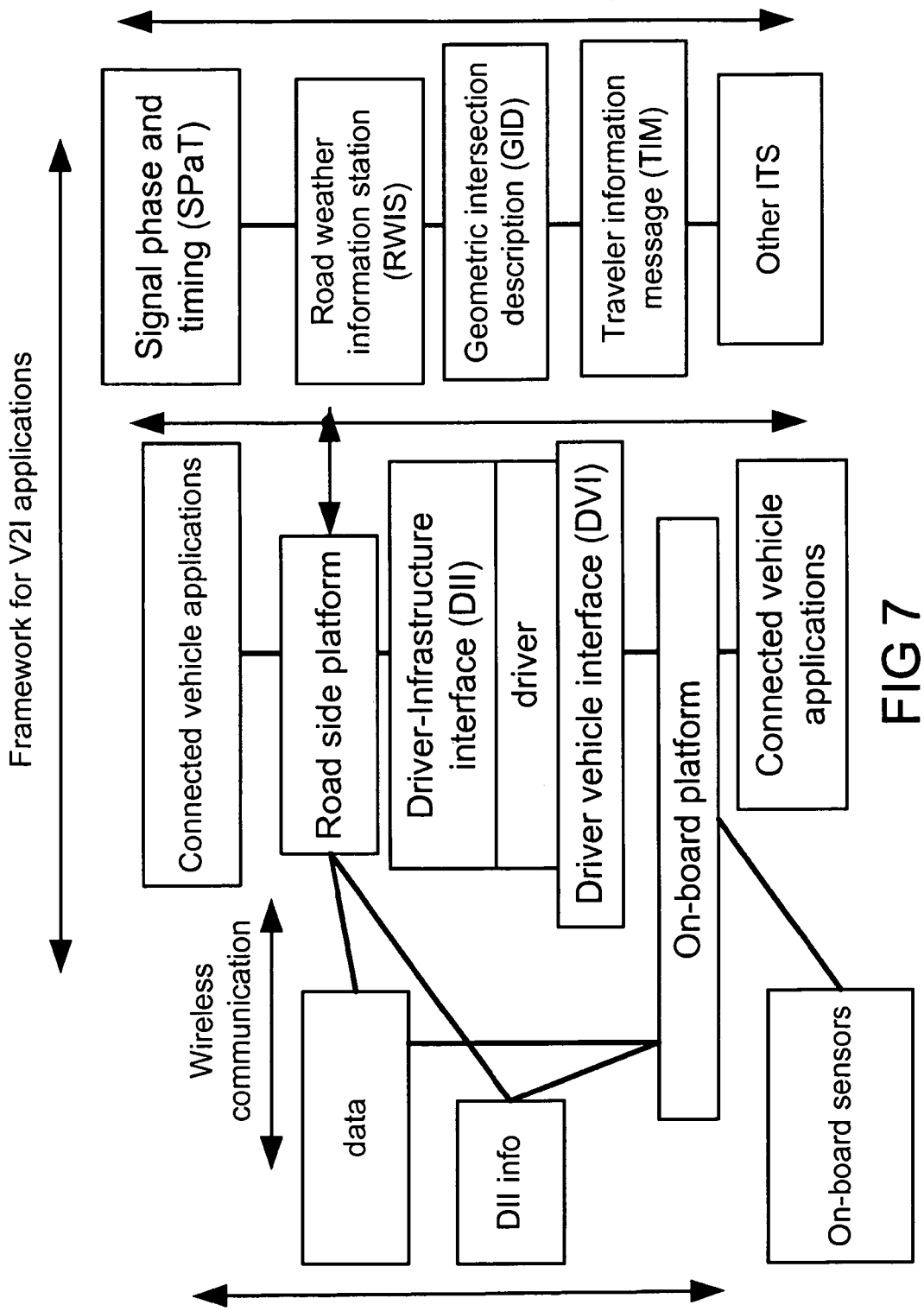
FIG. 7 is for one embodiment of the invention, for a system for framework for V2I applications, with components.

FIG. 6 is for one embodiment of the invention, for a system for V2X landscape, with components, for spectrum and range of frequencies and communications, for various technologies, for various purposes, for different ranges. FIG. 7 is for one embodiment of the invention, for a system for framework for V2I applications, with components, for roadside platform and on-board platform, using various messages and sensors.

Figure 8:
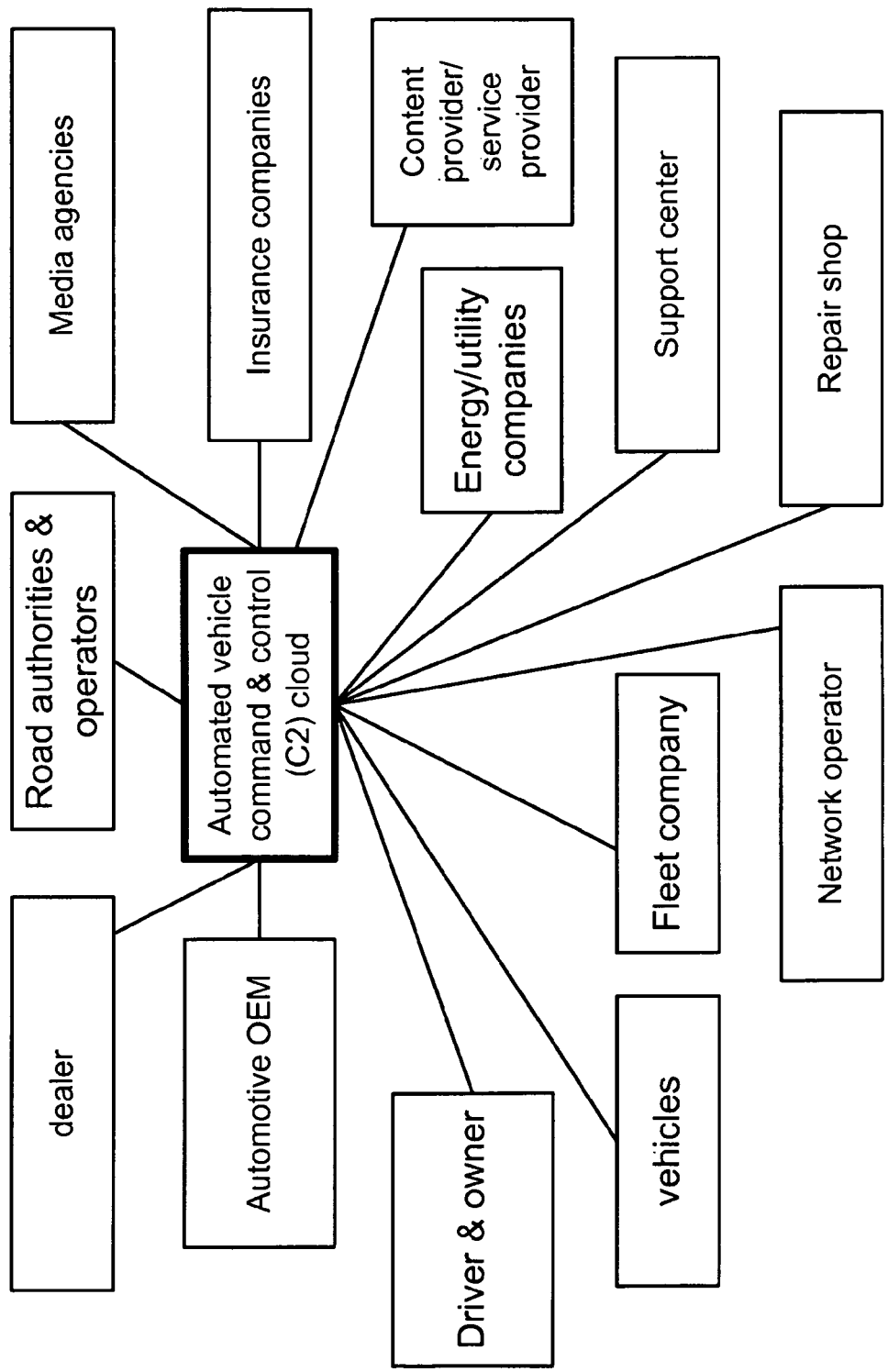
FIG. 8 is for one embodiment of the invention, for a system for automated vehicle command and control (C2) cloud, with components.
Figure 9:
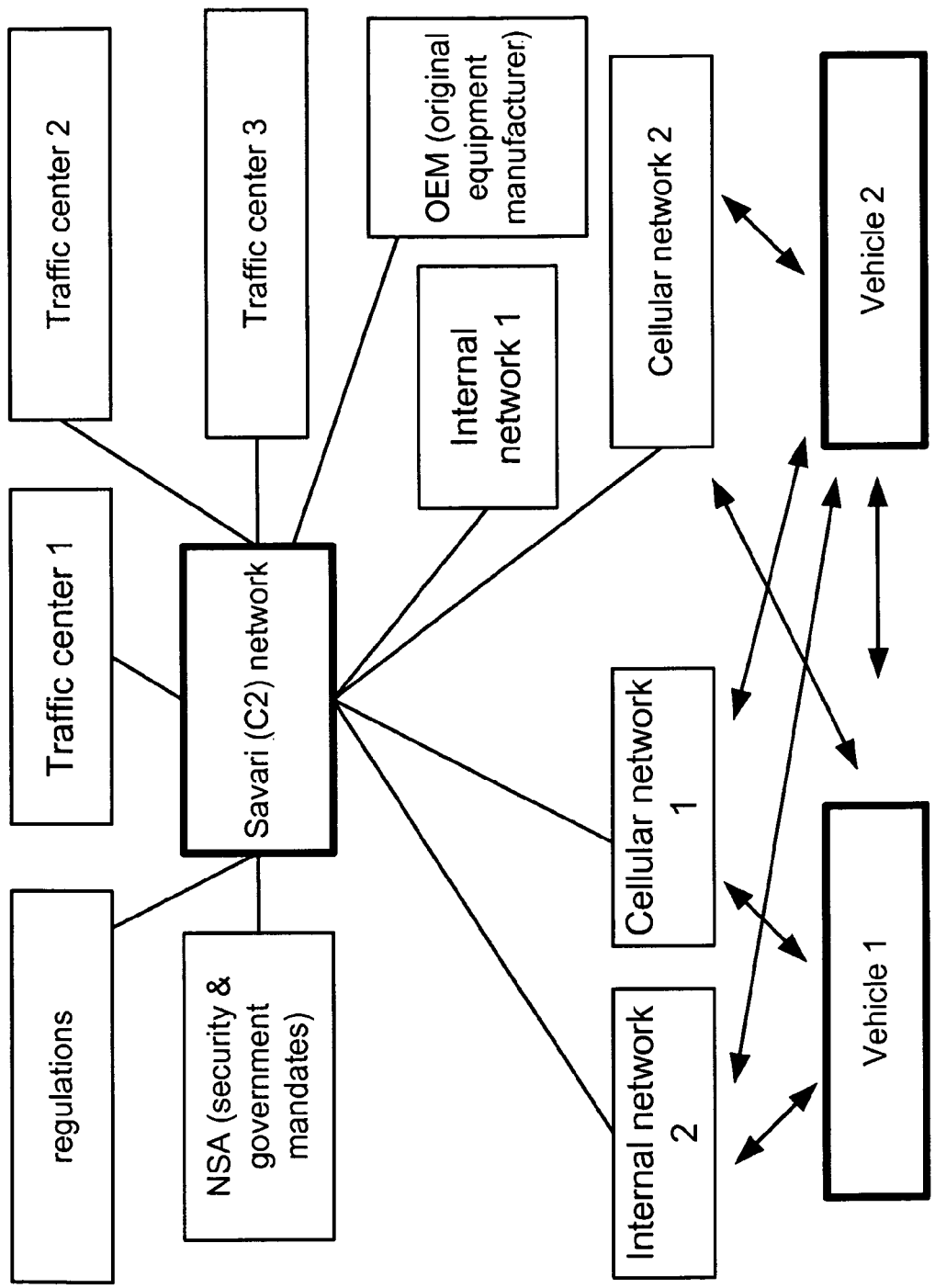
FIG. 9 is for one embodiment of the invention, for a system for our (Savari) C2 network, with components, showing communications between networks and vehicles.

FIG. 8 is for one embodiment of the invention, for a system for automated vehicle command and control (C2) cloud, with components, with various groups and people involved, as user, beneficiary, or administrator. FIG. 9 is for one embodiment of the invention, for a system for our (Savari) C2 network, with components, showing communications between networks and vehicles, using traffic centers' data and regulations by different government agencies.

In one embodiment, we have the following technical components for the system: vehicle, roadway, communications, architecture, cybersecurity, safety reliability, human factors, and operations. In one embodiment, we have the following non-technical analysis for the system: public policy, market evolution, legal/liability, consumer acceptance, cost-benefit analysis, human factors, certification, and licensing.

In one embodiment, we have the following requirements for AV (automated vehicles) system:
  Secure reliable connection to the command and control center
  Built-in fail-safe mechanisms
  Knowledge of its position and map database information (micro and macro maps)
  Communication with traffic lights/road side infrastructure
  Fast, reliable, and secure
  Situational awareness to completely understand its immediate surrounding environment
  Requires multiple sensors
  Algorithms to analyze information from sensors
  Algorithms to control the car, for drive-by-wire capability
In one embodiment, we have the following primary technologies for our system:
  V2X communication: time-critical and reliable, secure, cheap, and dedicated wireless spectrum
  Car OBE (on-board equipment): sensor integration (vision, radar and ADAS (advanced driver assistance system)), positioning (accurate position, path, local map), wireless module (physical layer (PHY), Media Access Control (MAC), antenna), security (multi-layer architecture), processing and message engine, and algorithms for vehicle prediction and control
In one embodiment, we have the following building blocks for AVs:
  Automation Platform
    i. Advanced Driver Assistance (ADAS) integration
    ii. Map Integration, Lane Control iii. Radio communications support
iv. Vehicle Controller Unit to do actuation
Base Station
Ground positioning support to improve positioning accuracy
V2I (vehicle to infrastructure) functionality, support for public/private spectrums
Cloud connectivity to provide secure access to vehicles
Command Control Center
i. Integration with Infrastructure Providers Here are some of the modules, components, or objects used or monitored in our system: V2V (vehicle to vehicle), GPS (Global Positioning System), V2I (vehicle to infrastructure), HV (host vehicle), RV (remote vehicle, other vehicle, or $3^{rd}$ party), and active and passive safety controls.

Figure 10:
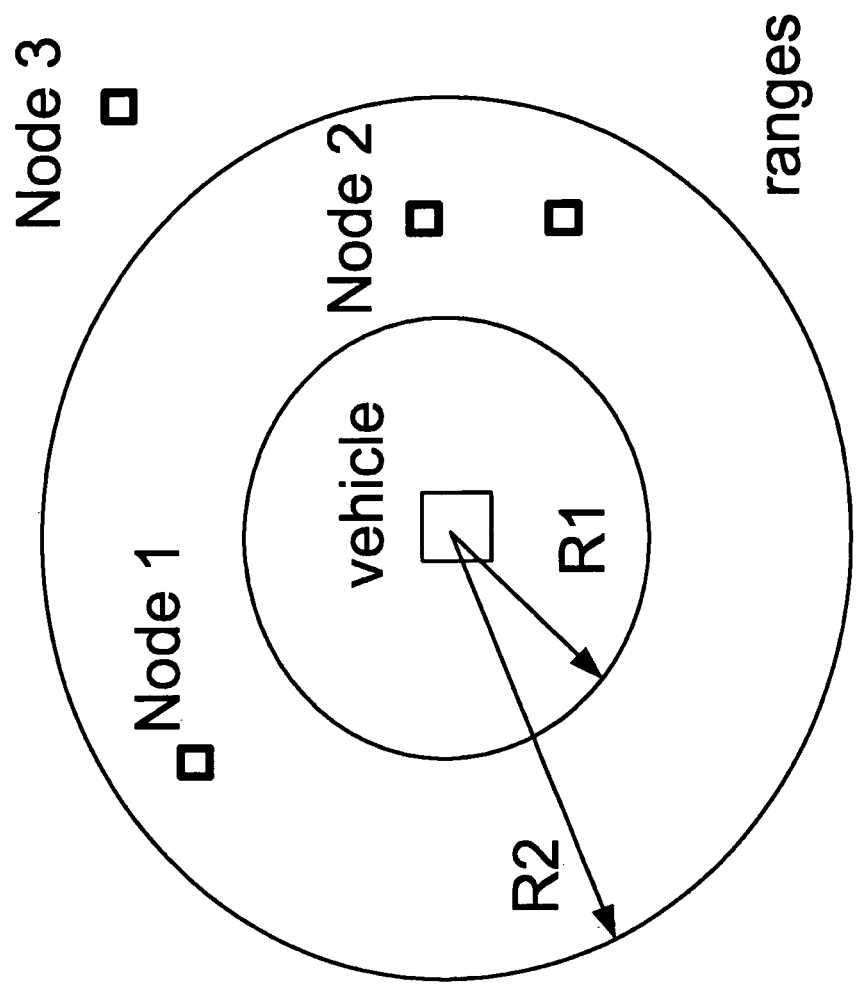
FIG. 10 is for one embodiment of the invention, for a system for host vehicle, range of R values, region(s) defined, multiple nodes or vehicles inside and outside region(s), for communications between networks and vehicles, and warning decisions or filtering purposes.
Figure 11:
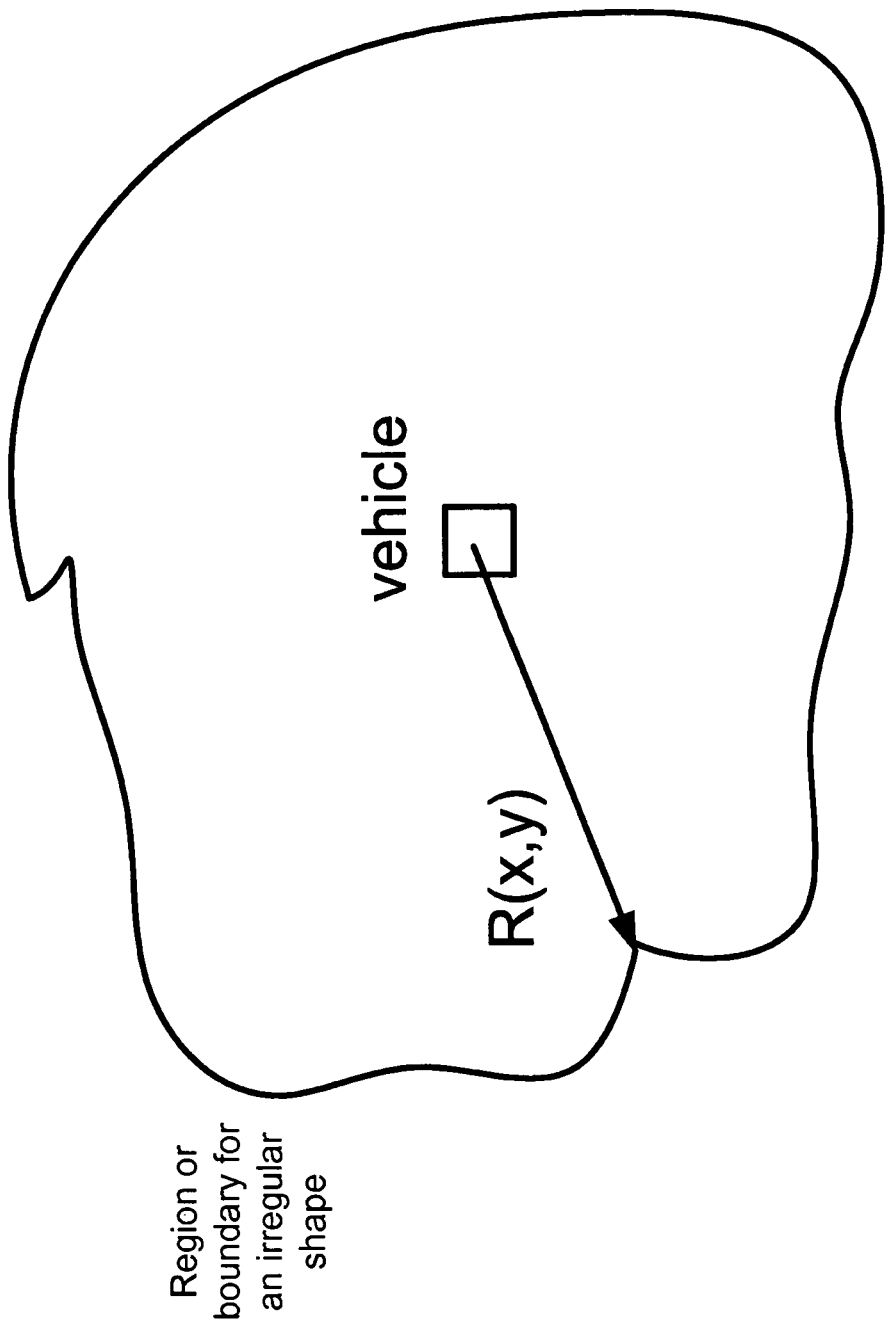
FIG. 11 is for one embodiment of the invention, for a system for host vehicle, range of R values, region(s) defined, for an irregular shape(s), depending on (x,y) coordinates in 2D (dimensional) coordinates, defining the boundaries.

FIG. 10 is for one embodiment of the invention, for a system for host vehicle, range of R values, region(s) defined, multiple nodes or vehicles inside and outside region(s), for communications between networks and vehicles, and warning decisions or filtering purposes, for various filters to reduce computations and reduce the bandwidth needed to handle the message traffic. FIG. 11 is for one embodiment of the invention, for a system for host vehicle, range of R values, region(s) defined, for an irregular shape(s), depending on (x,y) coordinates in 2D (dimensional) coordinates, defining the boundaries, or in 3D for crossing highways in different heights, if connecting.

Figure 12:
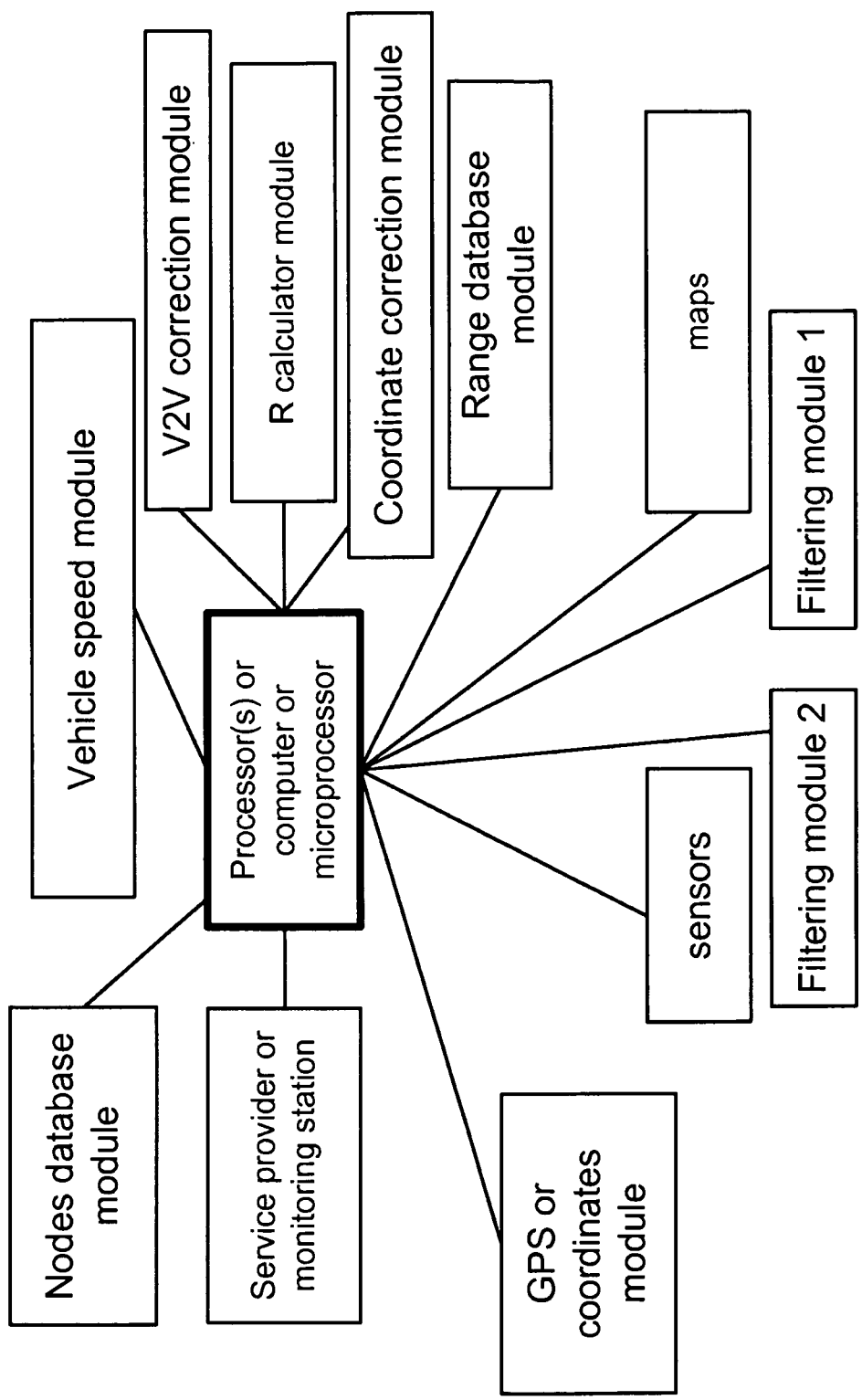
FIG. 12 is for one embodiment of the invention, for a system for automated vehicles, with components, with one or more filtering modules.
Figure 13:
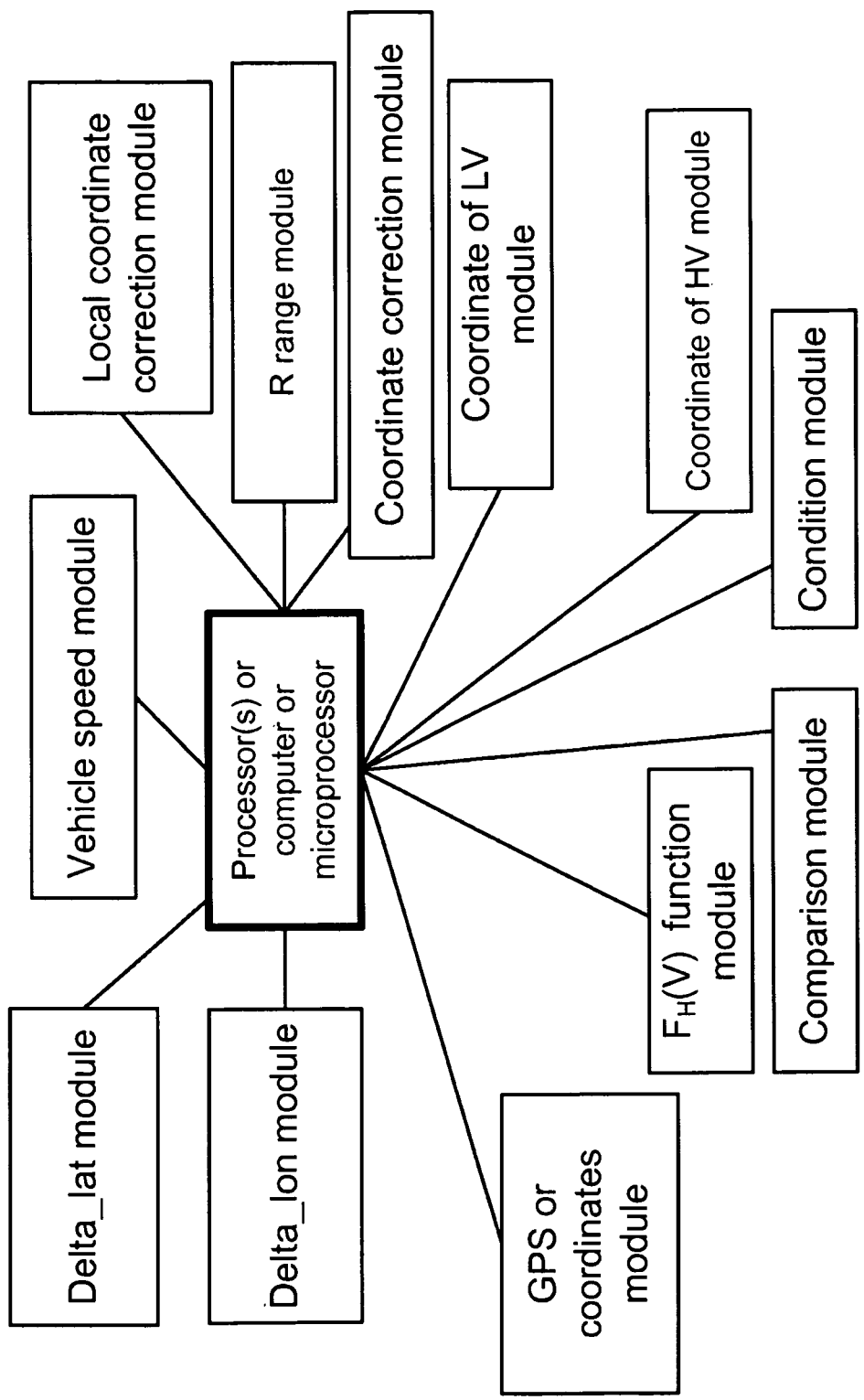
FIG. 13 is for one embodiment of the invention, for a system for automated vehicles, with components, with a function F( ), e.g., depending on the velocity of the vehicle, for calculations for Lat and Lon coordinates, and their corresponding deltas or differences.

FIG. 12 is for one embodiment of the invention, for a system for automated vehicles, with components, with one or more filtering modules, based on coordinates, Rs, GPS, and maps, and their corresponding corrections. FIG. 13 is for one embodiment of the invention, for a system for automated vehicles, with components, with a function F( ), e.g., depending on the velocity of the vehicle, for calculations for Lat and Lon coordinates, and their corresponding deltas or differences, with local and global coordinate correction module(s).

Figure 14:
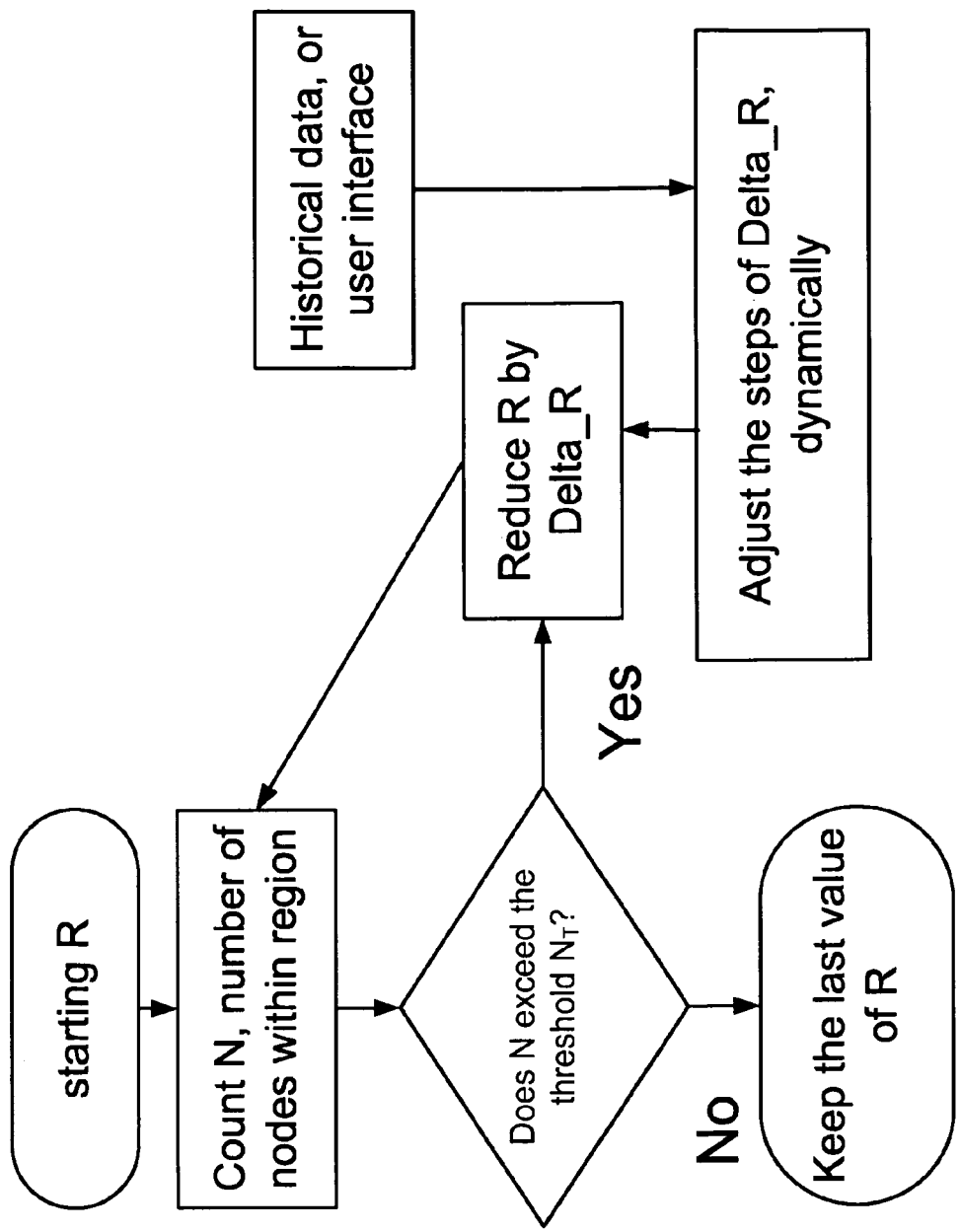
FIG. 14 is for one embodiment of the invention, for a method for automated vehicles, for adjusting R dynamically, based on rules engine, historical data, user-interface, or neural network.
Figure 15:
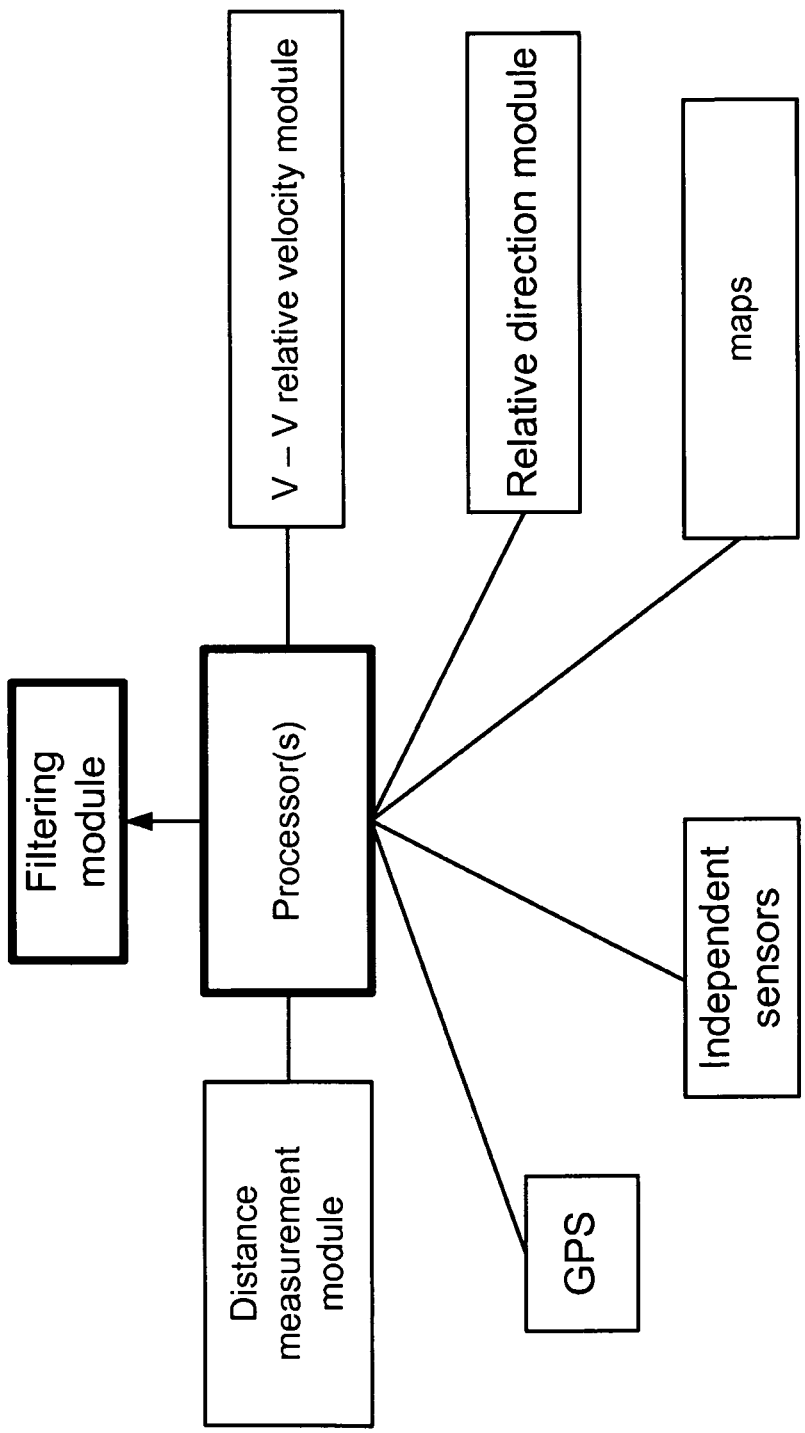
FIG. 15 is for one embodiment of the invention, for a system for automated vehicles, for filtering module, for direction, velocity, and distance.

FIG. 14 is for one embodiment of the invention, for a method for automated vehicles, for adjusting R dynamically, based on rules engine, historical data, user-interface, or neural network, e.g., for filtering purpose. FIG. 15 is for one embodiment of the invention, for a system for automated vehicles, for filtering module, for direction, velocity, and distance, e.g., using independent sensors and GPS.

Figure 16:
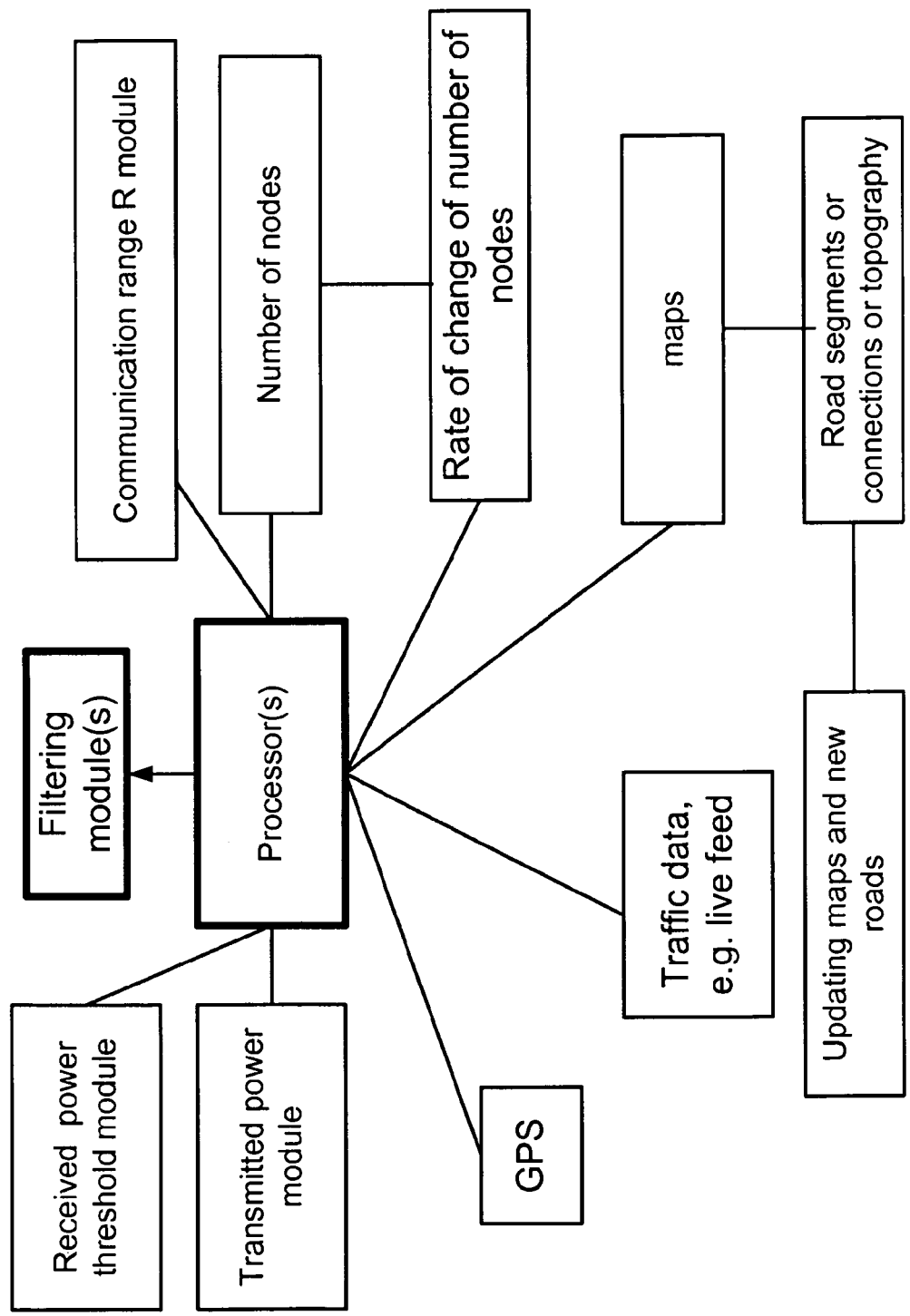
FIG. 16 is for one embodiment of the invention, for a system for automated vehicles, for filtering module, for power, power threshold(s), traffic data, maps, topography, R, number of nodes, and rate of change of number of nodes.

FIG. 16 is for one embodiment of the invention, for a system for automated vehicles, for filtering module, for power, power threshold(s), traffic data, maps, topography, R, number of nodes, and rate of change of number of nodes, with a module for updating the new roads, intersections, and topographies, by user or automatically, as a feed, e.g. periodically or based on an event.

Figure 17:
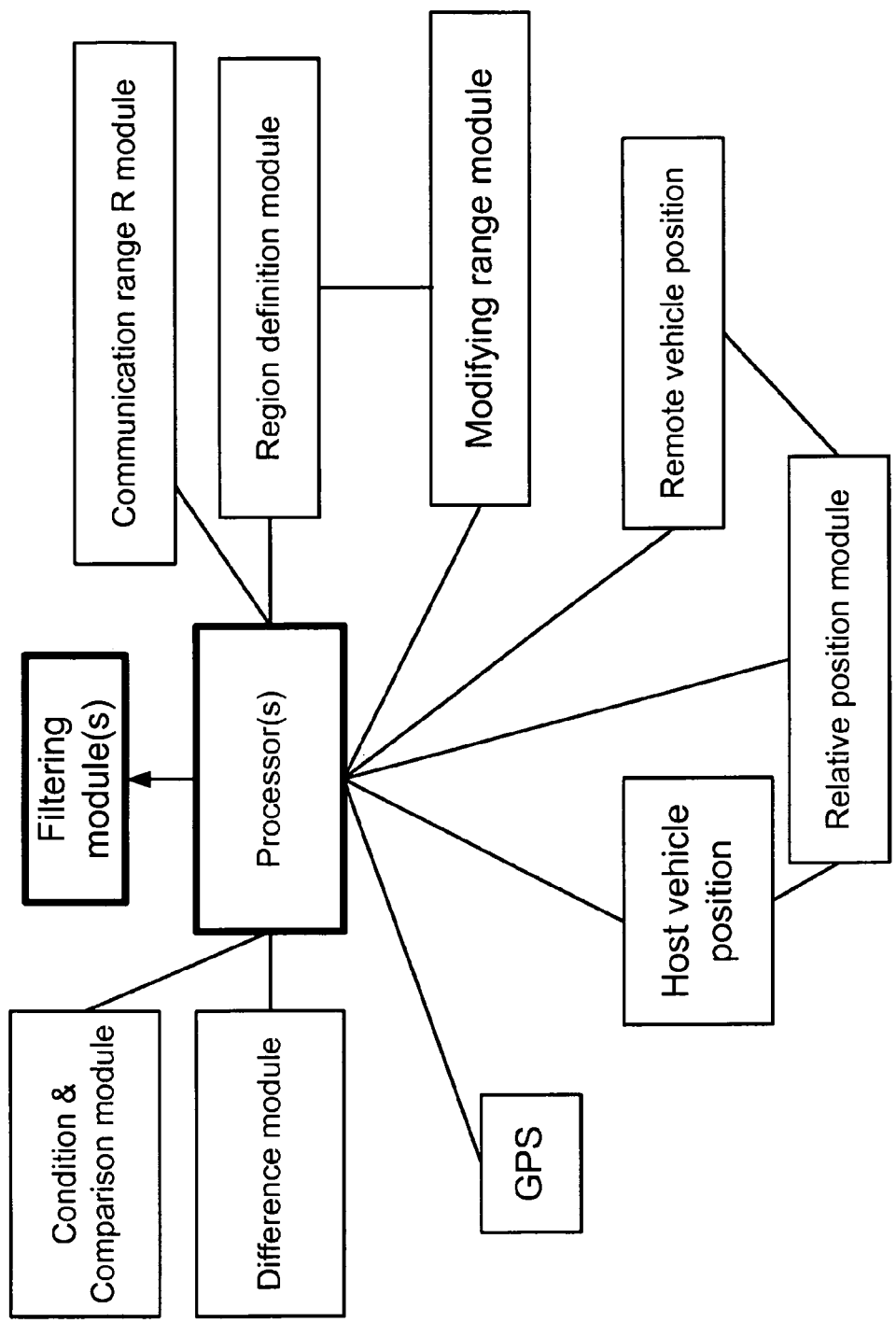
FIG. 17 is for one embodiment of the invention, for a system for automated vehicles, for filtering module, for various vehicles.

FIG. 17 is for one embodiment of the invention, for a system for automated vehicles, for filtering module, for modifying region, for various vehicles, with relative position module and GPS, with condition module, to compare and get all the relevant nodes or vehicles.

Here, we describe a method, as one embodiment: The first level of filtering is based on defining circle (geometry) of interest or any other geometrical shape (see also FIG. 11). For the circular geometry case, the objective is to ignore (not process) all nodes (vehicles) that is outside a calculated radius R (see also FIG. 10). In one embodiment, the R is calculated based on the targeted safety applications combined with vehicle dynamics. For example, FCW (forward collision warning), BSW (blind spot warning), LCA (lane change assist), IMA (intersection movement assist), and CSW can all be implemented using 200 m (meter) radius. In one embodiment, as the vehicle speed decreases, the forward application required coverage range decreases.

In one embodiment, for example, for calculating R, we have (see also FIG. 13):
R, as a function of host vehicle speed, $F_H$, e.g.:

$$R = F_H(V) = 50 + 2V + (V^2/8)$$

Where V is the host vehicle speed in m/s.

In one embodiment, F is a function of velocities, distances, and coordinates, both in absolute values and relative values, for host and other vehicles. In one embodiment, F is a function of polynomial of degree G, in host vehicle speed V. In the example above, we have: G=2.

For example, for: 70 m≤R≤200 m
That is, Maximum (R)=200 m, and
Minimum (R)=70 m.

The 70 meter will still be sufficient to do all the rear applications. These numbers are just examples for some specific applications.

In one embodiment, the next step is to convert this R to delta Longitudinal and delta Latitude from the host vehicle coordinate. The objective here is to ignore all vehicles that are outside a radius. Here, we assumed circular filtering. Different types of geometric filtering can also be done: rectangle, ellipse, other irregular geometry, or any other regions or shapes. For circular filtering, given the current host vehicle (HV) coordinate (lat_HV, lon_HV), and given the desired filtering radius R, then the equivalent delta latitude (Delta_lat) and delta longitudinal (Delta_lon), from (lat_HV, lon_HV) for this radius R, are calculated as follows (see also FIG. 13):

$$\text{Delta\_lat} = (R/\text{Radius\_of\_earth}) = (R/6378137),$$

e.g., based on Earth Equatorial radius of 6378137 m, and where R is in meter (m).

$$\text{Delta\_lon} = \arcsin(\sin(\text{Delta\_lat})/\cos(\text{lat\_HV}))$$

Therefore, in one embodiment, to apply the filtering algorithm for any node (Remote Vehicle (RV)), with the coordinate of (lat_RV, lon_RV), the following is executed (see also FIG. 13, for Comparison Module and Condition Module):
If $$\text{Abs}(\text{lat\_RV} - \text{lat\_HV}) > \text{Delta\_lat}$$

OR $$\text{Abs}(\text{lon\_RV} - \text{lon\_HV}) > \text{Delta\_lon}$$

Then: Ignore it (i.e., do not process it).
Else: Process it.
Wherein all "lat" and "lon" values are expressed in radian. The default value for R is 200 m, but it is configurable. For jam reduction and reduction of processing, in one embodiment, we want to ignore all the vehicles outside of the radius R.

Now, in one embodiment, this value of R can be adaptively adjusted based on the statistical distribution of the nodes ranges (see also FIG. 12). For example, if the maximum number of nodes that can be processed is 150, and the calculated R=200 m, and the number of nodes in the 200 m radius is 200 nodes, but most of those nodes are close to the 200 m range, then the R value can be adaptively adjusted (reduced), so we get close to the 150 desired total numbers of nodes. For example, this can be done in small steps with ΔR, in a loop, reducing the value of R slightly, each time (in each step), and measuring the nodes or vehicles within the new radius, and the process continues, until we get 150 nodes or less in that radius, and then we exit the loop, and stop the process (see also FIG. 14). Then, we select the final radius as the radius for the formulation and next steps.

In one embodiment, the second level of filtering is based on the relative velocity between the host vehicle and the remote vehicle. For example, for all remote vehicles that have a value of the velocity component in host vehicle direction that is greater than the host vehicle velocity, and they are also at relatively high range distance from the host vehicle, then they constitute no immediate threat on the host vehicle (based on the probability) (see also FIG. 15). Thus, those vehicles can be filtered out.

In one embodiment, the third level of filtering is to adjust either the transmitted power and/or the received power threshold as a function of one of the following (as different embodiments) (see also FIG. 16):

a. Rate of change in the number of received nodes. As the number of nodes increases sharply, the host vehicle is approaching a congested traffic area, and therefore, the transmitted power can be decreased to reduce the communication range, and/or the received power threshold can be increased to reduce the receiving communication range (see also FIG. 16).

b. The map database can also be used very effectively: For example, if the number of connected road segments to the host vehicle road segment is high, and/or the total number of road segments is high within a defined area, then the transmitted power can be decreased, and/or the received power threshold can be increased (see also FIG. 16).

c. Based on the calculated R. For example, communication range R decreases/increases, as the transmission power increases/decreases (see also FIG. 16).

In one embodiment, the fourth level of filtering is just using the map database: For example, filter all the nodes (vehicles) that are on road segments that are not connected to the host vehicle road segment. An example for that is the main road and an overpass geometry. The main road and the overpass that passes over it are not connected, and thus, they do not make a V2V (vehicle to vehicle) possible traffic hazard. Map database can provide this information that these two road segments are not connected (see also FIG. 16).

The advantages of our methods are very clear over what the current state-of-the-art is. Our methods optimally use the available processing power and available bandwidth on processing the data of the desired nodes, which are relevant or important. They also help reducing the communication congestion problem.

Connected Vehicles Adaptive Security Signing and Verification Methodology & Adaptive Node Filtering:

Here, we describe embodiments for our inventions, related to (1) connected vehicles adaptive security signing and verification methodology & (2) adaptive node filtering:

First Part:

Problem Addressed by the Invention:

The IEEE 1609.2 standard is used by WAVE devices to securely communicate and exchange the information between different WAVE enabled devices. The standard makes use of digital signatures to secure the message between any WAVE capable device. Before a device can transmit a message, it "signs" the message using the 1609.2 security service, and the receiving device, before it reads the message contents, it verifies the message using the 1609.2 security service. The standard also provides the privacy, allowing devices to communicate with each other anonymously. The standard supports ECDSA (Elliptic Curve Digital Signature Algorithm) specified in FIPS (Federal Information Processing Standard) 186-3, using either the P-224 or P-256 curves.

BSM is a Basic Safety Message that is sent by the OBUs (On Board Units) that reside in vehicles. It works as a heartbeat message, transmitting every 10 Hz, containing about the vehicle dynamics, heading, positioning and other information. It includes two parts, namely PartI and PartII. The PartI is usually transmitted all the time, and PartII is an optional data and can be transmitted at different frequency, smaller than 10 Hz, to conserve the size of the over the air message, and thus, reducing congestion in a large vehicular environments.

The BSM, before it is transmitted, gets signed by the 1609.2 security services, using the ECDSA-224 or ECDSA-256 algorithm along with proper valid certificate or a certificate digest attached to it. The decision of whether a certificate or digest is attached to the message is left for the implementer, and is not specified in the standard. Usually singing the message and attaching the certificate and verifying the message does required significant processing resources. Therefore, it is very important to trigger those two functions in a very optimal way.

Considering that the BSM is transmitted by each and every vehicle, the verification of each and every single message becomes hard on the processor and resources. Also, it becomes hard for safety applications to barely run on the processor as it spends most of the time in verifying the message. This might lead to missed alerts, delayed warnings, which might result in false positives, and in some cases, a potential choking of the hardware, causing a machine restart. This in turn is a serious degradation of performance, which makes it much harder to work in the real world environment.

There are some methods involved in partially solving the problem. These involve signing with implicit certificates which reduces verification time, attaching certificate once for every 5 BSMs or 10 BSMs, and the rest of the time attaching the digest. At the receiver, verifying the message every 1 second, instead of verifying every message, or verifying the message, only if it is a potential alert to the driver.

State of the Art: Current Certificate Attachment Strategy:

The current standard does not specify whether to sign every BSM with certificate or with digest. The current implementation involves attaching the certificate one in every 5 or 10 BSMs (controlled by a configuration information stored in the on board unit), and the rest of the messages will be attached with the certificate digest. The signing of the message tends to be constant with respect to time.

Invention Method: Adaptive Certificate Attachment Strategy:

Adaptive signing involves signing the packet with certificate based on the a) BSM data; b) RV monitoring. One can use the last transmitted BSM, along with the currently to be transmitted BSM, and calculate the deltas of Speed, Heading and Yaw Rate; c) If the delta values of corresponding elements are more than the given calculated or configured sets, then the BSM should be signed and be attached with the certificate. For a vehicle with constant speed, heading, and yaw rate, there might be cases where it does not need to send a packet with certificate at all. (For example, the case of a stationary vehicle.)

This case is effectively resolved with the help of RV monitoring. The RV monitoring involves preparing tables of RV information about containing the RV identifier (MAC Address). If an RV comes in the receive range of the HV, the host vehicle receives the RV, checks if it is present in the RV table, and if it is not present in the RV table, sets the attach_cert flag, identifying the need of sending a subsequent BSM with the certificate. The attach_cert flag gets reset when a BSM has been sent with the certificate attached. If the RV is present in the HV table, the HV will send subsequent BSMs with the certificate, as a probability function, for example, as exponential function. (Note: please see the same verification algorithm in the below section. (Or, even a simpler algorithm.))

For example, for every second, a coin is tossed between 0 and 1, and if it is greater than 0.5, then a certificate is attached, thus reducing the probability of certificate attachment. These are just function examples. Some other probability or deterministic function can be used. One simpler way to look at it is the frequency of the certificate attachment decreases, as the RV gets older. If the RV is not present (meaning there are no RV packets) for a period of time, then the RV is removed from the RV table. When we go further deep, as the BSM PartI is the mandatory information, and PartII is an optional information, the certificate can be attached when there is no partII information in the BSM, and avoid attaching the certificate, when there is partII content (exceptions to this case are when there are eventFlags in the BSM PartII eventFlags data element). Thus, this reduces the loads on both sender and receiver (to sign and verify a significantly larger packet), and also the over the air bandwidth. Also, this applies on the host vehicle, once a new Mac address is created. The frequency of the certificate attachment decreases, as Mac address gets older.

The advantages of using Adaptive Signing strategy are:

1) The packet is not signed very often, unless the conditions a) or b) are satisfied, which might reduce the signature load, on the on board unit or on the hardware security module (HSM).

2) The packet signing is dynamic. With the previous time based signing strategy, the receiving device might have to consume and fail at least 9 BSMs, as an example, in the worst case situation, before it can actually verify the certificate and process the message. With the adaptive signing message, using the RV tables, also with the previous BSM data of the sender, both the sender and receiver identify each other within 1 BSM, and they send the subsequent packets with certificate attached, which is comparatively a lot more faster.

3) Reduced channel bandwidth: (Since certificate attach rate is dynamic and adaptive.) In some cases, considering that the BSM parameters are below the given thresholds, the number of vehicles seen varies constantly. The packet size gets small (the digest is only 8 bytes, compared to the certificate, with 117 bytes). This can be employed as a congestion control, tunable in traffic scenarios. Also, there will be significant bandwidth reduction with not attaching the certificate, if the BSM has partII data in it.

State of the Art: Current Verification of Message:

The current verification of message is done either a) by verifying the signature every 1 second (constant with time, and does not depend on the type of the BSM); or b) by verifying on demand, when there is a safety alert that has to be displayed to the human.

Invention Method: Adaptive Verification of Message:

Like the Adaptive attachment of certificate, while signing the message, the verification of message can be processed (after verifying the sender's certificate), using verify_packet variable. If the verify_packet variable is set, then the message to be verified, otherwise, it can be bypassed from verification. After each successful verification, the receiver maintains a table of the senders, and each entry in the table is associated with a timeout, the time at which there are no more packets from the sender. This timeout is used for remote vehicle table maintenance. The setting of the verify_packet variable depends on:

1) an algorithm deciding what packet to verify. It can be either or all of the following:
   A) $y=2^x$, where x=0-6.
   B) tossing the coin every second, between 0 to 1 range, and check if it is greater than 0.5.

Description:
a) The verification algorithm: For the first RV packet (meaning there is no RV in the RV table) that is verified, the following equation is calculated:

$$y=2^x, \text{Where } x=0\text{-}6.$$

the calculated y value is the interval for the next verification.

These are just function examples. Some other probability or deterministic function can be used. For example, a timer can be started, and upon an expiry, the packet is verified. After it reached the maximum value, the verify interval is hooked to the maximum value and should not be changed until and unless a new RV has come in to the picture.

b) The coin tossing algorithm: Every second a coin is tossed between 0 to 1, and it checks to see if it is more than 0.5 (lucky chances), in which case, the packet is verified.

2) Verifying the target with the help of an active sensing system, such as radar/vision/lidar/etc. The target distance is measured with the radar, and also with the received BSM from the vehicle. If the delta between the distances is relatively small and falls in the given threshold distance, then it can be stated that the target is real and verification of the subsequent messages can be avoided.

3) There are various stages in checking if the remote vehicle is a candidate suitable for showing an alert to human driver. Some stages include (but not limited to): a) filtering the targets based on range, speed, heading, yaw rate, altitude, etc.; b) classifying the target vehicle(s) of interest into zones; c) prioritizing the targets; and d) providing the alert.

The number of vehicles continues to reduce as we move from a) to d). Since verifying the message at the alert time involves processing, there is a chance of missing true targets, because of a 'fake' or 'false' target that gets prioritized comparatively, with respect to the other targets. Depending on the application's interest, either of the steps a) or b) is used. Note that in using a), the received BSM does not need to be decoded to perform the algorithmic computations. Only part of the BSM PartI is read (part of 0x26 bytes in hexadecimal), to get the remote vehicle's Latitude, Longitude, Altitude, Speed, Heading, and Yaw Rate.

The BSM that is output of either of stage a) or stage b) should lie within the validity period of it. Otherwise, even if the BSM is authentic and the source is trusted, there might be chances that it fails verifying that, based on the generation time. The output of either of these algorithms is a Boolean (true or false) variable that is assigned to the verify_packet variable.

Advantages:

1) Dynamic verification. The verification is not constant with time and varies depending on the BSM data and other factors.

2) Reduced loads. The verification is done only when needed, and is not constant with time or with safety alerts.

3) Avoids missed alerts. Consider the case of verify on demand where there are many alerts of which the high priority alert is a bogus manipulated alert. The verification process is done after the alert has been found and prioritized. The bogus alert is dropped (but apparently the other alerts, too, because of the prioritizer). Furthermore, the packet verification takes a significant amount of time, causing the chances of missed alerts. If the packet is verified at the prioritizer stage, it is still a problem because there can be multiple threats, and each threat has to be verified in sequence, thus, causing missed alerts again.

Second Part:

Problem Addressed by Invention:

The communication range of the transceiver of a DSRC V2VI system is typically about 1000 meters. This uses the spectrum in 5.9 GHz band. This wireless medium can be exposed to deliberate noise, like signal jammers or spurious transmissions. These transmissions could easily saturate the OBE transceiver (On Board Equipment) and could end up under-performing.

The objective of this invention is to provide immunity to the OBE's transceiver by dynamically adapting to the noisy environment and still provide essential safety feature to the host vehicle. This invention also addresses the congestion problem resulted in high transmissions from other vehicles in a dense traffic conditions.

The proposed method provides first level of filtering based on the received signal strength and the quality of the BSM packets received by host vehicle. The subsequent level of filtering could be the methods discussed in our other inventions, e.g., "Node adaptive filtering and congestion control in V2X system using combined information of range, heading, velocity, map database, and node distribution", invented by Faroog Ibrahim, which could provide intelligent method of selecting the nodes to be processed, and also control the transmissions done by the host vehicle. This invention, when adapted dynamically, changes the radius of communication of any host vehicle.

Current State of the Art:

The current implementations are based on:

Feedback mechanics that stop processing new nodes when the number of nodes exceeds some configurable threshold.

Intelligent mechanisms that defines the radius of communication based on targeted safety application (using GPS data), combined with processing capability of the OBE and the rate of change of number of received nodes and other vehicle dynamics. (e.g., by dynamically changing the TX power and the RX threshold)

Intelligent mechanisms to filter out unwanted packets, based on relative velocity and MAP database.

Description of the Invention

The method involves two steps, one to identify if there is a congestion, and second, to trigger the congestion control.

Condition to identifying the congestion:

Noisy condition: (default option):

Received signal strength of the packet:

The received signal strength (RSSI) of the packet is low when the vehicle is at higher distance, compared to the vehicle that is closer. This is with the assumption that most of the transmitter in a DSRC environment are transmitting at the same power level, since the DSRC is a broadcast packet, and there is no closed loop or feedback mechanism to communicate to any transmitter, to modify its transmitter power.

This could be used as a method of filtering away nodes that are located far away. This can be done by setting a threshold for RSSI. Any packets which have an RSSI below this threshold would be dropped at the receiver.

Signal to noise ratio of the received packet:

The SNR (Signal to noise ratio) or CINR of the received signal is low, when there is high noise condition. The high noise could be because of malicious signal jammers or some spurious transmissions in the frequency bands. This could be one of the triggers to initiate the congestion control.

Noise measured at a system includes system noise (thermal noise and other noise related to hardware) and noise measured due to some interfering source (could be from non-decodable signals, like jammers). Such signals can be measured using the existing system, from the Rx-antenna, by sniffing on the channel, when there is no transmission (of DSRC or 802.11 frames). All modern WiFi chipsets has a capability to measure the Noise floor.

If the noise measured is greater than the Noise floor, then the receive threshold can be set to the Noise floor level, or 3 dB higher than the noise. With this threshold we could either reject all the packets received below this threshold, OR the noise floor of the system can be set to this threshold.

Changing the Noise floor would directly impact the RX sensitivity of the receiver, which would determine the reception radius of the receiver system.

Example:

Let's assume a Host Vehicle (HV) is receiving BSMs from 2 other sources at −65 dBm from RV1 and −80 dBm from RV-2. Let's also assume there is a signal Jammer which the HV sees at −70 dBm.

In this scenario the HV will not be able to decode BSMs from RV-2, because the power of Jamming signal is more than RV-2, as seen from HV.

If the Noise Floor of the HV system is increased to −70 dBm, then the RX system of HV can easily decode signals greater then −70 dBm, making it immune to noise at −70 dBm. (Please refer to the figures for a pictorial representation of this example.)

Trigger from higher layer (Protocol/1609.3 Layer):

*Rate of change in number of received nodes:

If there is a sudden change in number of BSMs received from other RVs, and we are fast approaching 75% of the OBEs processing capability, then restricting the number of BSMs received from the unwanted nodes would ease up the receiver.

*Higher Packet Error Rate (PER):

Higher packet error rate seen by the host vehicle, where there are lots of BSM packets from RVs being missed.

This could also indicate the lack of transmission opportunity for the RVs, indicating congested scenario.

*Change in communication range by defining the radius of interest (Involving GPS data):
  This would help to determine/fix the receiver threshold, based on the actual data received by the HV from the RV, which is on/beyond the radius of interest.
  The system can intelligently identify such RV based on the latitude and longitude, and decide to term it as a noise, in the current situation (based on the safety app).
  Example:
  A RV at a distance of 250 meters is being received by HV, at −78 dBm. If we term this as noise, then we should be able to receive signals with strength greater than −78 dBm, thereby, terming the radius as 250 meters.
  The system could either reject all signals below −78 dBm, OR raise the noise floor to −78 dBm.
*Missed transmission opportunity by the HV:
  Many missed transmission opportunities by the HV is an indication of the congested environment.
Trigger from the CAN/GPS data, related to velocity of the host node:
  The speed of the HV is typically low in a congested environment. Though this is not always true, this could be one method along with the points mentioned above to trigger the proposed method of congestion control.
  Based on vehicle speed. (CAN data can be used in case we want to avoid communicating with higher layer, for fetching the velocity of host node, using GPS data.)
Method of congestion control:
  The goal of the congestion control is to limit the number of nodes that the receiver is able to see. This can be achieved by rejecting the packets that are received below a threshold level, OR to change the noise floor of the system so that the receiver has a reduced reception area, hence, not able to receive packets from nodes that are far away.

Here are some examples: A method for adaptive node filtering for autonomous vehicles in a street or highway, said method comprising: a central computer in a system receiving data from a host vehicle; said central computer receiving data from multiple remote vehicles; a receiving device computing noise power level in a first environment; said receiving device obtaining a noise floor value with respect to said first environment; if said noise power level in said first environment is bigger than said noise floor value, then said receiving device setting a new value for said noise floor value, to be at a level which is three decibels higher than said noise power level, said receiving device setting said new value for said noise floor value for said system, and rejecting all signals below said new value for said noise floor value; said receiving device obtaining a threshold error rate.

If said noise power level in said first environment is not bigger than said noise floor value, then if packet error rate is higher than said threshold error rate, then said receiving device examining a list of said multiple remote vehicles, and said receiving device finding a first remote vehicle which has least received signal strength, said receiving device setting said new value for said noise floor value for said system, to be one decibel higher than power of said first remote vehicle which has least received signal strength; said receiving device obtaining a threshold number of vehicles; if said noise power level in said first environment is not bigger than said noise floor value, and if packet error rate is not higher than said threshold error rate, then if number of said multiple remote vehicles is bigger than said threshold number of vehicles, then said central computer finding said first remote vehicle which has least received signal strength; said receiving device obtaining a threshold speed for vehicles.

If said noise power level in said first environment is not bigger than said noise floor value, and if packet error rate is not higher than said threshold error rate, and if number of said multiple remote vehicles is not bigger than said threshold number of vehicles, then if speed of a second vehicle is smaller than said threshold speed for vehicles, then said central computer finding said first remote vehicle which has least received signal strength; said receiving device obtaining an original range value; if said noise power level in said first environment is not bigger than said noise floor value, and if packet error rate is not higher than said threshold error rate, and if number of said multiple remote vehicles is not bigger than said threshold number of vehicles, and if speed of said second vehicle is smaller than said threshold speed for vehicles, then if a new range value is same as said original range value, then said central computer finding said first remote vehicle which has least received signal strength.

If said noise power level in said first environment is not bigger than said noise floor value, and if packet error rate is not higher than said threshold error rate, and if number of said multiple remote vehicles is not bigger than said threshold number of vehicles, and if speed of said second vehicle is smaller than said threshold speed for vehicles, then if a new range value is same as said original range value, then said central computer finding said first remote vehicle which has least received signal strength; if said noise power level in said first environment is not bigger than said noise floor value, and if packet error rate is not higher than said threshold error rate, and if number of said multiple remote vehicles is not bigger than said threshold number of vehicles, and if speed of said second vehicle is smaller than said threshold speed for vehicles, then if said new range value is not same as said original range value, then said central computer repeating said method from first step again.

Here are some examples for features:
monitoring global positioning system data.
monitoring map data.
monitoring packet error rate statistics.
monitoring communication congestion data.
monitoring vehicle congestion data.
optimizing processing power and resources.
monitoring packet rates.
monitoring communication jamming devices.
monitoring communication hackers.
monitoring security holes.
monitoring suspicious activities.
changing communication range.
changing radius of interest.
monitoring noise.
monitoring thermal noise.
monitoring hardware noise.
monitoring quality of packets.
changing thresholds.
adaptively changing thresholds.

Figure 41:
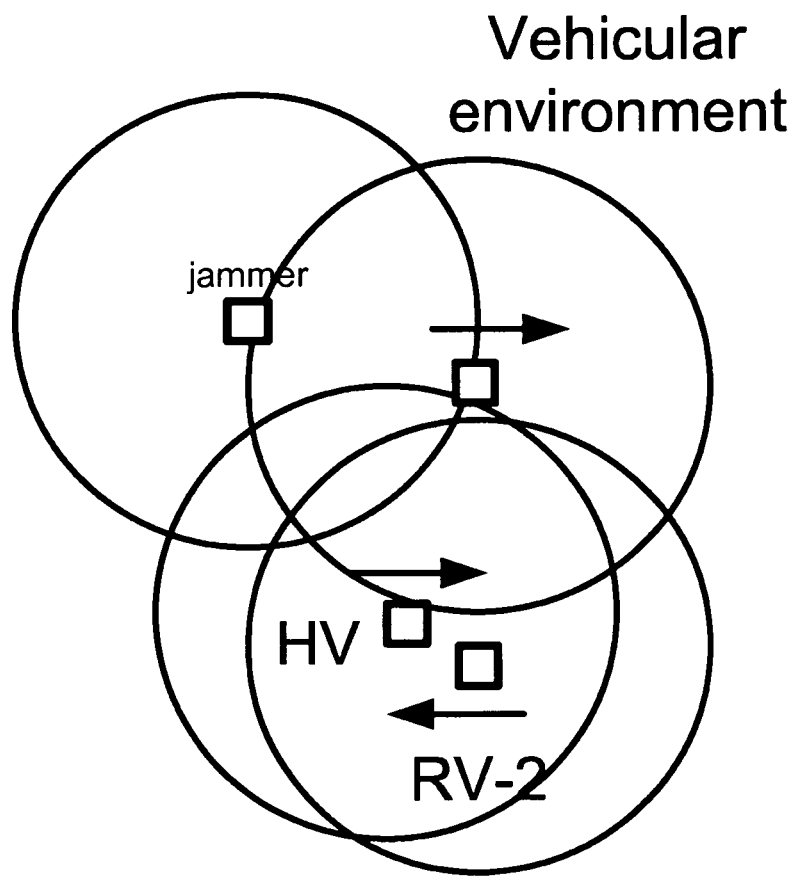
FIG. 41 is for one embodiment of the invention, for a system, for practical scenario of a vehicular environment.
Figure 42:
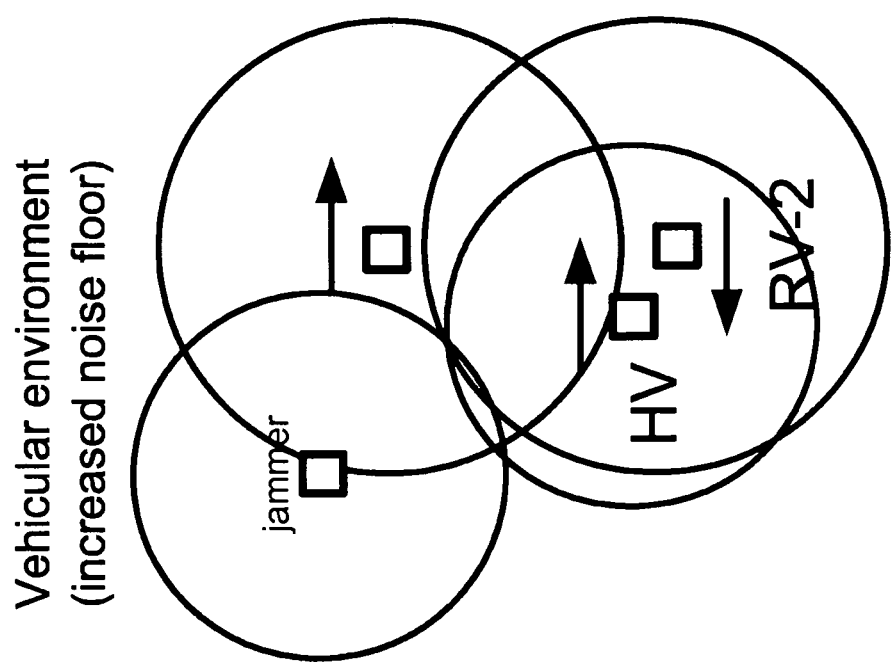
FIG. 42 is for one embodiment of the invention, for a system, for scenario as seen by HV after increasing the noise floor with the proposed method. This figure depicts the scenario as seen by HV when the noise floor of the HV is increased to the level of signal jammer. Notice here that the effect of the jammer is reduced considerably. It is termed as noise and will be ignored. The HV will receive ONLY the signals which are stronger than the noise signal.

FIG. 41 is for one embodiment of the invention, for a system, for practical scenario of a vehicular environment. FIG. 42 is for one embodiment of the invention, for a system, for scenario as seen by HV after increasing the noise floor with the proposed method. This figure depicts the scenario as seen by HV when the noise floor of the HV is increased to the level of signal jammer. Notice here that the effect of the jammer is reduced considerably. It is termed as noise and will be ignored. The HV will receive ONLY the signals which are stronger than the noise signal.

Figure 43:
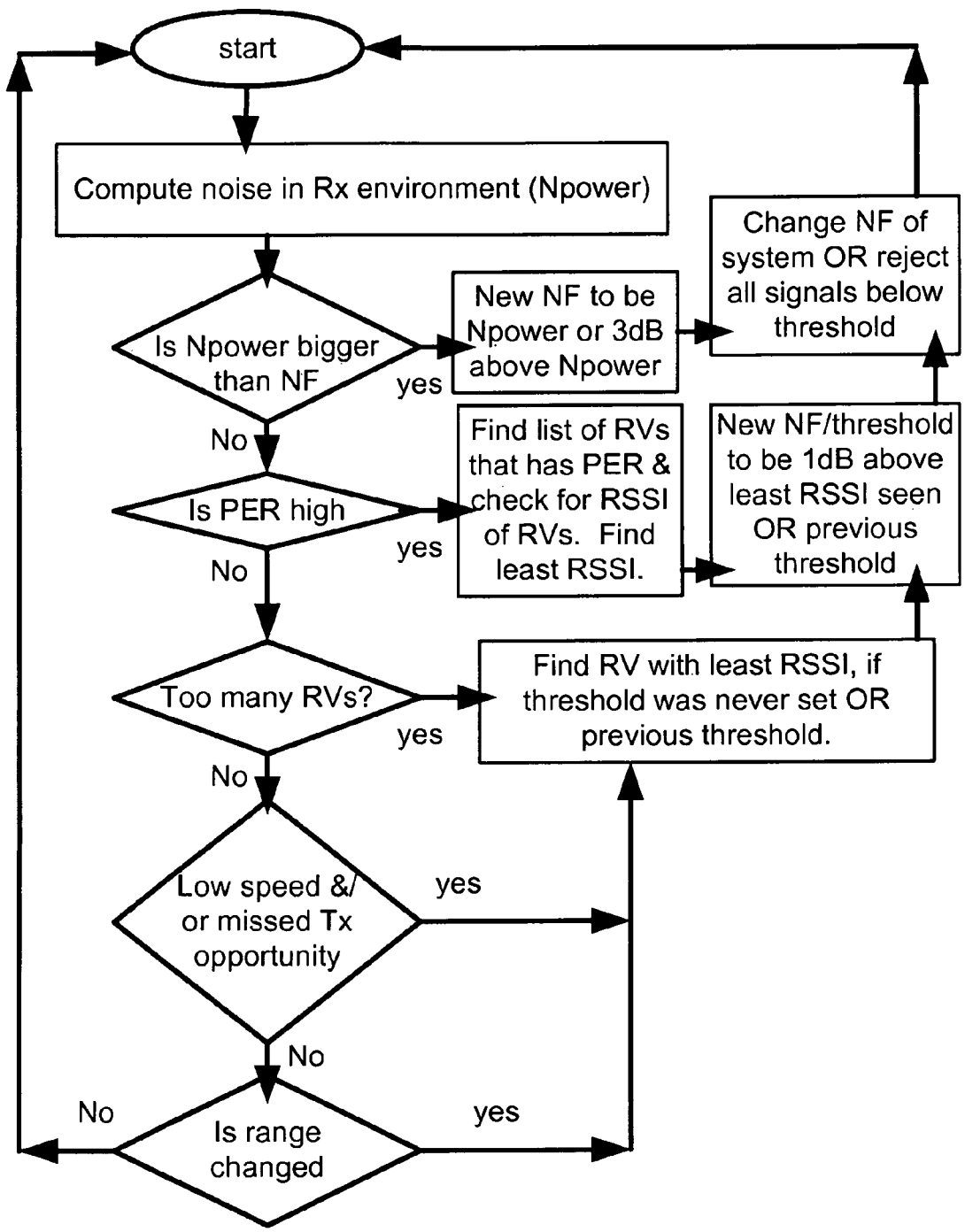
FIG. 43 is for one embodiment of the invention, for a method, for flowchart describing the proposed method/algorithm.
Figure 44:
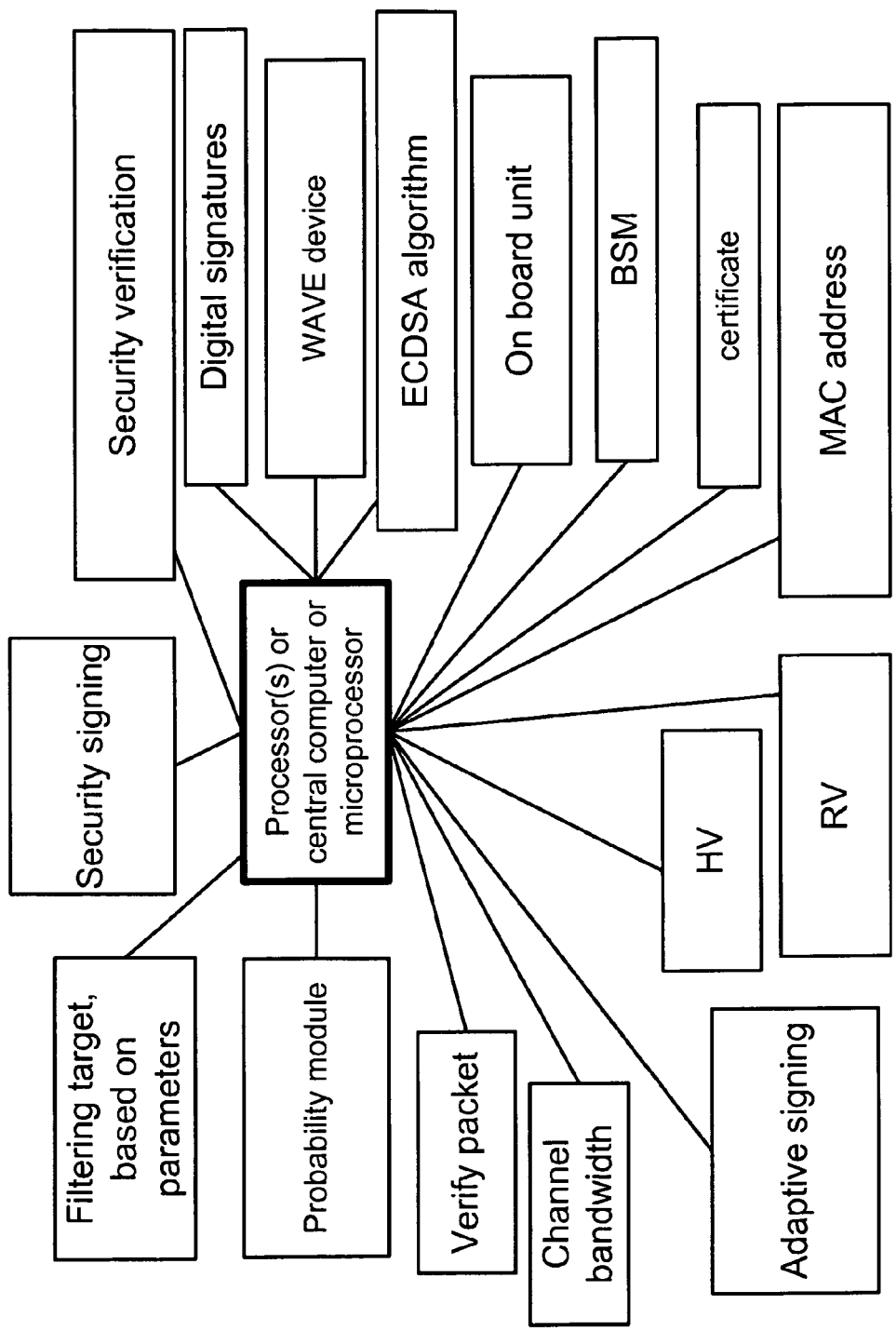
FIG. 44 is for one embodiment of the invention, for a system, with components shown.
Figure 45:
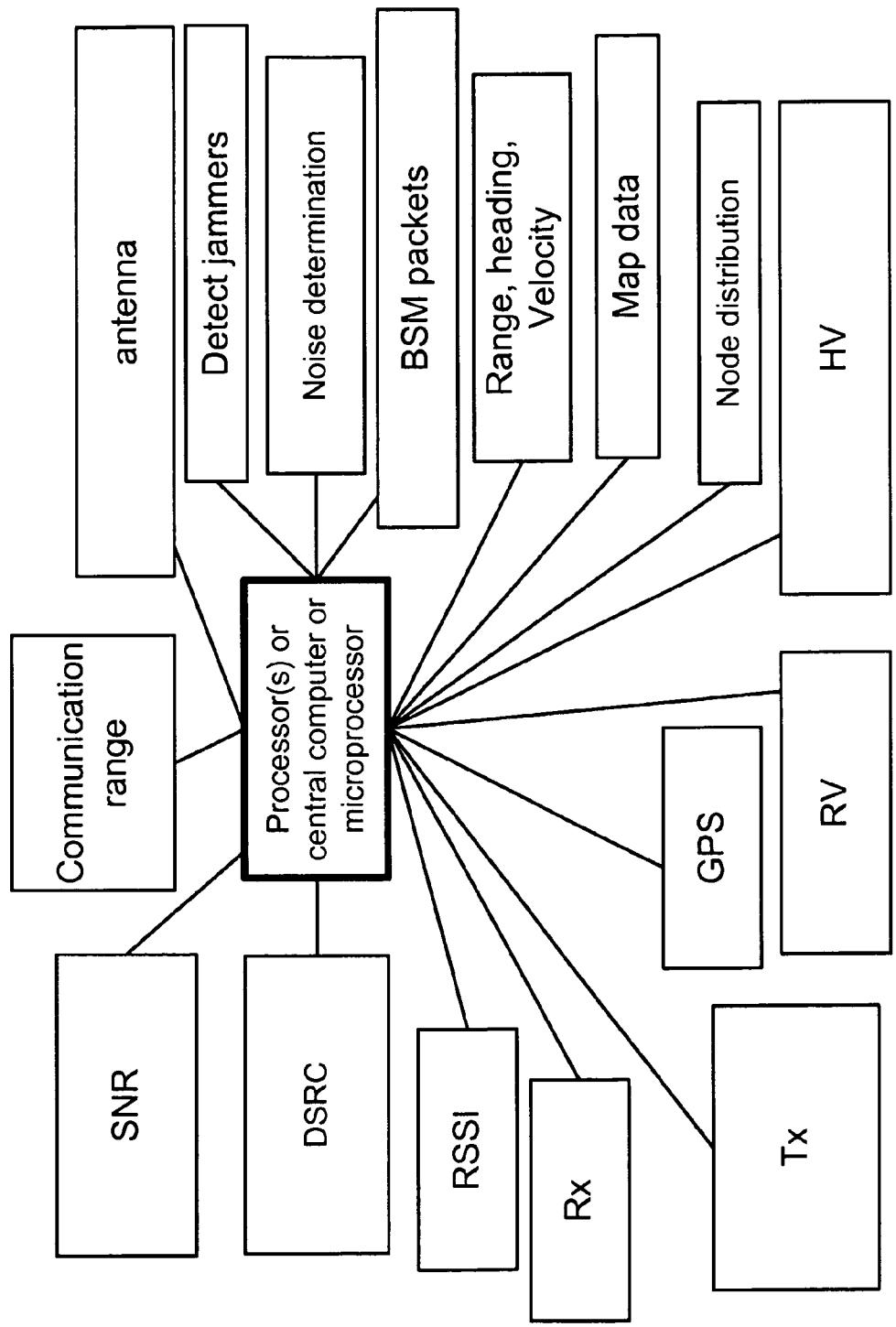
FIG. 45 is for one embodiment of the invention, for a system, with components shown.
Figure 46:
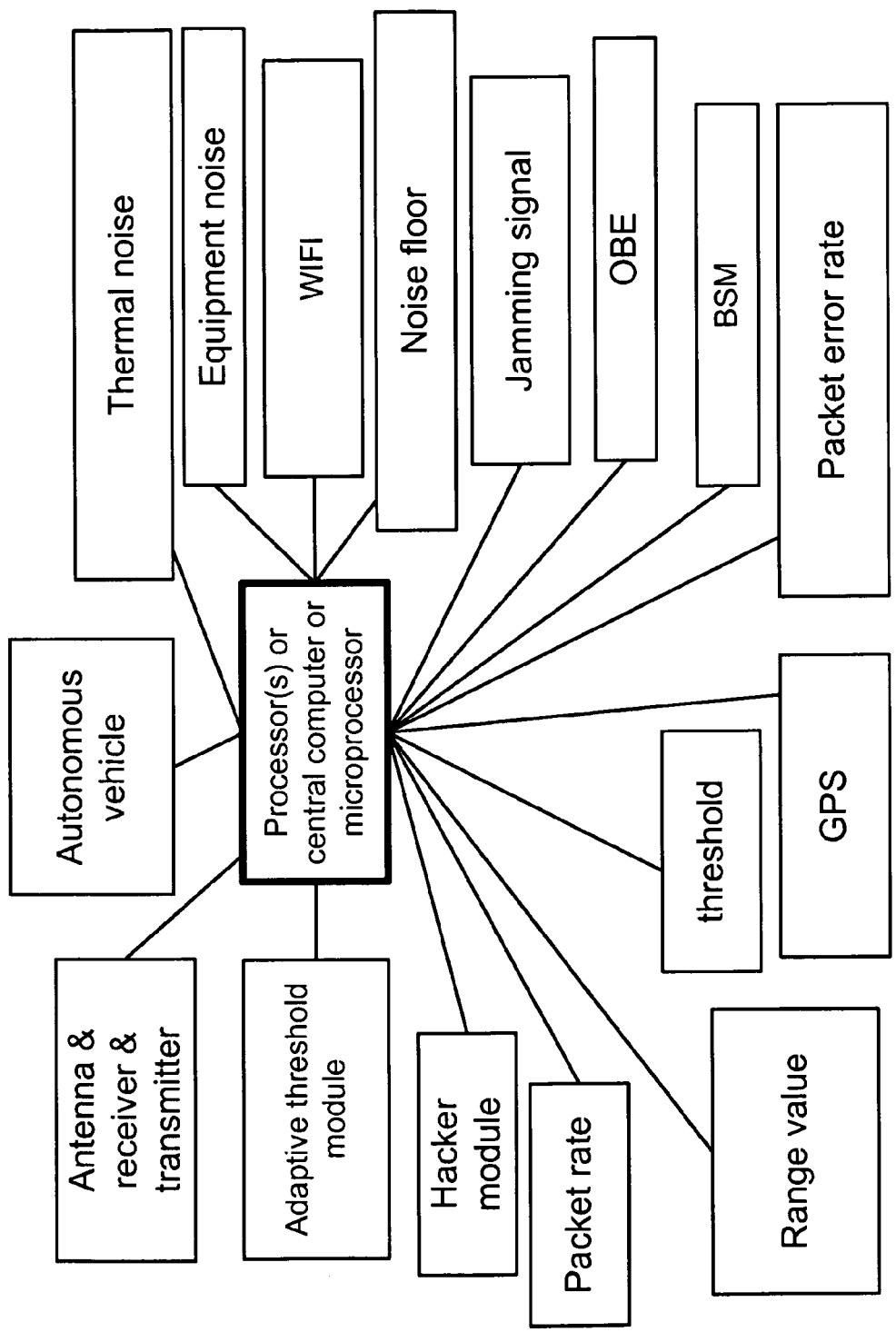
FIG. 46 is for one embodiment of the invention, for a system, with components shown.

FIG. 43 is for one embodiment of the invention, for a method, for flowchart describing the proposed method/algorithm. FIG. 44 is for one embodiment of the invention, for a system, with components shown. FIG. 45 is for second embodiment of the invention, for a system, with components shown. FIG. 46 is for third embodiment of the invention, for a system, with components shown.

Advantages/Comparison:

The advantage is very clear over the current methods, as detailed above: Our method results in optimally using the available processing power on processing the data of the desired nodes. It also helps in reducing the communication congestion problem. These are huge improvements over the prior art.

In this disclosure, any computing device, such as processor, microprocessor(s), computer, PC, pad, laptop, server, server farm, multi-cores, telephone, mobile device, smart glass, smart phone, computing system, tablet, or PDA can be used. The communication can be done by or using sound, laser, optical, magnetic, electromagnetic, wireless, wired, antenna, pulsed, encrypted, encoded, or combination of the above. The vehicles can be car, sedan, truck, bus, pickup truck, SUV, tractor, agricultural machinery, entertainment vehicles, motorcycle, bike, bicycle, hybrid, or the like. The roads can be one-lane county road, divided highway, boulevard, multi-lane road, one-way road, two-way road, or city street. Any variations of the above teachings are also intended to be covered by this patent application.

The invention claimed is:

1. A method for adaptive node filtering for autonomous vehicles in a street or highway, said method comprising:
   a central computer in a system receiving data from a host vehicle;
   said central computer receiving data from multiple remote vehicles;
   a receiving device computing a noise power level in a first environment;
   said receiving device obtaining a noise floor value with respect to said first environment;
   when said noise power level in said first environment is bigger than said noise floor value, then said receiving device setting a new value for said noise floor value, to be at a level which is three decibels higher than said noise power level, said receiving device setting said new value for said noise floor value for said system, and rejecting all signals below said new value for said noise floor value;
   said receiving device obtaining a threshold error rate;
   when said noise power level in said first environment is not bigger than said noise floor value, then when a packet error rate is higher than said threshold error rate, then said receiving device examining a list of said multiple remote vehicles, and said receiving device finding a first remote vehicle which has least received signal strength,
   said receiving device setting said new value for said noise floor value for said system, to be one decibel higher than power of said first remote vehicle which has least received signal strength;
   said receiving device obtaining a threshold number of vehicles;
   when said noise power level in said first environment is not bigger than said noise floor value, and when the packet error rate is not higher than said threshold error rate, then when a number of said multiple remote vehicles is bigger than said threshold number of vehicles, then said central computer finding said first remote vehicle which has least received signal strength;
   said receiving device obtaining a threshold speed for vehicles;
   when said noise power level in said first environment is not bigger than said noise floor value, and when the packet error rate is not higher than said threshold error rate, and when the number of said multiple remote vehicles is not bigger than said threshold number of vehicles, then when a speed of a second vehicle is smaller than said threshold speed for vehicles, then said central computer finding said first remote vehicle which has least received signal strength;
   said receiving device obtaining an original range value;
   when said noise power level in said first environment is not bigger than said noise floor value, and when the packet error rate is not higher than said threshold error rate, and when the number of said multiple remote vehicles is not bigger than said threshold number of vehicles, and when the speed of said second vehicle is smaller than said threshold speed for vehicles, then when a new range value is same as said original range value, then said central computer finding said first remote vehicle which has least received signal strength;
   when said noise power level in said first environment is not bigger than said noise floor value, and when the packet error rate is not higher than said threshold error rate, and when the number of said multiple remote vehicles is not bigger than said threshold number of vehicles, and when the speed of said second vehicle is smaller than said threshold speed for vehicles, then when a new range value is same as said original range value, then said central computer finding said first remote vehicle which has least received signal strength;
   when said noise power level in said first environment is not bigger than said noise floor value, and when the packet error rate is not higher than said threshold error rate, and when the number of said multiple remote vehicles is not bigger than said threshold number of vehicles, and when the speed of said second vehicle is smaller than said threshold speed for vehicles, then when said new range value is not same as said original range value, then said central computer repeating said method from first step again.

2. The method for adaptive node filtering for autonomous vehicles in a street or highway, as recited in claim 1, said method comprises: monitoring global positioning system data.

3. The method for adaptive node filtering for autonomous vehicles in a street or highway, as recited in claim 1, said method comprises: monitoring map data.

4. The method for adaptive node filtering for autonomous vehicles in a street or highway, as recited in claim 1, said method comprises: monitoring packet error rate statistics.

5. The method for adaptive node filtering for autonomous vehicles in a street or highway, as recited in claim 1, said method comprises: monitoring communication congestion data.

6. The method for adaptive node filtering for autonomous vehicles in a street or highway, as recited in claim 1, said method comprises: monitoring vehicle congestion data.

7. The method for adaptive node filtering for autonomous vehicles in a street or highway, as recited in claim 1, said method comprises: optimizing processing power and resources.

8. The method for adaptive node filtering for autonomous vehicles in a street or highway, as recited in claim 1, said method comprises: monitoring packet rates.

9. The method for adaptive node filtering for autonomous vehicles in a street or highway, as recited in claim 1, said method comprises: monitoring communication jamming devices.

10. The method for adaptive node filtering for autonomous vehicles in a street or highway, as recited in claim 1, said method comprises: monitoring communication hackers.

11. The method for adaptive node filtering for autonomous vehicles in a street or highway, as recited in claim 1, said method comprises: monitoring security holes.

12. The method for adaptive node filtering for autonomous vehicles in a street or highway, as recited in claim 1, said method comprises: monitoring suspicious activities.

13. The method for adaptive node filtering for autonomous vehicles in a street or highway, as recited in claim 1, said method comprises: changing communication range.

14. The method for adaptive node filtering for autonomous vehicles in a street or highway, as recited in claim 1, said method comprises: changing radius of interest.

15. The method for adaptive node filtering for autonomous vehicles in a street or highway, as recited in claim 1, said method comprises: monitoring noise.

16. The method for adaptive node filtering for autonomous vehicles in a street or highway, as recited in claim 1, said method comprises: monitoring thermal noise.

17. The method for adaptive node filtering for autonomous vehicles in a street or highway, as recited in claim 1, said method comprises: monitoring hardware noise.

18. The method for adaptive node filtering for autonomous vehicles in a street or highway, as recited in claim 1, said method comprises: monitoring quality of packets.

19. The method for adaptive node filtering for autonomous vehicles in a street or highway, as recited in claim 1, said method comprises: changing thresholds.

20. The method for adaptive node filtering for autonomous vehicles in a street or highway, as recited in claim 1, said method comprises: adaptively changing thresholds.

* * * * *